US012190483B2

(12) United States Patent
Jacob et al.

(10) Patent No.: US 12,190,483 B2
(45) Date of Patent: Jan. 7, 2025

(54) DEEP GENERATIVE MODELING OF SMOOTH IMAGE MANIFOLDS FOR MULTIDIMENSIONAL IMAGING

(71) Applicant: University of Iowa Research Foundation, Iowa City, IA (US)

(72) Inventors: Mathews Jacob, Iowa City, IA (US); Qing Zou, Iowa City, IA (US)

(73) Assignee: UNIVERSITY OF IOWA RESEARCH FOUNDATION, Iowa City, IA (US)

( * ) Notice: Subject to any disclaimer, the term of this patent is extended or adjusted under 35 U.S.C. 154(b) by 394 days.

(21) Appl. No.: 17/573,047

(22) Filed: Jan. 11, 2022

(65) Prior Publication Data
US 2022/0222781 A1    Jul. 14, 2022

Related U.S. Application Data

(60) Provisional application No. 63/136,462, filed on Jan. 12, 2021.

(51) Int. Cl.
*G06T 5/70*        (2024.01)
*G06N 3/08*        (2023.01)
*G06T 5/50*        (2006.01)

(52) U.S. Cl.
CPC ............... *G06T 5/70* (2024.01); *G06N 3/08* (2013.01); *G06T 5/50* (2013.01); *G06T 2207/10076* (2013.01); *G06T 2207/10088* (2013.01); *G06T 2207/20081* (2013.01); *G06T 2207/20084* (2013.01); *G06T 2207/20182* (2013.01);

(Continued)

(58) Field of Classification Search
None
See application file for complete search history.

(56) References Cited

U.S. PATENT DOCUMENTS 6,512,854 B1 *   1/2003  Mucci ................. G06T 5/70
                                         382/128
2016/0283859 A1 *  9/2016  Fenoglio .............. H04L 43/04
2017/0347110 A1 * 11/2017  Wang .................. H04N 19/142
(Continued)

OTHER PUBLICATIONS

M. Uecker et al., "Espirit—an eigenvalue approach to autocalibrating parallel mri: where sense meets grappa," Magnetic Resonance in Medicine, vol. 71, No. 3, pp. 990-1001, 2014.
(Continued)

*Primary Examiner* — Tsung Yin Tsai
(74) *Attorney, Agent, or Firm* — Goodhue, Coleman & Owens, P.C.

(57) ABSTRACT

A method for visualization of dynamic objects using a generative manifold includes steps of: acquiring a set of measurements associated with the dynamic objects using sensors; estimating parameters of a generator using the set of measurements and estimating latent variables using the set of measurements; modeling using a computing device the dynamic objects as a smooth non-linear function of the latent variables using the generator such that points in a latent subspace are mapped to a manifold in a generative manifold model; and generating a visualization of the dynamic objects using the generative manifold model. The set of measurements may include multi-slice data. The generative manifold model may provide for modeling deformations.

20 Claims, 52 Drawing Sheets

(52) U.S. Cl.
CPC ............... *G06T 2207/30048* (2013.01); *G06T 2207/30061* (2013.01)

(56) References Cited

U.S. PATENT DOCUMENTS

| | | | | |
|---|---|---|---|---|
| 2018/0139458 | A1* | 5/2018 | Wang | G06T 3/4053 |
| 2018/0357753 | A1* | 12/2018 | Lehtinen | G06N 3/045 |
| 2019/0251401 | A1* | 8/2019 | Shechtman | G06V 10/82 |
| 2019/0369191 | A1* | 12/2019 | Gong | A61B 5/055 |
| 2021/0118136 | A1* | 4/2021 | Hassan-Shafique | G16B 20/20 |
| 2022/0108426 | A1* | 4/2022 | Xie | G06V 10/85 |

OTHER PUBLICATIONS

M. Usman, D. Atkinson, C. Kolbitsch, T. Schaeffter, and C. Prieto, "Manifold learning based ECG-free free-breathing cardiac CINE MRI," Journal of Magnetic Resonance Imaging, vol. 41, No. 6, p. 1521-1527, 2015.

M. Yurt, S. Uh Dar, A. Erdem, E. Erdem, and T. C, ukur, "mustgan: Multi-stream generative adversarial networks for mr image synthesis," arXiv preprint arXiv:1909.11504, 2019.

N. Kobayashi, "Magnetic resonance imaging with gradient sound respiration guide," Plos one, vol. 16, No. 7, 22 pages, 2021.

N. R. Huttinga, T. Bruijnen, C. A. van den Berg, and A. Sbrizzi, "Nonrigid 3d motion estimation at high temporal resolution from prospectively undersampled k-space data using low-rank mr-motus," Magnetic resonance in medicine, vol. 85, No. 4, pp. 2309-2326, 2020.

N. S. Higano, A. D. Hahn, J. A. Tkach, X. Cao, L. L. Walkup, R. P. Thomen, S. L. Merhar, P. S. Kingma, S. B. Fain, and J. C. Woods, "Retrospective respiratory self-gating and removal of bulk motion in pulmonary ute mri of neonates and adults," Magnetic resonance in medicine, vol. 77, No. 3, pp. 1284-1295, 2017.

N. S. Higano, D. R. Spielberg, R. J. Fleck, A. H. Schapiro, L. L. Walkup, A. D. Hahn, J. A. Tkach, P. S. Kingma, S. L. Merhar, S. B. Fain, et al., "Neonatal pulmonary magnetic resonance imaging of bronchopulmonary dysplasia predicts short-term clinical outcomes," American journal of respiratory and critical care medicine, vol. 198, No. 10, pp. 1302-1311, 2018.

O. Dietrich, J. G. Raya, S. B. Reeder, M. F. Reiser, and S. O. Schoenberg, "Measurement of signal-to-noise ratios in mr images: influence of multichannel coils, parallel imaging, and reconstruction filters," Journal of Magnetic Resonance Imaging: An Official Journal of the International Society for Magnetic Resonance in Medicine, vol. 26, No. 2, pp. 375-385, 2007.

Poddar, Sunrita, and Mathews Jacob. "Dynamic MRI using smoothness regularization on manifolds (SToRM)." IEEE transactions on medical imaging 35.4 (2016): 1106-1115.

Q. Zou and M. Jacob, "Recovery of surfaces and functions in high dimensions: sampling theory and links to neural networks," arXiv preprint arXiv:2005.12860, 2020.

Q. Zou, A. H. Ahmed, P. Nagpal, S. Kruger, and M. Jacob, "Deep generative storm model for dynamic imaging," in 2021 IEEE 18th International Symposium on Biomedical Imaging (ISBI), 4 pages, IEEE, 2021.

Q. Zou, S. Poddar, and M. Jacob, "Sampling of planar curves: Theory and fast algorithms," IEEE Transactions on Signal Processing, vol. 67, No. 24, pp. 6455-6467, 2019.

R. Zhou et al., "Free-breathing cine imaging with motion-corrected reconstruction at 3t using spiral acquisition with respiratory correction and cardiac self-gating (sparcs)," Magnetic resonance in medicine, vol. 82, No. 2, pp. 706-720, 2019.

S. G. Lingala, Y. Hu, E. DiBella, and M. Jacob, "Accelerated dynamic mri exploiting sparsity and low-rank structure: kt slr," IEEE Transactions on Medical Imaging, vol. 30, No. 5, pp. 1042-1054, 2011.

S. Kumar, R. Rai, A. Stemmer, S. Josan, L. Holloway, S. Vinod, D. Moses, and G. Liney, "Feasibility of free breathing lung mri for radiotherapy using non-cartesian k-space acquisition schemes," The British journal of radiology, vol. 90, No. 1080, p. 20170037, 2017.

S. Napel, M. P. Marks, G. D. Rubin, M. D. Dake, C. H. McDonnell, S. M. Song, D. R. Enzmann, and R. Jeffrey Jr, "Ct angiography with spiral ct and maximum intensity projection.," Radiology, vol. 185, No. 2, pp. 607-610, 1992.

S. Rosenzweig, N. Scholand, H. C. M. Holme, and M. Uecker, "Cardiac and respiratory self-gating in radial mri using an adapted singular spectrum analysis (ssa-fary)," IEEE Transactions on Medical Imaging, vol. 39, No. 10, 48 pages, 2020.

S. UH Dar et al., "Image synthesis in multi-contrast mri with conditional generative adversarial networks," IEEE transactions on medical imaging, vol. 38, No. 10, pp. 2375-2388, 2019.

S. UH Dar et al., "Prior-guided image reconstruction for accelerated multi-contrast mri via generative adversarial networks," IEEE Journal of Selected Topics in Signal Processing, vol. 14, No. 6, pp. 1072-1087, 2020.

S. UH Dar, M. O¨ zbey, A. B. C , atli, and T. C, ukur, "A transfer-learning approach for accelerated mri using deep neural networks," Magnetic resonance in medicine, vol. 84, No. 2, pp. 663-685, 2020.

S. Wang et al., "Accelerating magnetic resonance imaging via deep learning," in 2016 IEEE 13th International Symposium on Biomedical Imaging (ISBI). IEEE, 2016, pp. 514-517.

S. Wang et al., "Deepcomplexmri: Exploiting deep residual network for fast parallel mr imaging with complex convolution," Magnetic Resonance Imaging, vol. 68, pp. 136-147, 2020.

S. Wang et al., "Dimension: dynamic mr imaging with both k-space and spatial prior knowledge obtained via multi-supervised network training," NMR in Biomedicine, p. e4131, 2019.

S. Wang et al., "Lantern: Learn analysis transform network for dynamic magnetic resonance imaging," Inverse Problems & Imaging, p. 1, 2020.

Sunrita Poddar, Yasir Q Mohsin, Deidra Ansah, Bijoy Thattaliyath, Ravi Ashwath, and Mathews Jacob, "Man-ifold recovery using kernel low-rank regularization: Ap-plication to dynamic imaging," IEEE Transactions on Computational Imaging, vol. 5, No. 3, pp. 478-491, 2019.

T. Ku¨stner et al., "Cinenet: deep learning-based 3d cardiac cine mri reconstruction with multi-coil complex-valued 4d spatio-temporal convolutions," Scientific Reports, vol. 10, No. 1, pp. 1-13, 2020.

T. Ku¨stner et al., "Isotropic 3D Cartesian single breath-hold CINE MRI with multi-bin patch-based low-rank reconstruction," Magnetic Resonance in Medicine, vol. 84, No. 4, 2020.

T. Kido et al., "Compressed sensing real-time cine cardiovascular magnetic resonance: accurate assessment of left ventricular function in a single-breath-hold," Journal of Cardiovascular Magnetic Resonance, vol. 18, No. 1, pp. 1-11, 2016.

T. Li, M. Zhang, W. Qi, E. Asma, and J. Qi, "Motion correction of respiratory-gated pet images using deep learning based image registration framework," Physics in Medicine & Biology, vol. 65, No. 15, 21 pages, 2020 (available in PMC 2021).

T. Sanchez et al., "Scalable learning-based sampling optimization for compressive dynamic mri," in ICASSP 2020—2020 IEEE International Conference on Acoustics, Speech and Signal Processing (ICASSP). IEEE, 2020, pp. 8584-8588.

T. Wang et al., "Ica-unet: Ica inspired statistical unet for real-time 3d cardiac cine mri segmentation," in International Conference on Medical Image Computing and Computer-Assisted Intervention. Springer, 2020, pp. 447-457.

U. Nakarmi, K. Slavakis, and L. Ying, "Mls: Joint manifold-learning and sparsity-aware framework for highly accelerated dynamic magnetic resonance imaging," in 2018 IEEE 15th International Symposium on Biomedical Imaging (ISBI 2018). IEEE, 2018, pp. 1213-1216.

Ukash Nakarmi, Yanhua Wang, Jingyuan Lyu, Dong Liang, and Leslie Ying, "A kernel-based low-rank (klr) model for low-dimensional manifold recovery in highly accelerated dynamic mri," IEEE transactions on medical imaging, vol. 36, No. 11, pp. 2297-2307, 2017.

V. Monga, Y. Li, and Y. C. Eldar, "Algorithm unrolling: Interpretable, efficient deep learning for signal and image processing," arXiv preprint arXiv:1912.10557, 2019.

(56) References Cited

OTHER PUBLICATIONS

W. Jiang, F. Ong, K. M. Johnson, S. K. Nagle, T. A. Hope, M. Lustig, and P. E. Larson, "Motion robust high resolution 3d free-breathing pulmonary mri using dynamic 3d image self-navigator," Magnetic resonance in medicine, vol. 79, No. 6, pp. 2954-2967, 2018.
X. Chen et al., "Dynamic volume reconstruction from multi-slice abdominal mri using manifold alignment," in International Conference on Medical Image Computing and Computer-Assisted Intervention. Springer, 2016, pp. 493-501.
X. Chen et al., "High-Resolution Self-Gated Dynamic Abdominal MRI Using Manifold Alignment," IEEE Transactions on Medical Imaging, vol. 36, No. 4, pp. 960-971, 2017.
X. Zhu, M. Chan, M. Lustig, K. M. Johnson, and P. E. Larson, "Iterative motion-compensation reconstruction ultra-short te (imoco ute) for high-resolution free-breathing pulmonary mri," Magnetic resonance in medicine, vol. 83, No. 4, pp. 1208-1221, 2020.
Y. Han et al., "Deep learning with domain adaptation for accelerated projection-reconstruction mr," Magnetic resonance in medicine, vol. 80, No. 3, pp. 1189-1205, 2018.
Y. Li, Z. Wang, R. Sun, and F. Lam, "Separation of metabolites and macromolecules for short-te 1 h-mrsi using learned component-specific representations," IEEE Transactions on Medical Imaging, vol. 40, No. 4, pp. 1157-1167, 2021.
Z. Berecova, V. Neuschl, P. Boruta, J. Masura, and E. Ghersin, "A complex pulmonary vein varix-diagnosis with ecg gated mdct, mri and invasive pulmonary angiography," Journal of radiology case reports, vol. 6, No. 12, p. 9, 2012.
Z. Deng et al., "Four-dimensional mri using three-dimensional radial sampling with respiratory self-gating to characterize temporal phase-resolved respiratory motion in the abdomen," Magnetic Resonance in Medicine, vol. 75, No. 4, pp. 1574-1585, 2016.
A. Bora, E. Price, and A. G. Dimakis, "Ambientgan: Generative models from lossy measurements," in International Conference on Learning Representations, 2018, 22 pages.
A. Bustin, N. Fuin, R. M. Botnar, and C. Prieto, "From compressed-sensing to artificial intelligence-based cardiac mri reconstruction," Fron-tiers in Cardiovascular Medicine, vol. 7, pp. 17, 2020.
A. D. Hahn, N. S. Higano, L. L. Walkup, R. P. Thomen, X. Cao, S. L. Merhar, J. A. Tkach, J. C. Woods, and S. B. Fain, "Pulmonary mri of neonates in the intensive care unit using 3d ultrashort echo time and a small footprint mri system," Journal of Magnetic Resonance Imaging, vol. 45, No. 2, pp. 463-471, 2017.
A. F. Agarap, "Deep learning using rectified linear units (relu)," arXiv preprint arXiv:1803.08375, 2019, 7 pages.
A. Mittal, A. K. Moorthy, and A. C. Bovik, "No-reference image quality assessment in the spatial domain," IEEE Transactions on Image Processing, vol. 21, No. 12, pp. 4695-4708, 2012.
A. Pramanik, H. K. Aggarwal, and M. Jacob, "Deep generalization of structured low-rank algorithms (deep-slr)," IEEE Transactions on Medical Imaging, 2020, 17 pages.
A.-K. Bracher, C. Hofmann, A. Bornstedt, S. Boujraf, E. Hell, J. Ulrici, A. Spahr, B. Haller, and V. Rasche, "Feasibility of ultra-short echo time (ute) magnetic resonance imaging for identification of carious lesions," Magnetic resonance in medicine, vol. 66, No. 2, pp. 538-545, 2011.
Ahmed, Abdul Haseeb, et al. "Free-breathing and ungated cardiac cine using navigator-less spiral SToRM." arXiv preprint arXiv:1901. 05542 (2020), 13 pages.
Anthony G Christodoulou, Jaime L Shaw, Christopher Nguyen, Qi Yang, Yibin Xie, Nan Wang, and Debiao Li, "Magnetic resonance multitasking for motion-resolved quantitative cardiovascular imaging," Nature biomedical engineering, vol. 2, No. 4, pp. 215-226, 2018.
B. Xu, N. Wang, T. Chen, and M. Li, "Empirical evaluation of rectified activations in convolutional network," arXiv preprint arXiv:1505.00853, 5 pages, 2015.
C. F. Baumgartner et al., "High-resolution dynamic mr imaging of the thorax for respiratory motion correction of pet using groupwise manifold alignment," Medical Image Analysis, vol. 18, No. 7, pp. 939-952, 2014.
C. F. Baumgartner et al., "Self-aligning manifolds for matching disparate medical image datasets," in International Conference on Information Processing in Medical Imaging. Springer, 2015, pp. 363-374.
C. M. Sandino, P. Lai, S. S. Vasanawala, and J. Y. Cheng, "Accelerating cardiac cine mri using a deep learning-based espirit reconstruction," Magnetic Resonance in Medicine, vol. 85, No. 1, pp. 152-167, 2021.
C. Prieto et al., "Highly efficient respiratory motion compensated free-breathing coronary mra using golden-step cartesian acquisition," Journal of Magnetic Resonance Imaging, vol. 41, No. 3, pp. 738-746, 2015.
C. Qin et al., "Convolutional Recurrent Neural Networks for Dynamic MR Image Reconstruction," IEEE Transactions on Medical Imaging, vol. 38, No. 1, pp. 280-290, 2019.
D. O. Walsh, A. F. Gmitro, and M. W. Marcellin, "Adaptive reconstruction of phased array mr imagery," Magnetic Resonance in Medicine, vol. 43, No. 5, pp. 682-690, 2000.
D. P. Kingma and M. Welling, "Auto-encoding variational bayes," arXiv preprint arXiv:1312.6114, 2013.
D. Varga, A. Csisz'arik, and Z. Zombori, "Gradient regularization improves accuracy of discriminative models," arXiv preprint arXiv:1712. 09936, 2018, 14 pages.
Dmitry Ulyanov, Andrea Vedaldi, and Victor Lempitsky, "Deep image prior," in Proceedings of the IEEE Confer-ence on Computer Vision and Pattern Recognition, 2018,pp. 9446-9454.
F. Gibiino, L. Sacolick, A. Menini, L. Landini, and F. Wiesinger, "Free-breathing, zero-te mr lung imaging," Magnetic Resonance Materials in Physics, Biology and Medicine, vol. 28, No. 3, pp. 207-215, 2015.
F. Knoll, K. Bredies, T. Pock, and R. Stollberger, "Second order total generalized variation (tgv) for mri," Magnetic resonance in medicine, vol. 65, No. 2, pp. 480-491, 2011.
F. Ong and M. Lustig, "Sigpy: a python package for high performance iterative reconstruction," Proceedings of the International Society of Magnetic Resonance in Medicine, Montr'eal, QC, vol. 4819, 2019.
G. Dardikman-Yoffe and Y. C. Eldar, "Learned sparcom: Unfolded deep super-resolution microscopy," arXiv preprint arXiv:2004. 09270, 2020.
G. E. Hinton and R. R. Salakhutdinov, "Reducing the dimensionality of data with neural networks," Science, vol. 313, No. 5786, pp. 504-507, 2006.
G. N. Shetty et al., "Bi-linear modeling of data manifolds for dynamic-mri recovery," IEEE Transactions on Medical Imaging, vol. 39, No. 3, pp. 688-702, 2019.
G. Wang, "A perspective on deep imaging," IEEE Access, vol. 4, pp. 8914-8924, 2016.
G. Wang, M. Kalra, and C. G. Orton, "Machine learning will transform radiology significantly within the next 5 years," Medical Physics, vol. 44, No. 6, pp. 2041-2044, 2017.
H. Pedersen, S. Kozerke, S. Ringgaard, K. Nehrke, and W. Y. Kim, "k-t pca: temporally constrained k-t blast reconstruction using principal component analysis," Magnetic Resonance in Medicine: An Official Journal of the International Society for Magnetic Resonance in Medicine, vol. 62, No. 3, pp. 706-716, 2009.
Goodfellow et al., "Generative adversarial nets," in Advances in neural information processing systems, 2014, pp. 2672-2680.
I. Higgins et al., "beta-vae: Learning basic visual concepts with a constrained variational framework," 2016.
I. Higgins et al., "Early visual concept learning with unsupervised deep learning," arXiv preprint arXiv:1606.05579, 2016, 12 pages.
J. A. Fessler and B. P. Sutton, "Nonuniform fast fourier transforms using min-max interpolation," IEEE transactions on signal processing, vol. 51, No. 2, pp. 560-574, 2003.
J. C. Ye, Y. Han, and E. Cha, "Deep convolutional framelets: A general deep learning framework for inverse problems," SIAM Journal on Imaging Sciences, vol. 11, No. 2, pp. 991-1048, 2018.

(56) References Cited

OTHER PUBLICATIONS

J. Chung et al., "A recurrent latent variable model for sequential data," Advances in Neural Information Processing Systems, vol. 28, pp. 2980-2988, 2015.

J. F. Gruden, S. Ouanounou, S. Tigges, S. D. Norris, and T. S. Klausner, "Incremental benefit of maximum-intensity-projection images on observer detection of small pulmonary nodules revealed by multidetector ct," American Journal of Roentgenology, vol. 179, No. 1, pp. 149-157, 2002.

J. Tsao, p. Boesiger, and K. P. Pruessmann, "k-t blast and k-t sense: dy-namic mri with high frame rate exploiting spatiotemporal cor-relations," Magnetic Resonance in Medicine, vol. 50, No. 5, pp. 1031-1042, 2003.

Jin, Kyong Hwan, et al. "Time-Dependent Deep Image Prior for Dynamic MRI." arXiv preprint arXiv:1910.01684 (2021), 11 pages.

K. Breuer, C. B. Meyer, F. A. Breuer, A. Richter, F. Exner, A. M. Weng, S. Str"ohle, B. Polat, P. M. Jakob, O. A. Sauer, et al., "Stable and efficient retrospective 4d-mri using non-uniformly distributed quasi-random numbers," Physics in Medicine & Biology, vol. 63, No. 7, p. 075002, 2018.

K. H. Jin, M. T. McCann, E. Froustey, and M. Unser, "Deep con-volutional neural network for inverse problems in imaging," IEEE Transactions on Image Processing, vol. 26, No. 9, pp. 4509-4522, 2017.

K. Kazuhiro et al., "Generative adversarial networks for the creation of realistic artificial brain magnetic resonance images," Tomogra-phy, vol. 4, No. 4, pp. 159, 2018.

K. M. Johnson, S. B. Fain, M. L. Schiebler, and S. Nagle, "Opti-mized 3d ultrashort echo time pulmonary mri," Magnetic resonance in medicine, vol. 70, No. 5, pp. 1241-1250, 2013.

Axel and R. Otazo, "Accelerated mri for the assessment of cardiac function," The British Journal of Radiology, vol. 89, No. 1063, pp. 20150655 (10 pages), 2016.

L. Feng, J. Delacoste, D. Smith, J. Weissbrot, E. Flagg, W. H. Moore, F. Girvin, R. Raad, P. Bhattacharji, D. Stoffel, et al., "Simultaneous evaluation of lung anatomy and ventilation using 4d respiratory-motion-resolved ultrashort echo time sparse mri," Jour-nal of Magnetic Resonance Imaging, vol. 49, No. 2, pp. 411-422, 2019.

Feng, L. Axel, H. Chandarana, K. T. Block, D. K. Sodickson, and R. Otazo, "Xd-grasp: golden-angle radial mri with reconstruction of extra motion-state dimensions using compressed sensing," Mag-netic Resonance in Medicine, vol. 75, No. 2, pp. 775-788, 2016.

Li Feng, Robert Grimm, Kai Tobias Block, Hersh Chan-darana, Sungheon Kim, Jian Xu, Leon Axel, Daniel K Sodickson, and Ricardo Otazo, "Golden-angle radial sparse parallel mri: combina-tion of compressed sensing, parallel imaging, and golden-angle radial sampling for fast and flexible dynamic volumetric mri," Magnetic res-onance in medicine, vol. 72, No. 3, pp. 707-717, 2014.

M. Arjovsky, S. Chintala, and L. Bottou, "Wasserstein gan," arXiv preprint arXiv:1701.07875, 2017.

M. Gori, M. Maggini, and L. Sarti, "Exact and approximate graph matching using random walks," IEEE Transactions on Pattern Analysis and Machine Intelligence, vol. 27, No. 7, pp. 1100-1111, 2005.

M. Gutberlet, T. F. Kaireit, A. Voskrebenzev, F. Lasch, J. Freise, T. Welte, F. Wacker, J. M. Hohlfeld, and J. Vogel-Claussen, "Free-breathing dynamic 19f gas mr imaging for mapping of regional lung ventilation in patients with copd," Radiology, vol. 286, No. 3, pp. 1040-1051, 2018.

M. Lustig, D. Donoho, and J. M. Pauly, "Sparse mri: The applica-tion of compressed sensing for rapid mr imaging," Magnetic Reso-nance in Medicine, vol. 58, No. 6, pp. 1182-1195, 2007.

M. Mani, V. A. Magnotta, and M. Jacob, "qmodel: A plug-and-play model-based reconstruction for highly accelerated multi-shot dif-fusion mri using learned priors," Magnetic Resonance in Medicine, vol. 86, No. 2, pp. 835-851, 2021.

\* cited by examiner

| | PSNR | SSIM | Recon error | Motion error |
|---|---|---|---|---|
| No bulk motion | 32.70 | 0.93 | 0.8% | 1% |
| Two bulk motions | 31.53 | 0.91 | 0.8% | 1.7% |
| Four bulk motions | 31.63 | 0.91 | 0.8% | 1.9% |
| Ten bulk motions | 28.05 | 0.85 | 2.9% | 4.8% |

FIG. 16A

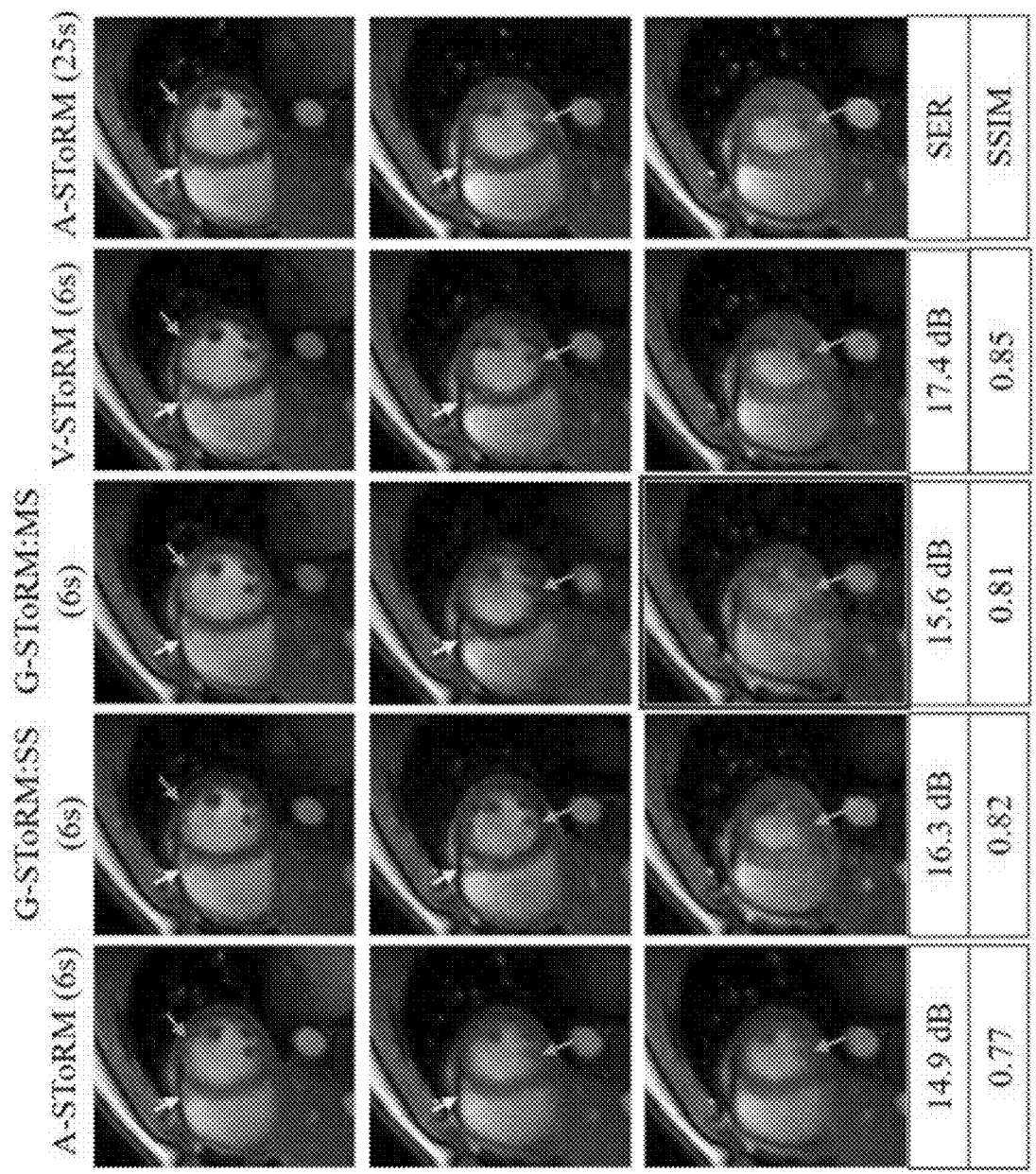

DEEP GENERATIVE MODELING OF SMOOTH IMAGE MANIFOLDS FOR MULTIDIMENSIONAL IMAGING

RELATED APPLICATIONS

This application claims priority to U.S. Provisional Patent Application No. 63/136,462, filed Jan. 12, 2021, hereby incorporated by reference in its entirety.

FEDERALLY SPONSORED RESEARCH AND DEVELOPMENT

This invention was made with government support NIH R01EB019961 awarded by the National Institute of Health. The Government has certain rights in the invention.

FIELD OF THE INVENTION

The present invention relates to multidimensional dynamic and static imaging. More particularly, but not exclusively, the present invention relates to deep generative modeling of smooth image manifolds for multidimensional imaging.

BACKGROUND

Although the present invention has wide-ranging applications in multidimensional (3D, 4D, and beyond) imaging, examples of problems in the art are generally discussed with respect to medical imaging and especially in the context of magnetic resonance imaging (MRI) and joint imaging of the heart and lungs in a manner which allows for free-breathing protocols as opposed to long-breath held protocols. One skilled in the art having benefit of this disclosure will appreciate, however, that the present invention applies to other imaging technologies and other applications in medicine and otherwise, including large-scale inverse problems.

Multidimensional (3D and beyond) imaging is an important, but very challenging problem in medical imaging. Novel applications demand the imaging of multiple contrasts (e.g. T1, T2, chemical shift) of a dynamically changing object (e.g. heart, lung) in response to a stimulus (e.g. contrast administration). For example, while magnetic resonance imaging (MRI) offers superior soft tissue contrast, the slow nature of MR acquisition makes it difficult to achieve high spatial and temporal resolution. While computed tomography (CT) is significantly faster, dynamic imaging applications are challenging because of the high radiation exposure. The major challenge is the large volume of data that needs to be acquired in a short acquisition time, as well as challenges in storing and processing the data. Several imaging approaches including compressed sensing, low-rank methods, self-gating methods, and tensor methods have been introduced to solve this problem.

The visualization of dynamic objects (e.g. 3D+time applications including imaging of the beating heart, fetal imaging, imaging of a brain with cardiac pulsations and bulk motion) with contrast changes (e.g. 4D+time applications including contrast enhanced imaging and quantitative imaging) is challenging for most medical imaging modalities. For example, while magnetic resonance imaging (MRI) offers superior soft tissue contrast, the slow nature of MR acquisition makes it difficult to achieve high spatial and temporal resolution. While computed tomography (CT) is significantly faster, dynamic imaging applications are challenging because of the high radiation exposure. The recovery of the image time series from few and noisy measurements is thus a key problem in these applications. Therefore, despite various advances in the art, problems remain.

SUMMARY

Therefore, it is a primary object, feature, or advantage to improve over the state of the art.

It is a further object, feature, or advantage to provide a methodology for use in multidimensional imaging which may be performed quickly and/or with a high resolution.

It is a still further object, feature, or advantage to provide for free-breathing multi-contrast dynamic MRI.

It is a still further object, feature, or advantage to use deep learning methods which are unsupervised.

Another object, feature, or advantage is to reduce memory demand of deep-learning algorithms, compared to prior art methods.

Yet another object, feature, or advantage is to provide a deep generative model.

A still further object, feature, or advantage is to avoid problems associated with using self-gating to provide for dynamic multidimensional MRI.

Another object, feature, or advantage is to provide for superior compression of dynamic imaging datasets.

A still further object, feature, or advantage is resolving and/or compensating for motion induced changes in images.

Yet another object, feature, or advantage is to capture intra and inter-frame redundances.

Another object, feature, or advantage is to provide for the acquisition of free breathing and ungated cardiac MR images with different contrasts from patient populations that cannot hold their breath during cardiac MRI exams.

Yet another object, feature, or advantage is to provide for acquisition of multi-contrast MRI data during magnetization evolution using few measurements (e.g. MR fingerprinting) in high-resolution applications.

A still further object, feature, or advantage is to provide for dynamic Low-dose CT imaging of lung or the heart with or without contrast administration.

A further object, feature, or advantage is to provide for imaging of cellular organs in microscopy applications.

A still further object, feature, or advantage is to provide for deep learning without the limitations of conventional methods which are supervised including the need for full-sampled training data to train CNN parameters and the high memory demand of current mode-based CNN methods when used in multidimensional applications.

Another object, feature, or advantage is to represent acquired measurements representative of visual imagery and efficiently learn them from a small number of samples.

One or more of these and/or other objects, features, or advantages are provided. It is to be understood that different embodiments may provide different objects, features, or advantages and no single embodiment need have each and every object, feature, or advantage.

According to one aspect, the present disclosure includes a generative smoothness regularization on manifolds (SToRM) model for the recovery of dynamic image data from highly under-sampled measurements. The model assumes that the images in the dataset are non-linear mappings of low-dimensional latent vectors. A deep convolutional neural network (CNN) may be used to represent the non-linear transformation. The parameters of the generator as well as the low-dimensional latent vectors may be jointly estimated only from the under-sampled measurements. This approach is different from the traditional CNN approaches that require extensive fully sampled training data. Here, we may penalize the norm of the gradients of the non-linear mapping to constrain the manifold to be smooth, while temporal gradients of the latent vectors may be penalized to obtain a smoothly varying time-series. The proposed scheme brings in the spatial regularization provided by the convolutional network. The main benefit of the proposed scheme is the improvement in image quality and the orders of magnitude reduction in memory demand compared to traditional manifold models. To minimize the computational complexity of the algorithm, an efficient progressive training in time approach and approximation of the true cost function using smaller batches may be used. The batches may be chosen to be subset of time-frames in the dataset, or the measurements corresponding to the same latent vectors. These approaches speed up the image reconstructions and offers better reconstruction performance.

According to another aspect of the present disclosure, an unsupervised motion-compensated reconstruction scheme is provided for high-resolution free-breathing pulmonary MRI. We may model the image frames in the time series as the deformed version of the 3D template image volume. We may assume the deformation maps to be points on a smooth manifold in high-dimensional space. Specifically, we may model the deformation map at each time instant as the output of a CNN-based generator that has the same weight for all time-frames, driven by a low-dimensional latent vector. The time series of latent vectors account for the dynamics in the dataset, including respiratory motion and bulk motion. The template image volume, the parameters of the generator, and the latent vectors may be learned directly from the k-t space data in an unsupervised fashion. Experimental results show improved reconstructions compared to state-of-the-art methods, especially in the context of bulk motion during the scans.

According to another aspect, methods and systems for the variational learning a manifold from undersampled data is provided. Current deep learning-based manifold learning algorithms such as the variational autoencoder (VAE) require fully sampled data to learn the probability density of real-world datasets. Once learned, the density can be used for a variety of tasks, including data imputation. However, fully sampled data is often unavailable in a variety of problems, including the recovery of dynamic and high-resolution MRI data considered in this work. To overcome this problem, we introduce a novel variational approach to learn a manifold from undersampled data. The VAE uses a decoder fed by latent vectors, drawn from a conditional density estimated from the fully sampled images using an encoder. Since fully sampled images are not available in our setting, we approximate the conditional density of the latent vectors by a parametric model whose parameters are estimated from the undersampled measurements using back-propagation. We use the framework for the joint alignment and recovery of multislice free breathing and ungated cardiac MRI data from highly undersampled measurements. Most of the current self-gating and manifold cardiac MRI approaches consider the independent recovery of images from each slice; these methods are not capable of exploiting the inter-slice redundancies in the datasets and require sophisticated post-processing or manual approaches to align the images from different slices. By contrast, the proposed scheme is able to align the multislice data and exploit the redundancies. Experimental results demonstrate the utility of the proposed scheme in dynamic imaging alignment and reconstructions.

According to another aspect, a method for visualizing the similarity between images in a dynamic dataset using a generative manifold model is provided. The method involves acquiring a set of measurements associated with the dynamic objects using sensors (e.g. respiratory belts or k-space navigators in MRI). The method estimates the parameters of a generator and the latent variables from the above sensor measurements. In particular, the method models the sensor measurements as points on a smooth manifold, and represent the non-linear mapping between a low-dimensional latent space and the manifold by a neural network. The neural network parameters and the latent variables corresponding to each sensor measurement are learned. Once learned, the latent variables offer a visualization of the neighborhood structure of the points on the manifold. These latent variables may be used for visualization or the reconstruction of images from noisy and/or undersampled measurements.

According to another aspect, an apparatus for visualization of dynamic objects using a generative manifold model includes a processor programmed with instructions configured to receive a set of acquired measurements associated with the dynamic objects, estimate parameters of a generator using the set of measurements, estimate latent variables using the set of measurements, model the dynamic objects as a smooth non-linear function of the latent variables using the generator such that points in a latent subspace are mapped to a manifold in a generative manifold model, and generate a visualization of the dynamic objects using the generative manifold model.

According to another aspect, a method for compactly representing and learning images in a multi-dimensional dataset from partial and undersampled measurements using a generative manifold model is provided. The method includes modeling the images or deformations of the images in the multi-dimensional dataset as a smooth non-linear function of low-dimensional latent variables, wherein the smooth non-linear function is modeled using a neural network generator, which maps points in the low-dimensional latent space to a smooth image manifold in high dimensional ambient space. The method further includes acquiring a set of measurements, associated with the images of the object using sensors, estimating parameters of the neural network generator using the set of measurements, estimating latent variables using the set of measurements, and generating a visualization of dynamic objects associated with the images using the generative manifold model. The neural network generator may be a convolutional neural network (CNN) generator. The modeling may further include performing regularization of the parameters of the CNN generator to encourage smoothness of the images or the deformations in the smooth image manifold. The modeling may further include performing the regularization of the of latent variables to encourage at least one property of the images in the multidimensional dataset wherein the at least one property includes temporal smoothness. The images in the multi-dimensional dataset may be images that vary depending on at least one of: (a) dynamic changes to an organ resulting from physiological and subject bulk motion (b) image intensity changes induced by administration of external contrast agents (c) dynamic contrast changes resulting from image acquisition settings, (d) time varying acquisition settings, and (e) imperfections associated with a measurement device associated with the sensors; (f) combinations thereof. The set of measurements may include multi-slice measurements of 3D volume. The generative manifold model may provide for modeling deformations. The set of measurements may be acquired using a magnetic resonance imaging scanner. The method may further include storing the set of measurements on a non-transitory machine readable storage medium. The images may be images of portions of biological tissue. The images may be four-dimensional images which may be acquired using magnetic resonance. The method may further include displaying the visualization on a display. The sensors may be associated with an imaging system such as a magnetic resonance imaging system.

According to another aspect, a method for visualization of structure of a data manifold using a generative manifold model is provided. The method includes modeling using a computing device images in a data set as a smooth non-linear function of latent variables using a generator, such that points in a latent subspace are mapped to the data manifold in the generative manifold model and wherein the generator is a neural network (NN). The method further includes acquiring a set of measurements associated with each of the points, estimating parameters of the neural network using the set of measurements, estimating latent variables using the set of measurements, and using the latent subspace to visualize variability in the dataset and to display fundamental modes of variability in the dataset on a display device. The modeling may include regularizing the parameters of the neural network. The modeling may further include regularizing the latent variables using disentangling priors to thereby aid in separating out the fundamental modes of the variability. The generative manifold model may provide for modeling deformations.

BRIEF DESCRIPTION OF THE DRAWINGS

Illustrated embodiments of the disclosure are described in detail below with reference to the attached drawing figures, which are incorporated by reference herein.

In FIG. 7B, FIG. 7C, and FIG. 7D, we showed the learned latent vectors for the three cases. The visual and quantitative comparisons of the three cases are shown in FIG. 7E.

FIG. 10B corresponds to the time profiles of the reconstructions. We observe that the proposed (d=40) reconstructions exhibit less blurring and fewer artifacts when compared to SToRM150 and competing methods.

FIG. 11B corresponds to the time profiles of the reconstructions. We chose d=40 for the proposed scheme. We observe that the proposed reconstructions appear less blurred when compared to the conventional schemes.

FIG. 14A XD-GRASP uses the central k-t space data to estimate the motion signals and bins the k-t space data into several motion phases. The binned data are then used for the recovery of the images using total variation and wavelet regularization. FIG. 14B The proposed MoCo-SToRM scheme jointly learns the deformation maps $\varphi_t$ and the static image template f from the k-t space data. To regularize the deformation maps, we model $\phi_t = \mathcal{G}_\theta(z_t)$ as the outputs of a deep CNN generator $\mathcal{G}_\theta$ whose weights are denoted by $\theta$. The inputs of the generator are the low-dimensional (e.g., 1-D in lung MRI) latent vectors. The parameters of the CNN generator $\theta$, the latent vectors $z_t$, and the template f are jointly estimated from the data. The loss is the mean square error between the actual measurements and the multi-channel measurements of the deformed images $f_t$.

FIG. 16A, FIG. 16B, and FIG. 16C show results of the numerical simulation study. The proposed MoCo-SToRM scheme is applied on the simulation data, where we simulated the data with no, two, four, and ten bulk motions. The quantitative results of the simulation are shown in FIG. 16A. In FIG. 16B and FIG. 16C, we show the learned latent vectors, the time profiles of the image volumes, the time profiles of the deformation maps, and the comparison of the reconstructions for the four cases. We note that the proposed scheme can offer reliable estimates when there are few bulk motion events. When the number of bulk motion events increases, the amount of k-t space data available in each bulk motion state decreases. The reduced data translates to higher motion errors, which results in increased reconstruction error.

In FIG. 17A, we show the estimated latent vectors corresponding to the first 200 frames, while FIG. 17B and FIG. 17C show the time profile of the reconstructed image volumes and the deformation maps, respectively. From the three figures on the left, we see that the motion patterns in the time profiles closely match the learned latent vectors. In FIG. 17D, we show the deformation maps in the three directions, corresponding to the time frames marked by red and green cross marks in the latent vectors in FIG. 17A.

In FIG. 18A, we show the results from the healthy subject. Two regions from both the sagittal view are shown in the figure. In FIG. 18B, we show the results obtained from the diseased subject. From the figure, we can see that the proposed MoCo-SToRM scheme is able to reduce the noise and blur when compared to the competing methods.

FIG. 19A shows the DMD results, from which we can see that the proposed MoCo-SToRM scheme is able to provide comparable DMD results to those of the iMoCo scheme. FIG. 19B shows the results of the SNR and CNR comparison. We can see from the figure that the proposed MoCo-SToRM results are comparable with those obtained from the motion-compensated iMoCo scheme.

FIG. 20A shows the latent vectors estimated from the proposed scheme, which are zoomed to regions without bulk motion (I) and regions with bulk motion (II), captured by the discontinuity in the latent vectors. We plot the time profiles at the position marked by the line in the image shown in the middle row. From the plots of the time profiles, we see the subject moved his shoulder during the scan, evidenced by the rightmost reconstructed frame in (I) and (II), respectively; additional lines are in the same location, indicating motion in the shoulder. We also show four exemplar deformation maps corresponding to four time points marked in (I) and (II). We note that the deformation maps (top-right and bottom-left) with yellow and blue borders corresponding to the local minima of the latent vectors are similar. By contrast, the local maxima of the map with the purple border (bottom right) shows significant deviation from the one with the red border. FIG. 20B shows exemplar deformation maps FIG. 21A, FIG. 21B, and FIG. 21C provide a study of the neonatal subject in the NICU.

FIG. 23A shows several of the original images, and FIG. 23B shows the corresponding output of the generator (reconstructions). FIG. 23C illustrates the learned manifold; we sample the latent vectors on a uniform grid in the range $[-3, 3]^2$ and show the corresponding reconstructions. Note that the latent vectors capture the intrinsic variability in the dataset. The second row shows the results from the variational model, which are trained with undersampled noisy measurements. In this setting, 70% of the pixel values are missing, and the remaining 30% of the pixel values are corrupted with Gaussian white noise with 0 mean and 0.05 standard deviation. The zero-filled images are shown in FIG. 23D. In 23E, we show the reconstructions from the undersampled measurements. Note that the reconstructions closely resemble the original digits in FIG. 23A. FIG. 23F is the illustration of the manifold. Note that the variability in the manifold is captured in comparison to FIG. 23C.

FIG. 24A shows V-SToRM: SS. FIG. 24B shows V-SToRM: MS. FIG. 24A single-slice setting: The 2D network D receives the latent vectors sampled from their respective latent distributions using (30). The measurements of the 2D-generated images obtained by the respective sampling operators $\mathcal{A}_i$ are compared to the acquired multi-channel measurements using the cost function specified by (32). FIG. 24B the multislice 3D setting: Similar to the single-slice setting, the inputs to the 3D network are samples from the respective latent distributions. The 3D volumes are sampled by the respective sampling operators $\mathcal{A}_{z,t}$, which extract the zth slice and compare it to the measured data. The optimization criterion specified by (33) is minimized in this case.

FIG. 27A, FIG. 27B, FIG. 28C, and FIG. 27D provide alignment and joint recovery of multislice data. In FIG. 27A, shows the alignment and recovery of the eight slices obtained from the proposed multislice V-SToRM scheme. Four different phases in the time series for each slice are displayed. FIG. 27A shows that all the slices have the same cardiac phase and respiratory phase, indicating that the multislice V-SToRM is able to align the slices. FIG. 27B shows the alignment and recovery of the eight slices obtained from the generalization of single-slice G-SToRM to the multislice setting. We also use four different phases in the time series for each slice to illustrate the alignment of the multislice data. FIG. 27B shows that some of the phases for some of the slices have poor image quality. In particular, the details in the cardiac regions are poorly captured, and in some cases the boundaries of the heart are not visible. These issues can be understood from the plot distributions of the latent vectors obtained by the multislice V-SToRM and G-SToRM:MS, shown in FIG. 27C and FIG. 27D, respectively. We also plot the latent vectors for two of the slices for each method. Note that we generated the results in FIG. 27A and FIG. 27B by feeding the latent vectors corresponding to the second slice into the generators. The corresponding latent vectors used to generate the four different phases in FIG. 27A and FIG. 27B are indicated in the plot of the latent vectors in FIG. 27C and FIG. 27D. From FIG. 27C and FIG. 27D, we see that the latent vectors obtained from the proposed multislice V-SToRM scheme have similar distributions, whereas the distributions for the latent vectors obtained from G-SToRM:MS are very different.

FIG. 28A shows comparisons based on slice #3. FIG. 28A and FIG. 28B compare the image quality of the multislice V-SToRM reconstructions with the image quality of the reconstructions from A-SToRM, G-SToRM:SS, and G-SToRM:MS. The multislice dataset used in this example has four slices, and we show two of the slices in the figure to do the comparisons. For each slice, we show three different phases: the diastole phase, the systole phase, and the phase that is in between the diastole and systole phases. For each sub-figure, the first four columns represent the reconstruction from A-SToRM, G-SToRM:SS, G-SToRM:MS, and the proposed multislice V-SToRM based on 6 seconds of data. The last column shows the reconstructions using A-SToRM based on 25 seconds of data; they are used as simulated references for the quantitative results, which are shown at the bottom of each sub-figure. From both the visual comparisons and the quantitative results, we see that the multislice V-SToRM scheme is able to provide comparable reconstructions when compared to the competing methods. We also highlighted some of the phases in the multislice G-SToRM reconstruction, from which we see that G-SToRM:MS has some issues in generating some of the image frames.

DETAILED DESCRIPTION

Figure 1:
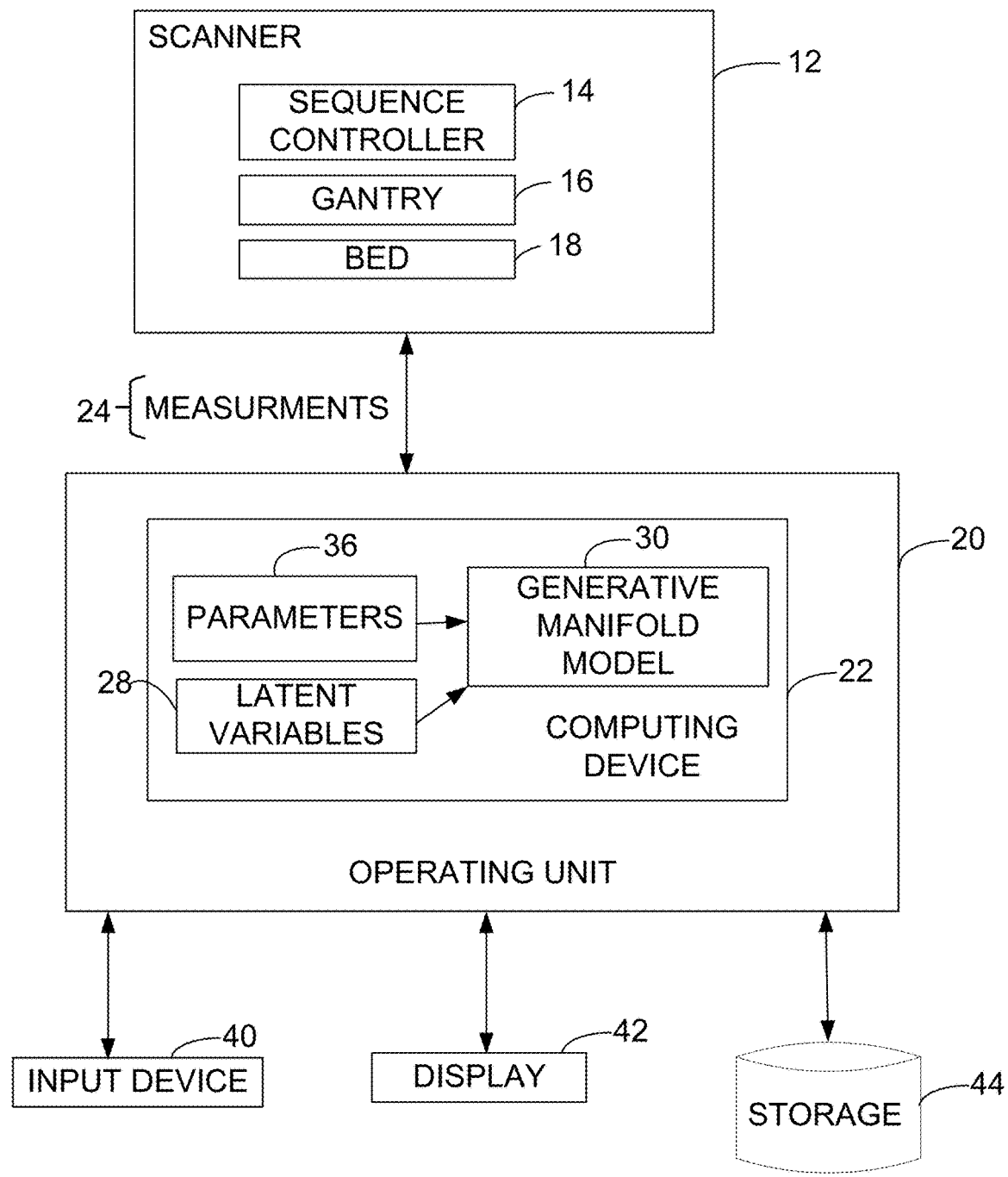
FIG. 1 is a block diagram of one example of an imaging system.

FIG. 1 is a block diagram of one example of an imaging system. The imaging system may include a scanner 12. The scanner may further include a sequence controller 14, a gantry 16, and a bed 18. An operation unit 20 is shown which includes a computing device 22. The operation unit 20 is configured to receive measurements 24 from the scanner 12. The computing device 22 may be configured to use the measurements 24 in determining parameters 36 and latent variables 28 to use in a generative manifold model 30. The generative manifold model 30 may be represented by a series of instructions which may be executed by the computing device 22. One or more input devices 40 may be operatively connected to the storage unit 20. One or more displays 42 may be operatively connected to the operations unit. The display 42 may be used to display images based on the measurements 24 and application of the generative manifold model 30. Thus, dynamic images of three or more dimensions may be displayed on the display 42. Storage 44 is operatively connected to the operation unit which may be used to store representations of the measurements 24 or dynamic imagery.

Figure 2:
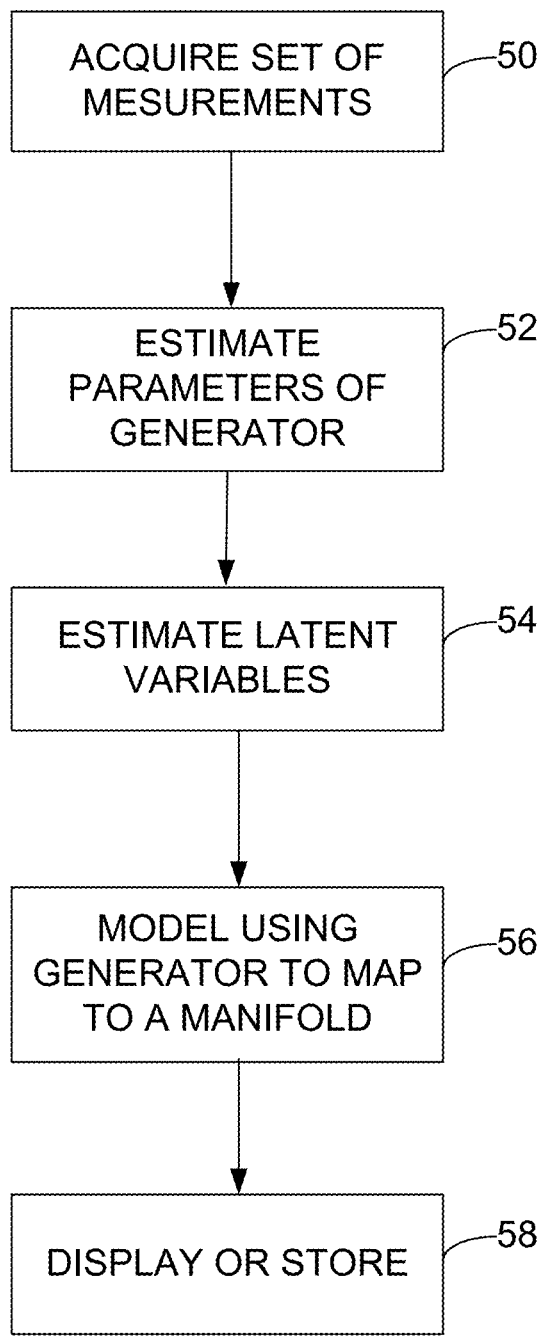
FIG. 2 is one example of a method.

FIG. 2 is one example of a method. In step 50 a set of measurements are acquired such as may be acquired using a magnetic resonance imaging (MRI) scanner. In step 52, parameters of a generator are estimated. In step 54, latent variables are estimated. In step 56, modeling is performing using a generator to map to a manifold. In step 58 results may be displayed and/or stored.

Figure 3:
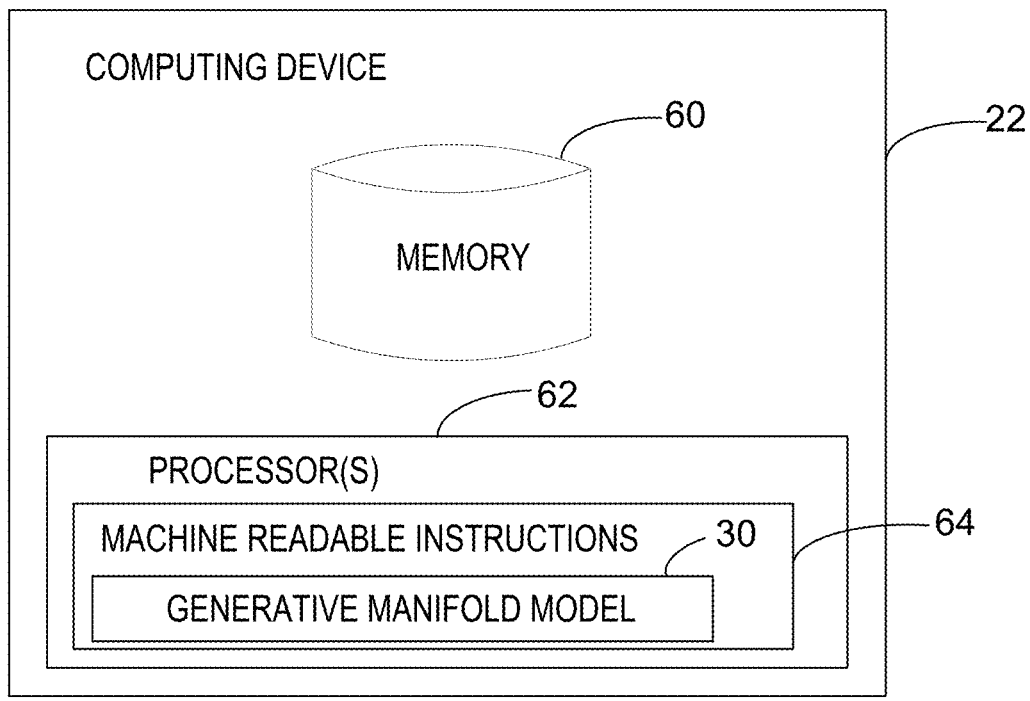
FIG. 3 illustrates an example of a computing device configured to apply a generative manifold model.

FIG. 3 further illustrates on example of a computing device 22. The computing device 22 may have a memory 60 and a processor 62. The processor 62 may be configured to execute machine readable instructions 64 which include instructions for implementing a generative manifold model 30.

The present disclosure sets forth several different sets of examples. The first is an embodiment showing dynamic imaging using a deep generative StoRM (Gen-SToRM) model. The second is an embodiment showing dynamic imaging using Motion-Compensated SmooThness Regularization on Manifolds (MoCo-SToRM). The third is an embodiment showing variational manifold learning from incomplete data: application to multislice dynamic MRI.

Part I: Dynamic Imaging Using a Deep Generative SToRM (Gen-SToRM) Model

I. Introduction

The imaging of time-varying objects at high spatial and temporal resolution is key to several modalities, including MRI and microscopy. A central challenge is the need for high resolution in both space and time [1], [2]. Several computational imaging strategies have been introduced in MRI to improve the resolution, especially in the context of free-breathing and ungated cardiac MRI. A popular approach pursued by several groups is self-gating, where cardiac and respiratory information is obtained from central k-space regions (navigators) using bandpass filtering or clustering [3]-[7]. The data is then binned to the respective phases and recovered using total variation or other priors. Recently, approaches using smooth manifold regularization have been introduced. These approaches model the images in the time series as points on a high-dimensional manifold [8]-[12]. Manifold regularization algorithms, including the smoothness regularization on manifolds (SToRM) framework [8]-[10], have shown good performance in several dynamic imaging applications. Since the data is not explicitly binned into specific phases as in the self-gating methods, manifold algorithms are less vulnerable to clustering errors than navigator-based corrections. Despite the benefits, a key challenge with the current manifold methods is the high memory demand. Unlike self-gating methods that only recover specific phases, manifold methods recover the entire time series. The limited memory on current GPUs restricts the number of frames that can be recovered simultaneously, which makes it challenging to extend the model to higher dimensionalities. The high memory demand also makes it difficult to use spatial regularization priors on the images using deep learned models.

One main focus is to capitalize on the power of deep convolutional neural networks (CNN) to introduce a memory efficient generative or synthesis formulation of SToRM. CNN based approaches are now revolutionizing image reconstruction, offering significantly improved image quality and fast image recovery [13]-[19]. In the context of MRI, several novel approaches have been introduced [20], [21], including transfer learning [22], domain adaptation [23], learning-based dynamic MRI [24]-[26], and generative-adversarial models [27]-[29]. Unlike many CNN-based approaches, the proposed scheme does not require pre-training using large amounts of training data. This makes the approach desirable in free-breathing applications, where the acquisition of fully sampled training data is infeasible. We note that the classical SToRM approach can be viewed as an analysis regularization scheme (see FIG. 4A). Specifically, a non-linear injective mapping is applied on the images such that the mapped points of the alias-free images lie on a low-dimensional subspace [10], [30], [31]. When recovering images from undersampled data, the nuclear norm prior is applied in the transform domain to encourage their non-linear mappings to lie in a subspace. Unfortunately, this analysis approach requires the storage of all the image frames in the time series, which translates to high memory demand. The proposed generative SToRM formulation offers quite significant compression of the data, which can overcome the above challenge. Both the relation between the analysis and synthesis formulations and the relation of the synthesis formulation to neural networks were established in earlier work [31]. We assume that the image volumes in the dataset are smooth non-linear functions of a few latent variables, i.e., $x_t = \mathcal{G}_\theta(z_t)$, where $z_t$ are the latent vectors in a low-dimensional space. $x_t$ is the t-th generated image frame in the time series. This explicit formulation implies that the image volumes lie on a smooth non-linear manifold in a high-dimensional ambient space (see FIG. 4B). The latent variables capture the differences between the images (e.g., cardiac phase, respiratory phase, contrast dynamics, subject motion). We model the G using a CNN, which offers a significantly compressed representation. Specifically, the number of parameters required by the model (CNN weights and latent vectors) are several orders of magnitude smaller than required for the direct representation of the images. The compact model proportionately reduces the number of measurements needed to recover the images. In addition, the compression also enables algorithms with much smaller memory footprint and computational complexity. We propose to jointly optimize for the network parameters $\theta$ and the latent vector $z_t$, based on the given measurements. The smoothness of the manifold generated by $\mathcal{G}_\theta(z)$ depends on the gradient of $\mathcal{G}_\theta$ with respect to its input. To enforce the learning of a smooth image manifold, we regularize the norm of the Jacobian of the mapping $\|J_z \mathcal{G}_\theta\|^2$. We experimentally observe that by penalizing the gradient of the mapping, the network is encouraged to learn meaningful mappings. Similarly, the images in the time series are expected to vary smoothly in time. Hence, we also use a Tikhonov smoothness penalty on the latent vectors $z_t$ to further constrain the solutions. We use the ADAM optimizer with stochastic gradients, where random batches of $z_t$ and $b_i$ are chosen at iteration to determine the parameters. Unlike traditional CNN methods that are fast during testing/inference, the direct application of this scheme to the dynamic MRI setting is computationally expensive. We use approximations, including progressive-intime optimization and an approximated data term that avoids non-uniform fast Fourier transforms, to significantly reduce the computational complexity of the algorithm.

The proposed approach is inspired by deep image prior (DIP), which was introduced for static imaging problems [32], as well as its extension to dynamic imaging [33]. The key difference of the proposed formulation is the joint optimization of the latent variables z and G. The work of Jin et al. [33] was originally developed for CINE MRI, where the latent variables were obtained by linearly interpolating noise variables at the first and last frames. Their extension to real-time applications involved setting noise latent vectors at multiples of a preselected period, followed by linearly interpolating the noise variables. This approach is not ideally suited for applications with free breathing, when the motion is not periodic. Another key distinction is the use of regularization priors on the network parameters and latent vectors, which encourages the mapping to be an isometry between latent and image spaces. Unlike DIP methods, the performance of the network does not significantly degrade with iterations. While we call our algorithm "generative SToRM", we note that our goal is not to generate random images from stochastic inputs as in generative-adversarial networks (GAN). In particular, we do not use adversarial loss functions where a discriminator is jointly learned as in the literature [34], [35].

II. Background

A. Dynamic MRI From Undersampled Data: Problem Setup

Our main focus is to recover a series of images $x_1, \ldots x_M$ from their undersampled multichannel MRI measurements. The multidimensional dataset is often compactly represented by its Casoratti matrix $$X = [x_1, \ldots x_M]. \quad (1)$$

Each of the images is acquired by different multichannel measurement operators $$b_i = A_i(x_i) + n_i, \quad (2)$$

where $n_i$ is zero mean Gaussian noise matrix that corrupts the measurements.

B. Smooth Manifold Models for Dynamic MRI

The smooth manifold methods model images $x_i$ in the dynamic time series as points on a smooth manifold M. These methods are motivated by continuous domain formulations that recover a function $f$ on a manifold from its measurements as $$f = \arg\min_{f} \sum_{i} \|f(x_i) - b_i\|^2 + \lambda \int_M \|\nabla_M f\|^2 dx \quad (3)$$

where the regularization term involves the smoothness of the function on the manifold. This problem is adapted to the discrete setting to solve for images lying on a smooth manifold from its measurements as $$X = \arg\min_{X} \sum_{i=1}^{M} \|A(x_i) - b_i\|^2 + \lambda \, \text{trace}(XLX^H), \quad (4)$$

where L is the graph Laplacian matrix. L is the discrete approximation of the Laplace-Beltrami operator on the manifold, which depends on the structure or geometry of the manifold. The manifold matrix L is estimated from k-space navigators. Different approaches, ranging from proximity-based methods [8] to kernel low-rank regularization [10] and sparse optimization [12], have been introduced.

The results of earlier work [10], [30] show that the above manifold regularization penalties can be viewed as an analysis prior. In particular, these schemes rely on a fixed non-linear mapping $\varphi$ of the images. The theory shows that if the images $x_1, \ldots x_M$ lie in a smooth manifold/surface or union of manifolds/surfaces, the mapped points live on a subspace or union of subspaces. The low-dimensional property of the mapped points $\varphi(x_1), \ldots \varphi(x_M)$ is used to recover the images from undersampled data or derive the manifold using a kernel low-rank minimization scheme:

$$X^* = \arg\min_{X} \sum_{i=1}^{M} \|A(x_i) - b_i\|^2 + \lambda \|[\varphi(x_1), \ldots \varphi(x_N)]\|_*. \quad (5)$$

This nuclear norm regularization scheme is minimized using an iterative reweighted algorithm, whose intermediate steps match (4). The non-linear mapping $\varphi$ may be viewed as an analysis operator that transforms the original images to a low dimensional latent subspace, very similar to analysis sparsity-based approaches used in compressed sensing.

C. Unsupervised Learning Using Deep Image Prior

The recent work of DIP uses the structure of the network as a prior [32], enabling the recovery of images from illposed measurements without any training data. Specifically, DIP relies on the property that CNN architectures favor image data more than noise. The regularized reconstruction of an image from undersampled and noisy measurements is posed in DIP as $$\{\theta^*\} = \arg\min_{\theta} \|A(x) - b\|^2 \text{ such that } x = \mathcal{G}_\theta[z] \quad (6)$$

where $x = \mathcal{G}_\theta^*[z]$ is the recovered image, generated by the CNN generator $\mathcal{G}_\theta^*$ whose parameters are denoted by $\theta$. Here, z is the random latent variable, which is chosen as random noise and kept fixed.

The above optimization problem is often solved using stochastic gradient descent (SGD). Since CNNs are efficient in learning natural images, the solution often converges quickly to a good image. However, when iterated further, the algorithm also learns to represent the noise in the measurements if the generator has sufficient capacity, resulting in poor image quality. The general practice is to rely on early termination to obtain good results. This approach was recently extended to the dynamic setting by Jin et al. [33], where a sequence of random vectors was used as the input.

III. Deep Generative SToRM Model

Figure 4B:
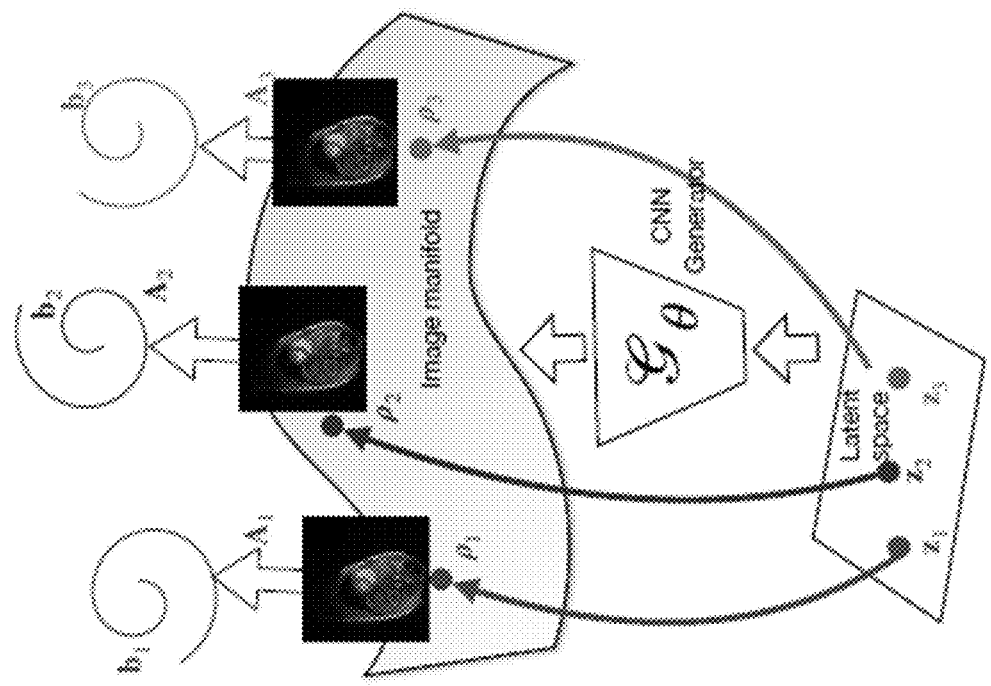
FIG. 4B shows generative SToRM.

We now introduce a synthesis SToRM formulation for the recovery of images in a time series from undersampled data (see FIG. 4B). Rather than relying on a non-linear mapping of images to a low-dimensional subspace [10] (see FIG. 4A), we model the images in the time series as non-linear functions of latent vectors living in a low-dimensional subspace.

Figure 4A:
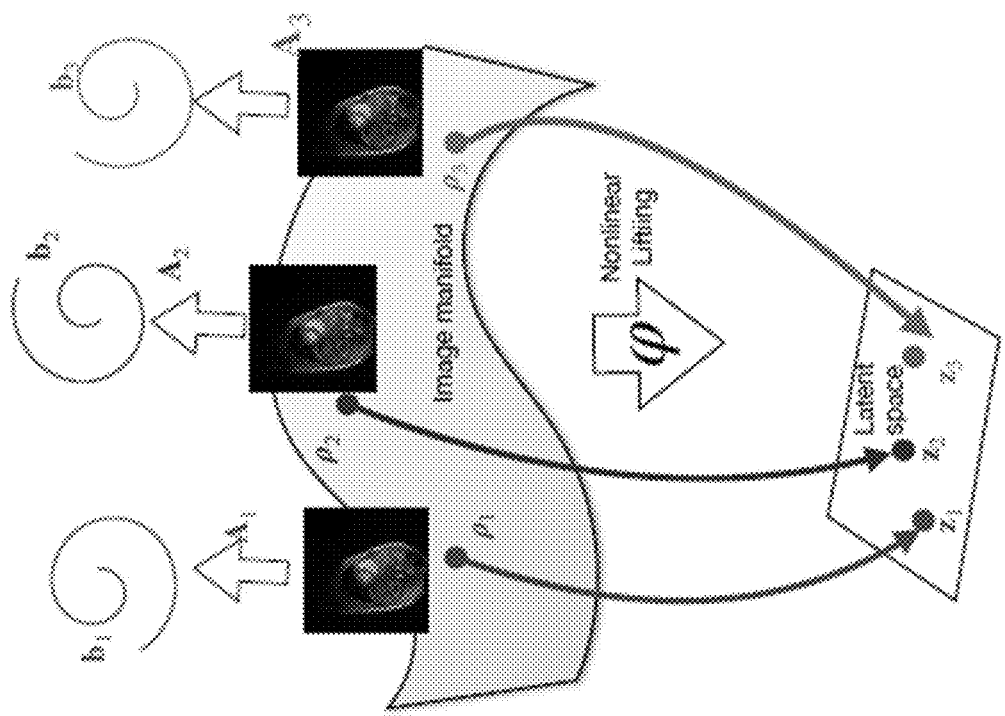
FIG. 4A illustrates analysis SToRM.

FIG. 4A and FIG. 4B illustrate Analysis SToRM and Generative SToRM, respectively. Analysis SToRM considers a non-linear (e.g. exponential) lifting of the data. If the original points lie on a smooth manifold, the lifted points lie on a low dimensional subspace. The analysis SToRM cost function in (5) is the sum of the fit of the recovered images to the undersampled measurements and the nuclear norm of the lifted points. A challenge with analysis SToRM is its high memory demand and the difficulty in adding spatial regularization. The proposed method models the images as the non-linear mapping $\mathcal{G}_\theta$ of some latent vectors $z_i$, which lie in a very low-dimensional space. Note that the same generator is used to model all the images in the dataset. The number of parameters of the generator and the latent variables is around the size of a single image, which implies a highly compressed representation. In addition, the structure of the CNN offers spatial regularization as shown in DIP. The proposed algorithm in (13) estimates the parameters of the generator and the latent variables from the measured data. A distance regularization prior is added to the generator to ensure that nearby points in the latent subspace are mapped to nearby points on the manifold. Similarly, a temporal regularization prior is added to the latent variables. The optimization is performed using ADAM with batches of few images.

A. Generative Model

We model the images in the time series as $$x_i = \mathcal{G}_\theta(z_i), i = 1, \ldots, M, \quad (7)$$

where $\mathcal{G}_\theta$ is a non-linear mapping, which is termed as the generator. Inspired by the extensive work on generative image models [32], [36], [37], we represent $\mathcal{G}_\theta$ by a deep CNN, whose weights are denoted by $z_i$. The parameters $z_i$ are the latent vectors, which live in a low-dimensional subspace. The non-linear mapping $\mathcal{G}_\theta$ may be viewed as the inverse of the image-to-latent space mapping', considered in the SToRM approach.

We propose to estimate the parameters of the network $\theta$ as well as the latent vectors $z_i$ by fitting the model to the undersampled measurements. The main distinction of our framework with DIP, which is designed for a single image, is that we use the same generator for all the images in the dynamic dataset. The latent vector $z_i$ for each image is different and is also estimated from the measurements. This strategy allows us to exploit non-local information in the dataset. For example, in free-breathing cardiac MRI, the latent vectors of images with the same cardiac and respiratory phase are expected to be similar. When the gradient of the network is bounded, the output images at these time points are expected to be the same. The proposed framework is hence expected to learn a common representation from these time-points, which are often sampled using different sampling trajectories. Unlike conventional manifold methods [8], [10], [12], the use of the CNN generator also offers spatial regularization.

It is often impossible to acquire fully-sampled training data in many free-breathing dynamic imaging applications, and a key benefit of this framework over conventional neural network schemes is that no training data is required. As discussed previously, the number of parameters of the model in (7) is orders of magnitude smaller than the number of pixels in the dataset. The dramatic compression offered by the representation, together with the mini-batch training provides a highly memory-efficient alternative to current manifold based and low-rank/tensor approaches. Although our focus is on establishing the utility of the scheme in 2-D settings in this paper, the approach can be readily translated to higher dimensional applications. Another benefit is the implicit spatial regularization brought in by the convolutional network as discussed for DIP. We now introduce novel regularization priors on the network and the latent vectors to further constrain the recovery to reduce the need for manual early stopping.

B. Distance/Network Regularization

As in the case of analysis SToRM regularization [8], [10], our interest is in generating a manifold model that preserves distances. Specifically, we would like the nearby points in the latent space to map to similar images on the manifold. With this interest, we now study the relation between the Euclidean distances between their latent vectors and the shortest distance between the points on the manifold (geodesic distance).

Figure 5:
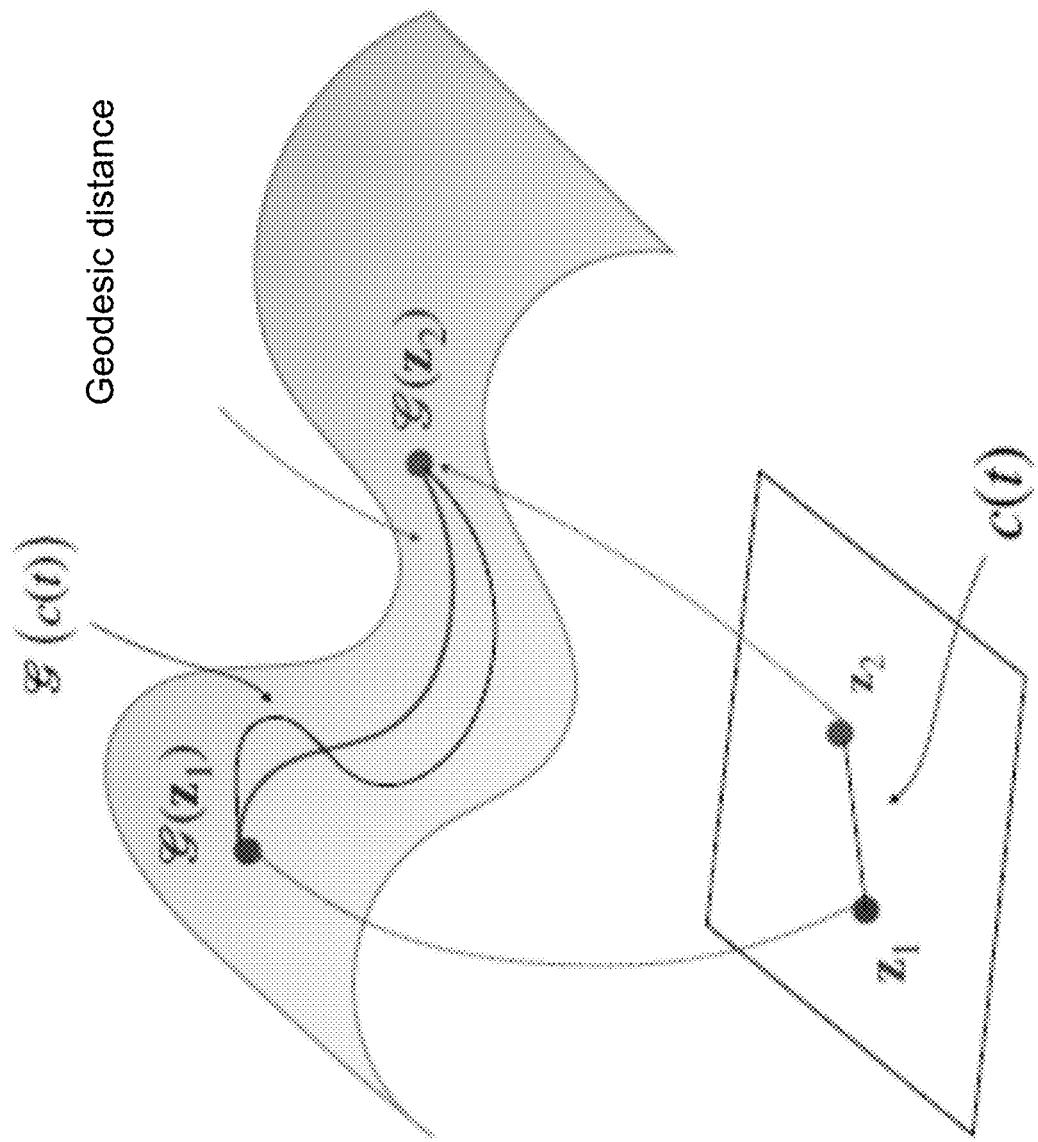
FIG. 5 illustrates the distance penalty. The length of the curve connecting the images corresponding to z_1 and z_2 depends on the Frobenius norm of the Jacobian of the mapping G as well as the Euclidean distance $\|z_1-z_2\|^2$. We are interested in learning a mapping that preserves distances; we would like nearby points in the latent space to map to similar images. We hence use the norm of the Jacobian as the regularization prior, with the goal of preserving distances.

We consider two points $z_1$ and $z_2$ in the latent space, which are fed to the generator to obtain $\mathcal{G}(z_1)$ and $\mathcal{G}(z_2)$, respectively. We have the following result, which relates the Euclidean distance $\|z_1 - z_2\|^2$ to the geodesic distance $\text{dist}_M(\mathcal{G}(z_1), \mathcal{G}(z_2))$ which is the shortest distance on the manifold. The setting is illustrated in FIG. 5, where the geodesic distance is indicated by the red curve.

Proposition 1. Let $z_1, z_2 \in \mathbb{R}^n$ be two nearby points in the latent space, with mappings denoted by $\mathcal{G}(z_1), \mathcal{G}(z_2) \in M$. Here, $M = \{G(z) | z \in \mathbb{R}^n\}$. Then, the geodesic distance on the manifold satisfies:

$$\text{dist}_M(\mathcal{G}(z_1), \mathcal{G}(z_2)) \leq \|z_1 - z_2\|_F \|J_z(\mathcal{G}(z_1))\|_F. \tag{8}$$

Proof. The straight-line between the latent vectors is denoted by $c(s)$, $s \in [0,1]$ with $c(0) = z_1$ and $c(1) = z_2$. We also assume that the line is described in its curvilinear abscissa, which implies $\|c'(s)\| = 1$; $\forall_s \in [0,1]$. We note that $\mathcal{G}$ may map to the black curve, which may be longer than the geodesic distance. We now compute the length of the black curve $\mathcal{G}[c(s)]$ as $$d = \int_0^1 \|\nabla_s \mathcal{G}[c(s)]\| ds. \tag{9}$$

Using the chain rule and denoting the Jacobian matrix of $\mathcal{G}$ by $J_z$, we can simplify the above distance as $$d = \int_0^1 \|J_z(\mathcal{G})c'(s)\|_F ds \leq \int_0^1 \|J_z(\mathcal{G})\|_F \underbrace{\|c'(s)\|_F}_{1} ds = \|J_z(\mathcal{G}[z_1])\|_F \underbrace{\int_0^1 ds}_{\|z_1 - z_2\|}. \tag{10}$$

We used the Cauchy-Schwartz inequality in the second step and in the last step, we use the fact that $J_z(\mathcal{G})(c(t)) = J_z \mathcal{O}(z_1) + \mathcal{O}(t)$ when the points $z_1$ and $z_2$ are close. Since the geodesic distance is the shortest distance on the manifold, we have $\text{dist}_M(\mathcal{G}(z_1), \mathcal{G}(z_2)) \leq d$ and hence we obtain (8).

The result in (8) shows that the Frobenius norm of the Jacobian matrix $\|J_z \mathcal{G}\|$ controls how far apart $\mathcal{G}$ maps two vectors that are close in the latent space. We would like points that are close in the latent space map to nearby points on the manifold. We hence use the gradient of the map:

$$R_{distance} = \|J_z(\mathcal{G}(z))\|_F^2 \tag{11}$$

as a regularization penalty. We note that the above penalty will also encourage the learning of a mapping $\mathcal{G}$ such that the length of curve $\mathcal{G}(c(t))$ is the geodesic distance. We note that the above penalty can also be thought of as a network regularization. Similar gradient penalties are used in machine learning to improve generalization ability and to improve the robustness to adversarial attacks [38]. The use of gradient penalty is observed to be qualitatively equivalent to penalizing the norm of the weights of the network.

C. Latent Vector Regularization Penalty

The time frames in a dynamic time series have extensive redundancy between adjacent frames, which is usually capitalized by temporal gradient regularization. Directly penalizing the temporal gradient norm of the images requires the computation of the entire image time series, which is difficult when the entire image time series is not optimized in every batch. We consider the norm of the finite differences between images specified by $\|\nabla_p G[z_p]\|^2$. Using Taylor series expansion, we obtain $\nabla_p G[z_p] = J_z(\mathcal{G}[z]) \nabla_p z + \mathcal{O}(p)$. We thus have $$\|\nabla_p \mathcal{G}[z_p]\| \approx \|J_z(\mathcal{G}[z]) \nabla_p z\| \leq \|J_z(\mathcal{G}[z])\| \|\nabla_p z\|. \tag{12}$$

Since $J_z(\mathcal{G}[z])$ is small because of the distance regularization, we propose to add a temporal regularizer on the latent vectors. For example, when applied to free-breathing cardiac MRI, we expect the latent vectors to capture the two main contributors of motion: cardiac motion and respiratory motion. The temporal regularization encourages the cardiac and respiratory phases change slowly in time.

D. Proposed Optimization Criterion

Based on the above analysis, we derive the parameters of the network $\theta$ and the low-dimensional latent vectors $z_i$; $i = 1, \ldots, M$ from the measured data by minimizing:

$$C(z, \theta) = \sum_{i=1}^N \|A_i(G_\theta[z_i]) - b\|^2 + \lambda_1 \underbrace{\|J_z \mathcal{G}_\theta[z_i]\|^2}_{\text{distance regularization}} + \lambda_2 \underbrace{\|\nabla_t z_i\|^2}_{\text{latent regularization}} \tag{13}$$

$$\underbrace{\phantom{\sum_{i=1}^N \|A_i(G_\theta[z_i]) - b\|^2}}_{\text{data term}}$$

with respect to z and $\theta$. We use the ADAM optimization to determine the optimal parameters, and random initialization is used for the network parameters and latent variables.

A potential challenge with directly solving (13) is its high computational complexity. Unlike supervised neural network approaches that offer fast inference, the proposed approach optimizes the network parameters based on the measured data. This strategy will amount to a long reconstruction time when there are several image frames in the time series.

E. Strategies to Reduce Computational Complexity

To minimize the computational complexity, we now introduce some approximation strategies.

1) Approximate data term for accelerated convergence: When the data is measured using non-Cartesian sampling schemes, M non-uniform fast Fourier transform (NUFFT) evaluations are needed for the evaluation of the data term, where M is the number of frames in the dataset. Similarly, M inverse non-uniform fast Fourier transform (INUFFT) evaluations are needed for each back-propagation step. These NUFFT evaluations are computationally expensive, resulting in slow algorithms. In addition, most non-Cartesian imaging schemes over-sample the center of k-space. Since the least-square loss function in (5) weights errors in the center of k-space higher than in outer k-space regions, it is associated with slow convergence.

To speed up the intermediate computations, we propose to use gridding with density compensation, together with a projection step for the initial iterations. Specifically, we will use the approximate data term $$D(z,\theta)=\sum_{i=1}^{M}|\mathcal{P}_i(\mathcal{G}_\theta[z_i]-g_i)\|^2 \quad (14)$$

instead of $\sum_{i=1}^{M}\|A_i(\mathcal{G}[z_i]-b_i)\|^2$ in early iterations to speed up the computations. Here, $g_i$ are the gridding reconstructions $$g_i=(A_i^H A_i)^\dagger A_i^H b_i \approx A_i^H \mathcal{W} b, \quad (15)$$

where, $\mathcal{W}$ are diagonal matrices corresponding to multiplication by density compensation factors. The operators $P_i$ in (14) are projection operators:

$$P_i x=(A_i^H A_i)^\dagger (A_i^H A_i)x \approx (A_i^H \mathcal{W} A_i)x \quad (16)$$

We note that the term $(A_i^H \mathcal{W} A_i) x$ can be efficiently computed using Toeplitz embedding, which eliminates the need for expensive NUFFT and INUFFT steps. In addition, the use of the density compensation serves as a preconditioner, resulting in faster convergence. Once the algorithm has approximately converged, we switch the loss term back to (5) since it is optimal in a maximum likelihood perspective.

2) Progressive training-in-time: To further speed up the algorithm, we introduce a progressive training strategy, which is similar to multi-resolution strategies used in image processing. In particular, we start with a single frame obtained by pooling the measured data from all the time frames. Since this average frame is well-sampled, the algorithm promptly converges to the optimal solution. The corresponding network serves as a good initialization for the next step. Following convergence, we increase the number of frames. The optimal θ parameters from the previous step are used to initialize the generator, while the latent vector is initialized by the interpolated version of the latent vector at the previous step.

Figure 6:
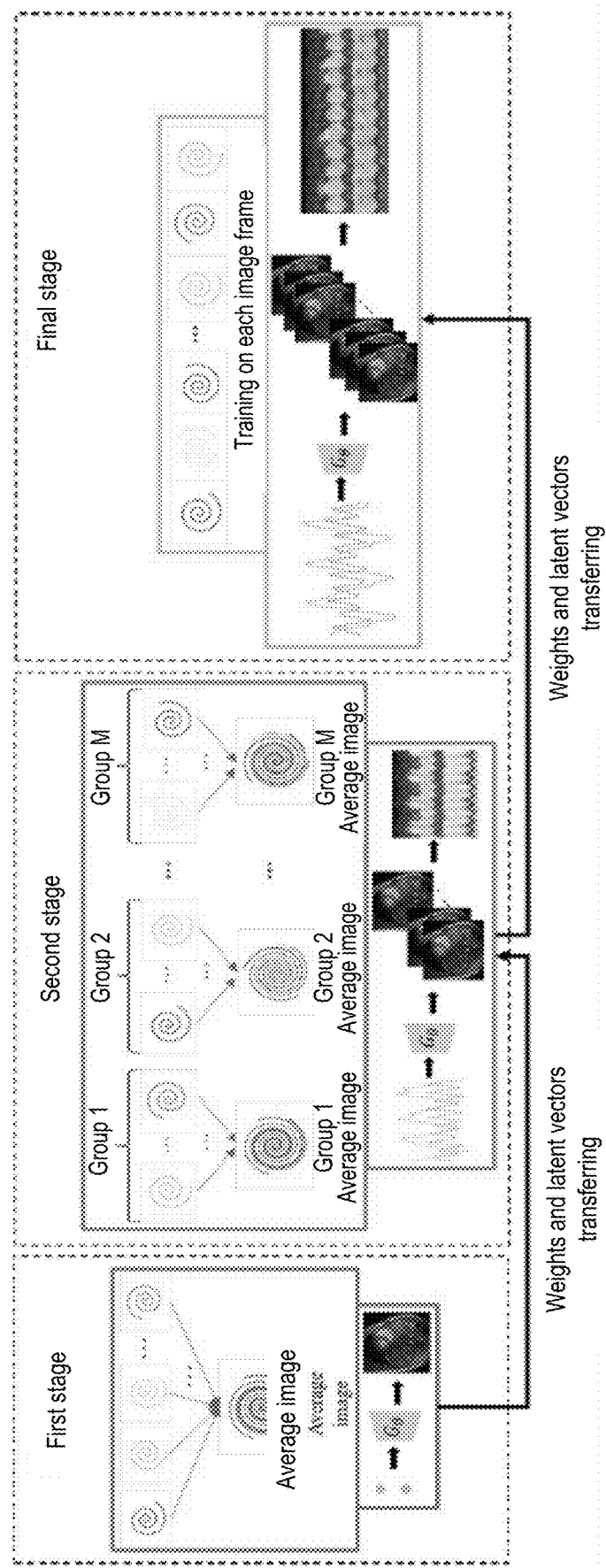
FIG. 6 illustrates the progressive training-in-time approach. In the first level of training, the k-space data of all the frames are binned into one and we try to solve for the average image in this level. Upon the convergence of the first step, the parameters and latent variables are transferred as the initialization of the second step. In the second level of training, we divide the k-space data into M groups and try to reconstruct the M average images. Following the convergence, we can move to the final level of training, where the parameters obtained in the second step and the linear interpolation of the latent vectors in the second step are chosen as the initializations of the final step of training.

This process is repeated until the desired number of frames is reached. This progressive training-in-time approach significantly reduces the computational complexity of the proposed algorithm. In this work, we used a three-step algorithm. However, the number of steps (levels) of training can be chosen based on the dataset. This progressive training-in-time approach is illustrated in FIG. 6.

IV. Implementation Details and Datasets

A. Structure of the Generator

The structure of the generator used in this work is given in Table. I. The output images have two channels, which correspond to the real and imaginary parts of the MR images. Note that we have a parameter d in the network. This user defined parameter controls the size of the generator or, in other words, the number of trainable parameters in the generator. We also have a number $\ell(z)$ as a user-defined parameter. This parameter represents the number of elements in each latent vector. In this work, it is chosen as $\ell(z)=2$ as we have two motion patterns in cardiac images. We use leaky ReLU for all the non-linear activations, except at the output layer, where it is tan h activation.

TABLE 1

ARCHITECTURE OF THE GENERATOR $\mathcal{G}_\theta$. $\ell(z)$ MEANS THE NUMBER OF ELEMENTS IN EACH LATENT VECTOR.

| Input size | filter sz | # filters | Padding | Stride | Output size |
| --- | --- | --- | --- | --- | --- |
| 1 × 1 × $\ell(z)$ | 1 × 1 | 100 | 0 | 1 | 1 × 1 × 100 |
| 1 × 1 × 100 | 3 × 3 | 8d | 0 | 1 | 3 × 3 × 8d |
| 3 × 3 × 8d | 3 × 3 | 8d | 0 | 1 | 5 × 5 × 8d |
| 5 × 5 × 8d | 4 × 4 | 4d | 1 | 2 | 10 × 10 × 4d |
| 10 × 10 × 4d | 4 × 4 | 4d | 1 | 2 | 20 × 20 × 4d |
| 20 × 20 × 4d | 3 × 3 | 4d | 0 | 2 | 41 × 41 × 4d |
| 41 × 41 × 4d | 5 × 5 | 2d | 1 | 2 | 85 × 85 × 2d |
| 85 × 85 × 2d | 4 × 4 | d | 1 | 2 | 170 × 170 × d |
| 170 × 170 × d | 4 × 4 | d | 1 | 2 | 340 × 340 × d |
| 340 × 340 × d | 3 × 3 | 2 | 1 | 2 | 340 × 340 × 2 |

B. Datasets

This research study was conducted using data acquired from human subjects. The Institutional Review Board at the local institution (The University of Iowa) approved the acquisition of the data, and written consents were obtained from all subjects. The experiments reported in this paper are based on datasets collected in the free-breathing mode using the golden angle spiral trajectory. We acquired eight datasets on a GE 3 T scanner. One dataset was used to identify the optimal hyperparameters of all the algorithms in the proposed scheme. We then used the hyperparameters to generate the experimental results for all the remaining datasets reported in this paper. The sequence parameters for the datasets are: TR=8.4 ms, FOV=320 mm×320 mm, flip angle=18°, slice thickness=8 mm. The datasets were acquired using a cardiac multichannel array with 34 channels. We used an automatic algorithm to pre-select the eight best coils, that provide the best signal to noise ratio in the region of interest. The removal of the coils with low sensitivities provided improved reconstructions [39]. We used a PCA-based coil combination using SVD such that the approximation error <5%. We then estimated the coil sensitivity maps based on these virtual channels using the method of Walsh et al. [40] and assumed they were constant over time. For each dataset in this research, we binned the data from six spiral interleaves corresponding to 50 ms temporal resolution. If a Cartesian acquisition scheme with TR=3:5 ms were used, this would correspond to ≈14 lines/frame; with a 340×340 matrix, this corresponds roughly to an acceleration factor of 24. Moreover, each dataset has more than 500 frames. During reconstruction, we omit the first 20 frames in each dataset and use the next 500 frames for SToRM reconstructions; this is then used as the simulated ground truth for comparisons. The experiments were run on a machine with an Intel Xeon CPU at 2.40 GHz and a Tesla P100-PCIE 16 GB GPU. The source code for the proposed Gen-SToRM scheme can be downloaded from this link: https://github.com/qing-zou/Gen-SToRM.

C. Quality Evaluation Metric

In this work, the quantitative comparisons are made using the Signal-to-Error Ratio (SER) metric (in addition to the standard Peak Signal-to-Noise Ratio (PSNR) and the Structural Similarity Index Measure (SSIM)) defined as:

$$SER = 20 \cdot \log_{10} \frac{\|x_{orig}\|}{\|x_{orig} - x_{recon}\|}.$$

Here $x_{orig}$ and $x_{recon}$ represent the ground truth and the reconstructed image. The unit for SER is decibel (dB). The SER metric requires a reference image, which is chosen as the SToRM reconstruction with 500 frames. However, we note that this reference may be imperfect and may suffer from blurring and related artifacts. Hence, we consider the Blind/referenceless Image Spatial Quality Evaluator (BRISQUE) [41] to evaluate the score of the image quality. The BRISQUE score is a perceptual score based on the support vector regression model trained on an image database with corresponding differential mean opinion score values. The training image dataset contains images with different distortions. A smaller score indicates better perceptual quality.

D. State-of-the-Art Methods for Comparison

We compare the proposed scheme with the recent state-of-the-art methods for free-breathing and ungated cardiac MRI. We note that while there are many deep learning algorithms for static MRI, those methods are not readily applicable to our setting.

Analysis SToRM [9], [10], published in 2020: The manifold Laplacian matrix is estimated from k-space navigators using kernel low-rank regularization, followed by solving for the images using (4).

Time-DIP [33] implementation based on the arXiv form at the submission of this article: This is an unsupervised learning scheme, that fixes the latent variables as noise and solves for the generator parameters. For real-time applications, Time-DIP chooses a preset period, and the noise vectors of the frames corresponding to the multiples of the period were chosen as independent Gaussian variables [33]. The latent variables of the intermediate frames were obtained using linear interpolation. We chose a period of 20 frames, which roughly corresponds to the period of the heart beats.

Low-rank [2]: The image frames in the time series are recovered using the nuclear norm minimization.

E. Hyperparameter Tuning

We used one of the acquired datasets to identify the hyperparameters of the proposed scheme. Since we do not have access to the fully-sampled dataset, we used the SToRM reconstructions from 500 images (acquisition time of 25 seconds) as a reference. The smoothness parameter λ of this method was manually selected as λ=0.01 to obtain the best recovery, as in the literature [9]. All of the comparisons relied on image recovery from 150 frames (acquisition time of 7.5 seconds). The hyperparameter tuning approach yielded the parameters d=40, $\lambda_1$=0.0005, and $\lambda_2$=2 for the proposed approach. We demonstrate the impact of tuning din FIG. 9, while the impact of choosing $\lambda_1$ and $\lambda_2$ is shown in FIG. 7. The hyperparameter optimization of SToRM from 150 frames resulted in the optimal smoothness parameter λ=0.0075. For Time-DIP, we follow the design of the network shown by Jin et al. [33], where the generator consists of multiple layers of convolution and upsampling operations. To ensure fair comparison, we used a similar architecture, where the base size of the network was tuned to obtain the best results. We use a three-step progressive training strategy. In the first step, the learning rate for the network is $1\times10^{-3}$ and 1000 epochs are used. For the second step of training, the learning rate for the network is $5\times10^{-4}$ and the learning rate for the latent variable is $5\times10^{-3}$. In this stage, 600 epochs are used. In the final step of training, the learning rate for the network is $5\times10^{-4}$, the learning rate for the latent variable is $1\times10^{-3}$, and 700 epoches are used.

V. Experiments and Results

A. Impact of Different Regularization Terms

Figure 7A:
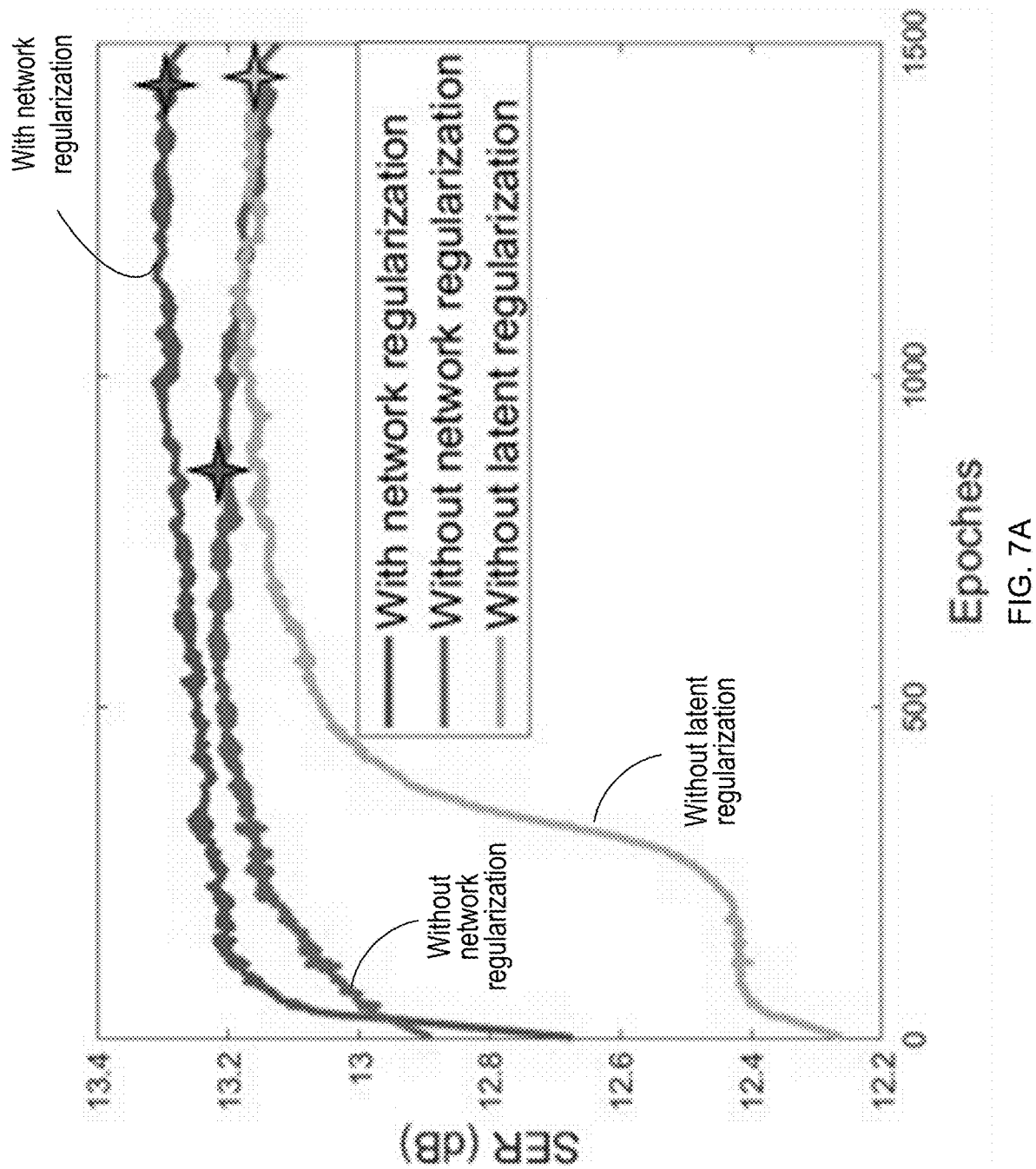
FIG. 7A, FIG. 7B, FIG. 7C, FIG. 7D, FIG. 7E illustrate the impact of the regularization terms in the proposed scheme with d=24. We considered three cases in the experiment: (1) using both regularizations, (2) using only latent regularization, and (3) using only network regularization; these correspond to the curves in (a).
Figure 7B:
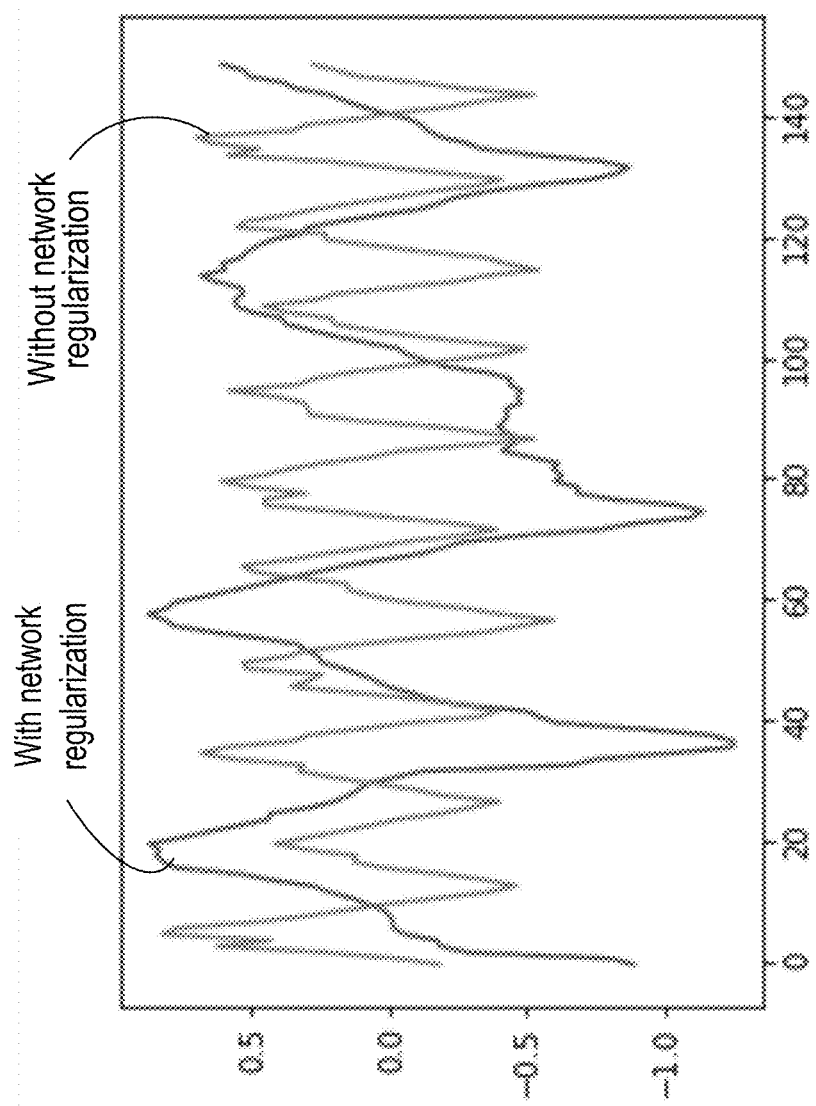
Figure 7C:
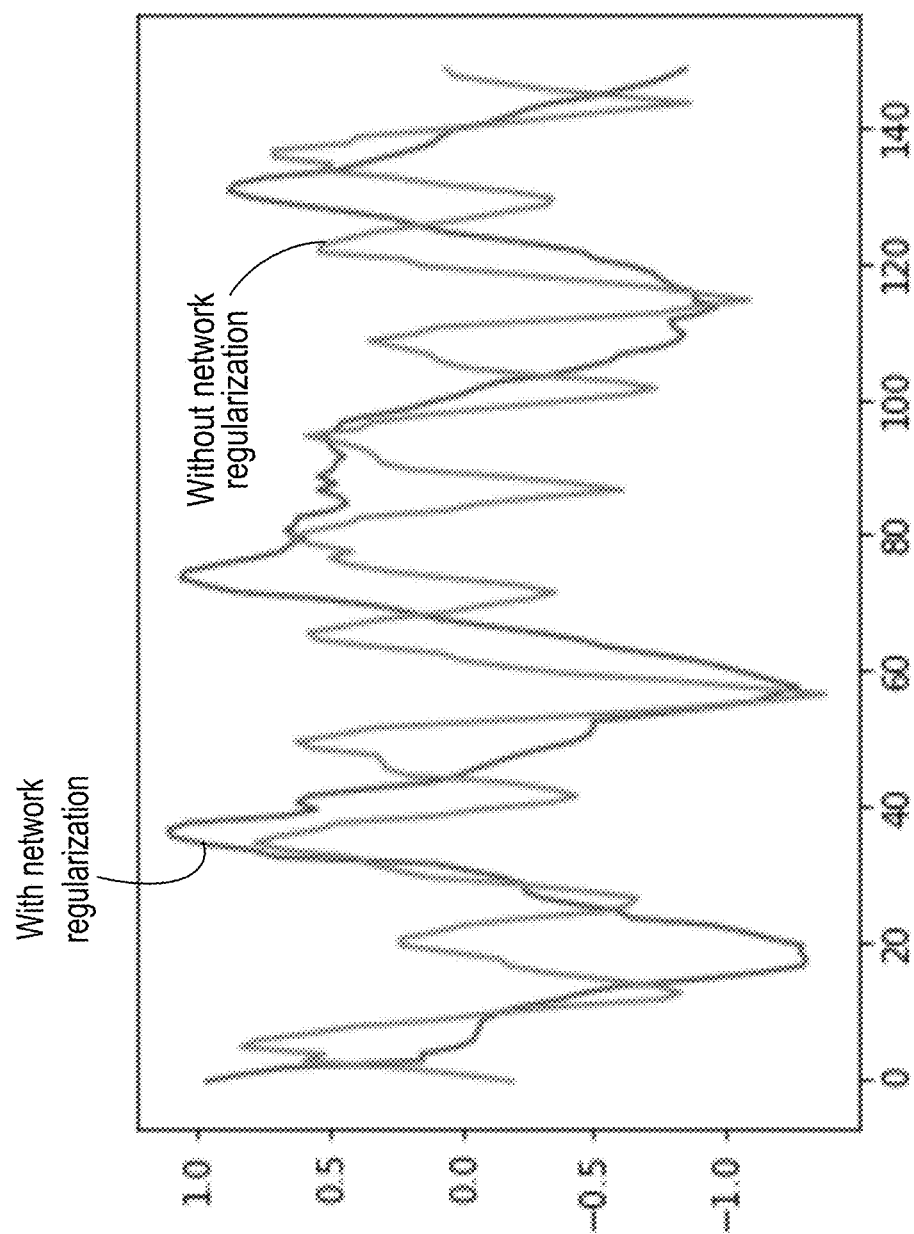
Figure 7D:
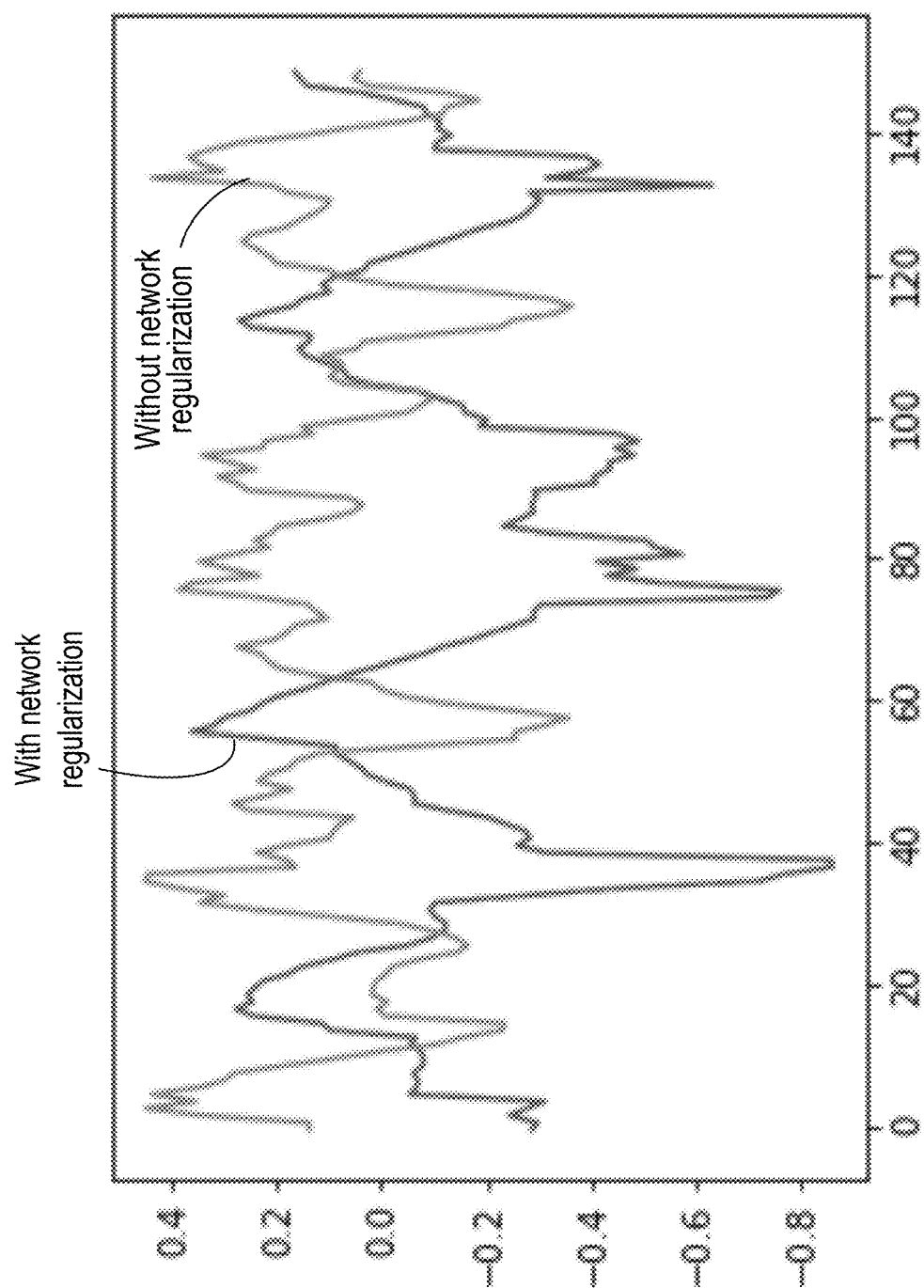
Figure 7E:
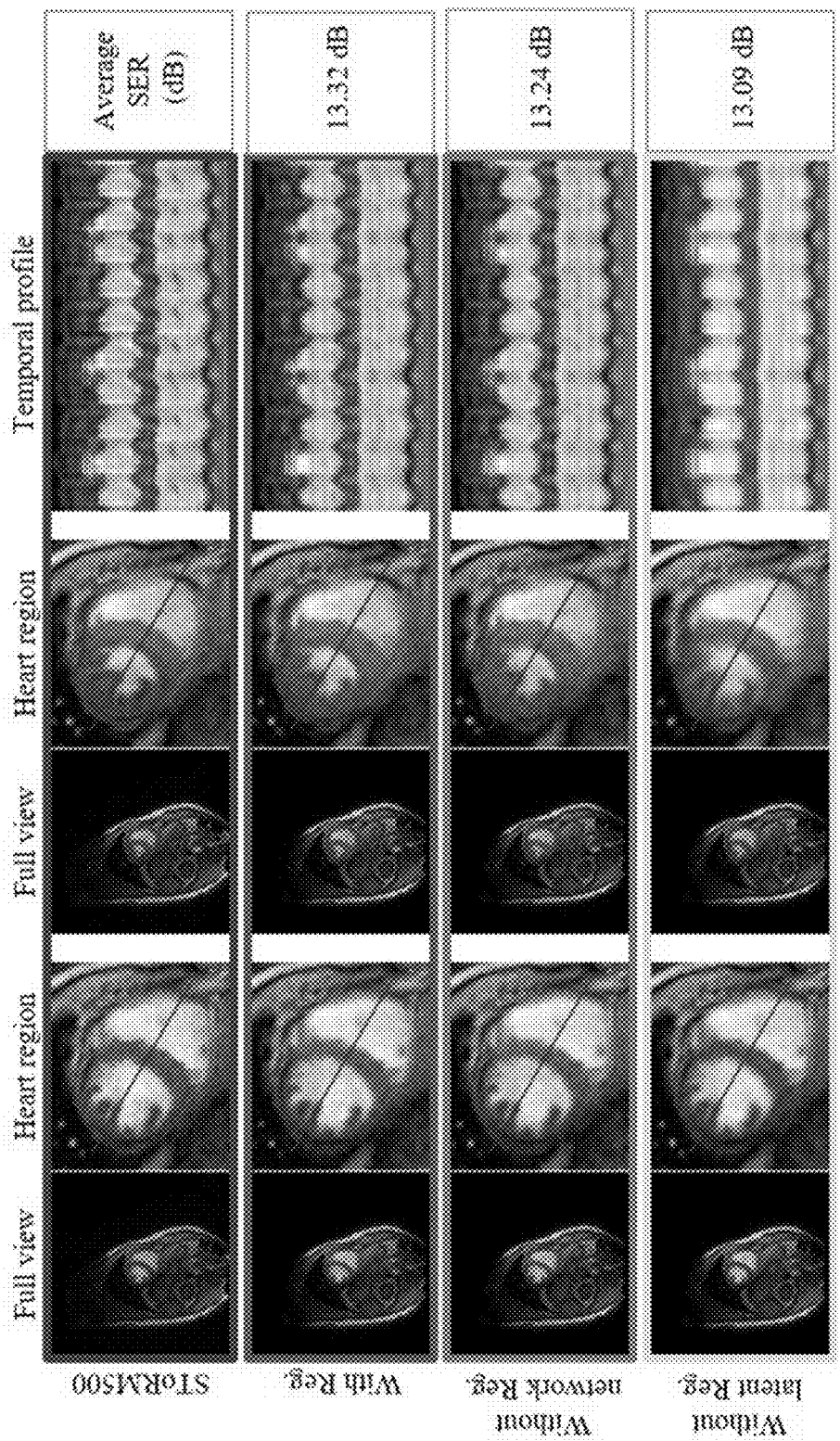

We first study the impact of the two regularization terms in (13). The parameter d corresponding to the size of the network (see Table I) was chosen as d=24 in this case. In FIG. 7A, we plot the reconstruction performance with respect to the number of epochs for three scenarios: (1) using both regularization terms; (2) using only latent regularization; and (3) using only distance/network regularization. In the experiment, we use 500 frames of SToRM (~25 seconds of acquisition) reconstructions, which is called "SToRM500", as the reference for SER computations. We tested the reconstruction performance for the three scenarios using 150 frames, which corresponds to around 7.5 seconds of acquisition. From the plot, we observe that without using the network regularization, the SER degrades with increasing epoches, which is similar to that of DIP. In this case, an early stopping strategy is needed to obtain good recovery. The latent vectors corresponding to this setting are shown in FIG. 7C, which shows mixing between cardiac and respiratory waveforms. When latent regularization is not used, we observe that the SER plot is roughly flat, but the latent variables show quite significant mixing, which translates to blurred reconstructions. By contrast, when both network and latent regularizations are used, the algorithm converges to a better solution. We also note that the latent variables are well decoupled; the blue curve captures the respiratory motion, while the orange one captures the cardiac motion. We also observe that the reconstructions agree well with the SToRM reconstructions. The network now learns meaningful mappings, which translate to improved reconstructions when compared to the reconstructions obtained without using the regularizers.

B. Benefit of Progressive Training-in-Time Approach

Figure 8:
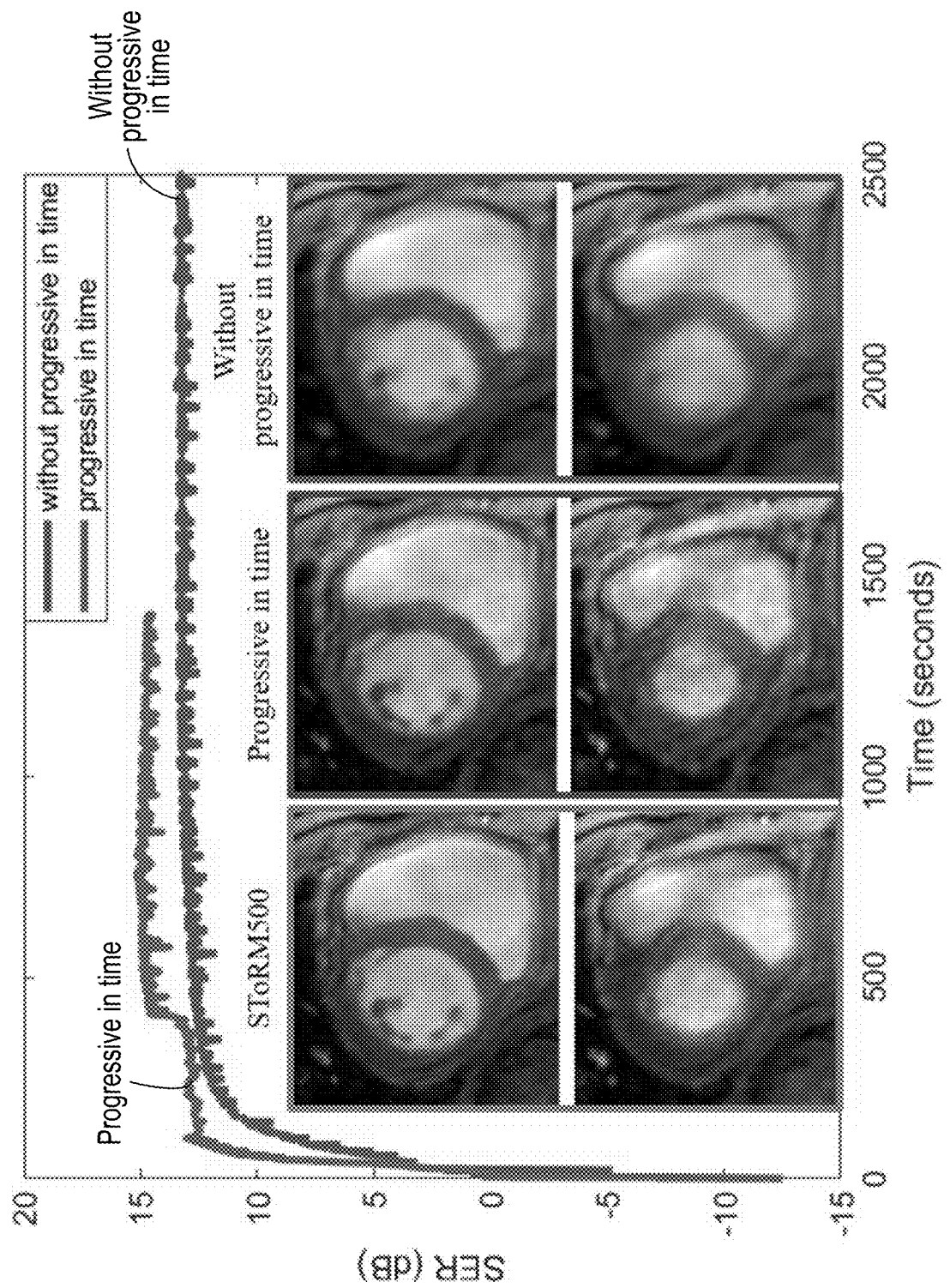
FIG. 8 compares the reconstruction performance with and without the progressive training-in-time strategy using d=40. From the plot of SER vs. running time, we can see that the progressive training-in-time approach yields better results with much less running time comparing to the training without using progressive training-in-time. Two reconstructed frames near the end of systole and diastole using SToRM500, the proposed scheme with progressive training-in-time and the proposed scheme without using the progressive training-in-time are shown in the plot as well for comparison purposes. The average Brisque scores for SToRM500, the reconstruction with progressive training-in-time, and the reconstruction without progressive training-in-time are 36.4; 37.3 and 39.1 respectively.

In FIG. 8, we demonstrate the significant reduction in runtime offered by the progressive training strategy described in Section III-E2. Here, we consider the recovery from 150 frames with and without the progressive strategy. Both regularization priors were used in this strategy, and d was chosen as 24. We plot the reconstruction performance, measured by the SER with respect to the running time. The SER plots show that the proposed scheme converges in around ≈200 seconds, while the direct approach takes more than 2000 seconds. We also note from the SER plots that the solution obtained using progressive training is superior to the one without progressive training.

C. Impact of Size of the Network

Figure 9:
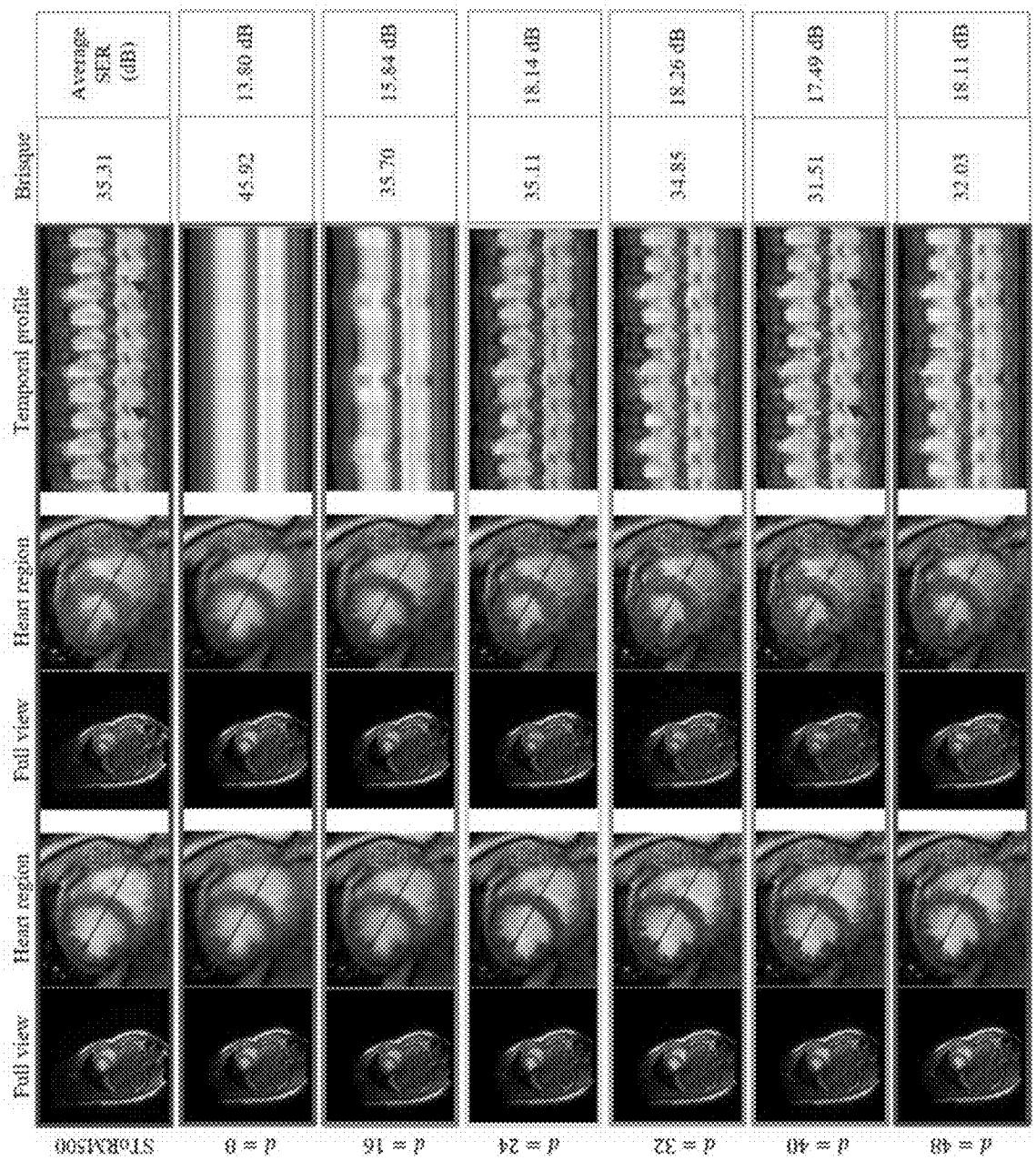
FIG. 9 shows the impact of network size on reconstruction performance. In the experiments, we chose d=8, 16, 24, 32, 40 and 48 to investigate the reconstruction performance. We used 500 frames for SToRM reconstructions (SToRM500) as the reference for SER comparisons. For the investigation of the impact of network size on the reconstructions, we used 150 frames. The diastolic and systolic states and the temporal profiles are shown in the figure for each case. The Brisque scores and average SER are also reported. It is worth noting that when d=40, the results are even less blurred than the SToRM500 results, even though only one-third of the data are used.

The architecture of the generator $\mathcal{G}_\theta$ is given in Table I. Note that the size of the network is controlled by the user-defined parameter d, which dictates the number of convolution filters and hence the number of trainable parameters in the network. In this section, we investigate the impact of the user-defined parameter d on the reconstruction performance. We tested the reconstruction performance using d=8; 16; 24; 32; 40, and 48, and the obtained results are shown in FIG. 9. From the figure, we see that when d=8 or d=16, the generator network is too small to capture the dynamic variations. When d=8, the generator is unable to capture both cardiac motion and respiratory motion. When d=16, part of the respiratory motion is recovered, while the cardiac motion is still lost. The best SER scores with respect to SToRM with 500 frames is obtained for d=24, while the lowest Brisque scores are obtained for d=40. We also observe that the features including papillary muscles and myocardium in the d=40 results appear sharper than those of SToRM with 500 frames, even though the proposed reconstructions were only performed from 150 frames. We use d=40 for the subsequent comparisons in the paper.

D. Comparison With the State-of-the-Art Methods

In this section, we compare our proposed scheme with several state-of-the-art methods for the reconstruction of dynamic images.

Figure 10A:
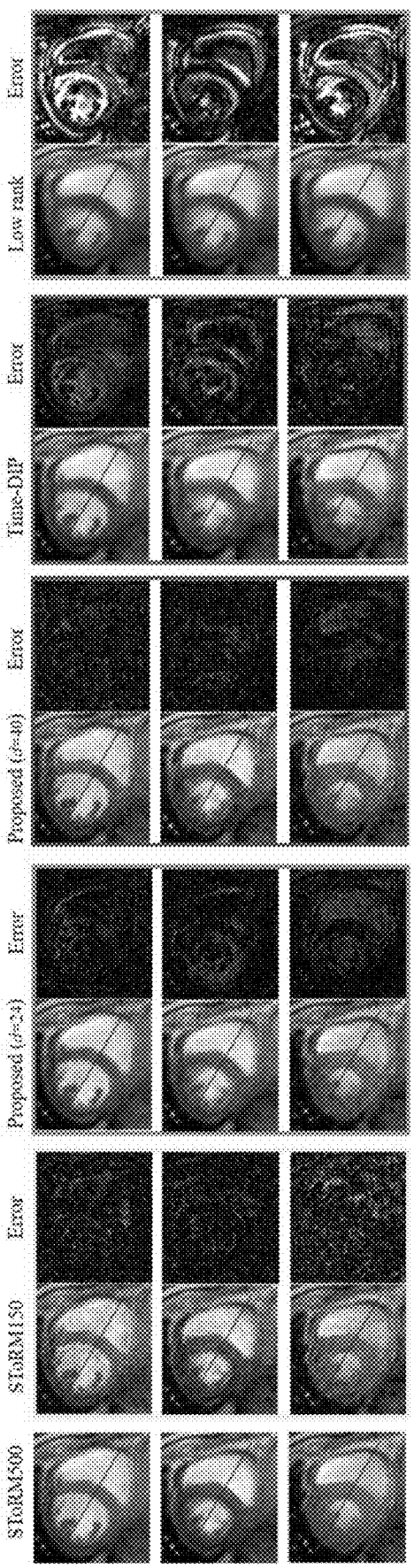
FIG. 10A and FIG. 10B compare with the state-of-the-art methods. The first column of FIG. 10A corresponds to the reconstructions from 500 frames (~25 s of acquisition time), while the rest of the columns are recovered from 150 frames (~7.5 s of acquisition time). The top row of FIG. 10A corresponds to the diastole phase, while the third row is the diastole phase. The second row of FIG. 10A is an intermediate one.
Figure 10B:
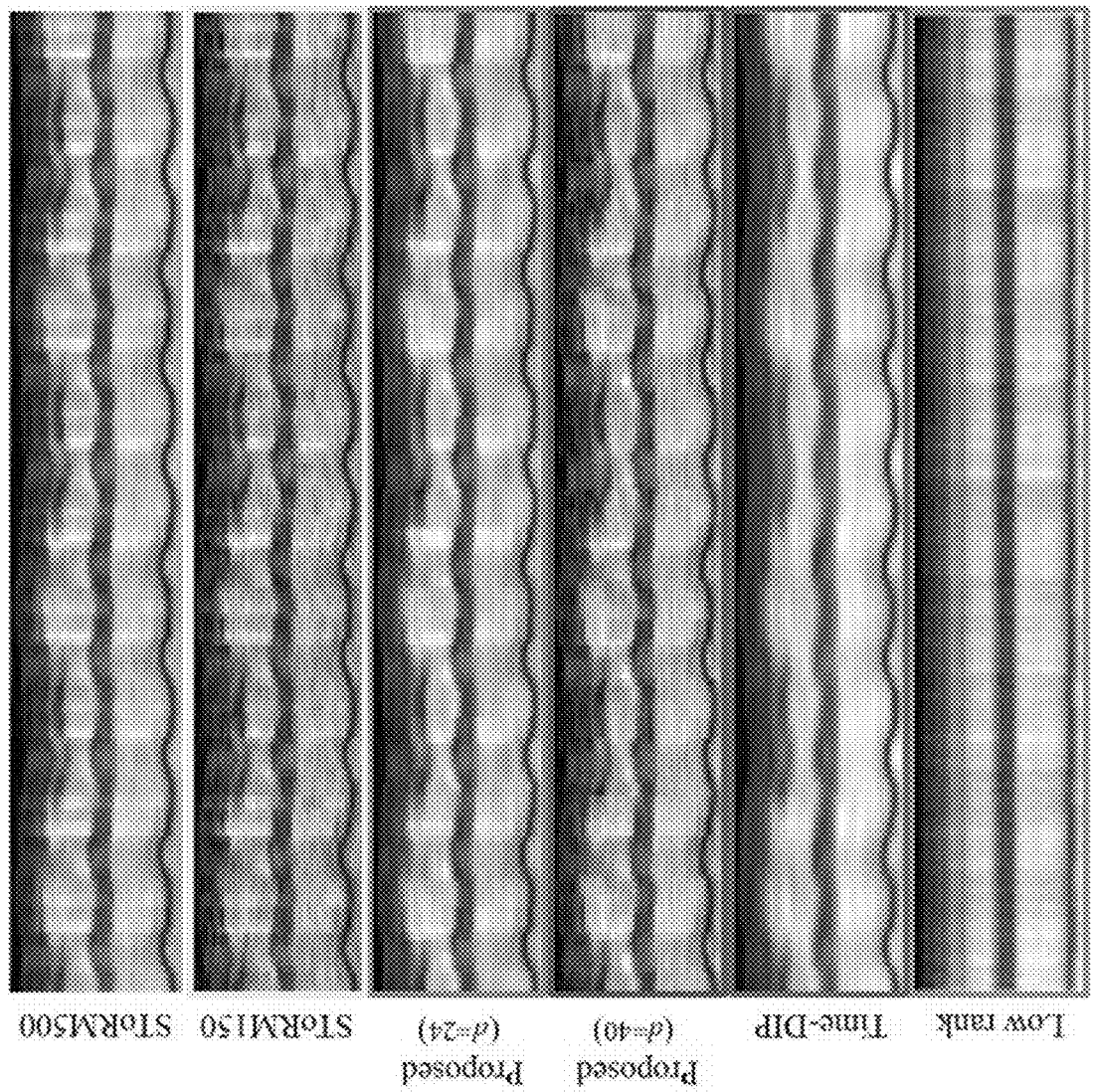

In FIG. 10, we compare the region of interest for SToRM500, SToRM with 150 frames (SToRM150), the proposed method with two different d values, the unsupervised Time-DIP approach, and the low-rank algorithm. From FIG. 10, we observe that the proposed scheme can significantly reduce errors in comparison to SToRM150. Additionally, the proposed scheme is able to capture the motion patterns better than Time-DIP, while the low-rank method is unable to capture the motion patterns.

TABLE II

QUANTITATIVE COMPARISONS BASED ON SIX DATASETS: WE USED SIX DATASETS TO OBTAIN THE AVERAGE SER, PSNR, SSIM, BRISQUE SCORE, AND TIME USED FOR RECONSTRUCTION.

| Methods | SToRM500 | SToRM150 | Propsed | Time-DIP |
|---|---|---|---|---|
| SER (dB) | NA | 17.3 | 18.2 | 16.7 |
| PSNR (dB) | NA | 32.7 | 33.5 | 32.0 |
| SSIM | NA | 0.86 | 0.89 | 0.87 |
| Brisque | 35.2 | 40.2 | 37.1 | 42.9 |
| Time (min) | 47 | 13 | 17 | 57 |

From the time profile in FIG. 10, we notice that the proposed scheme is capable of recovering the abrupt change in blood-pool contrast between diastole and systole. This is due to inflow effects associated with gradient echo (GRE) acquisitions. In particular, the blood from regions outside the slice enters the heart, which did not experience any of the former slice-selective excitation pulses; the differences in magnetization of the blood with no magnetization history, and that was within the slice, results in the abrupt change in intensity. We note that some of the competing methods such as Time-DIP and low-rank, blur these details.

Figure 11A:
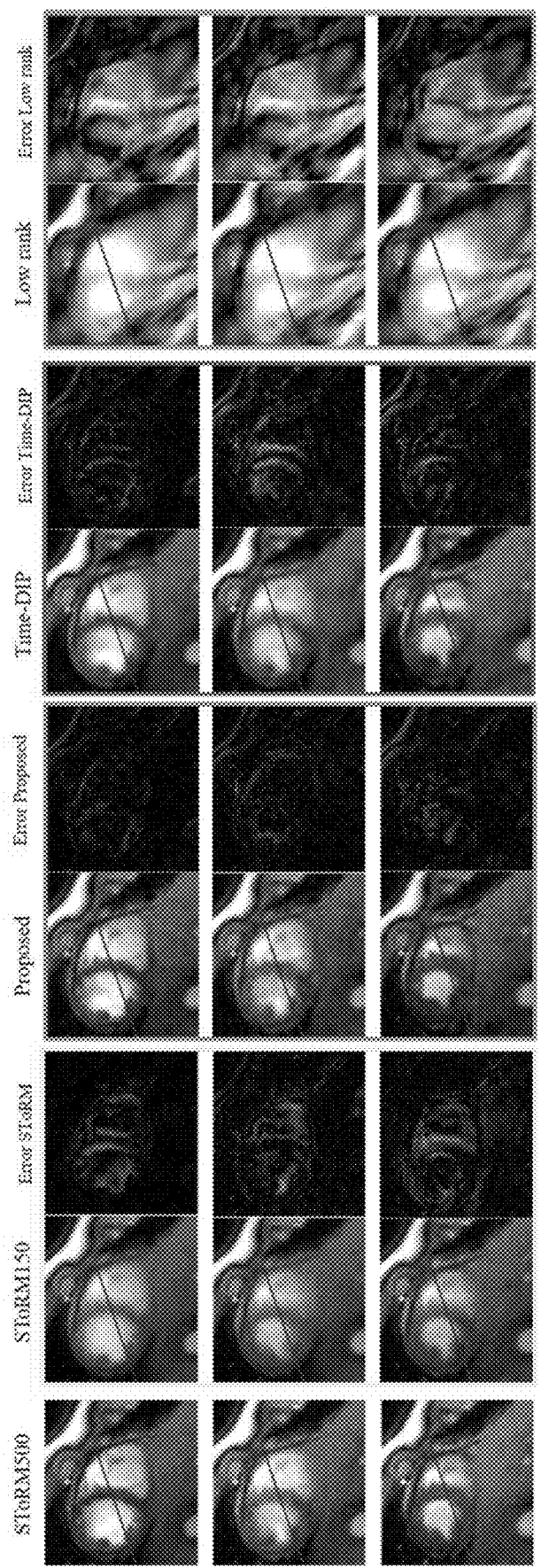
FIG. 11A, and FIG. 11B illustrate comparisons with the state-of-the-art methods. The first column of FIG. 11A corresponds to the reconstructions from 500 frames (~25 s of acquisition time), while the rest of the columns are recovered from 150 frames (~7.5 s of acquisition time). The top row of FIG. 11A corresponds to the diastole phase, while the third row is the diastole phase. The second row of FIG. 11A is an intermediate one.
Figure 11B:
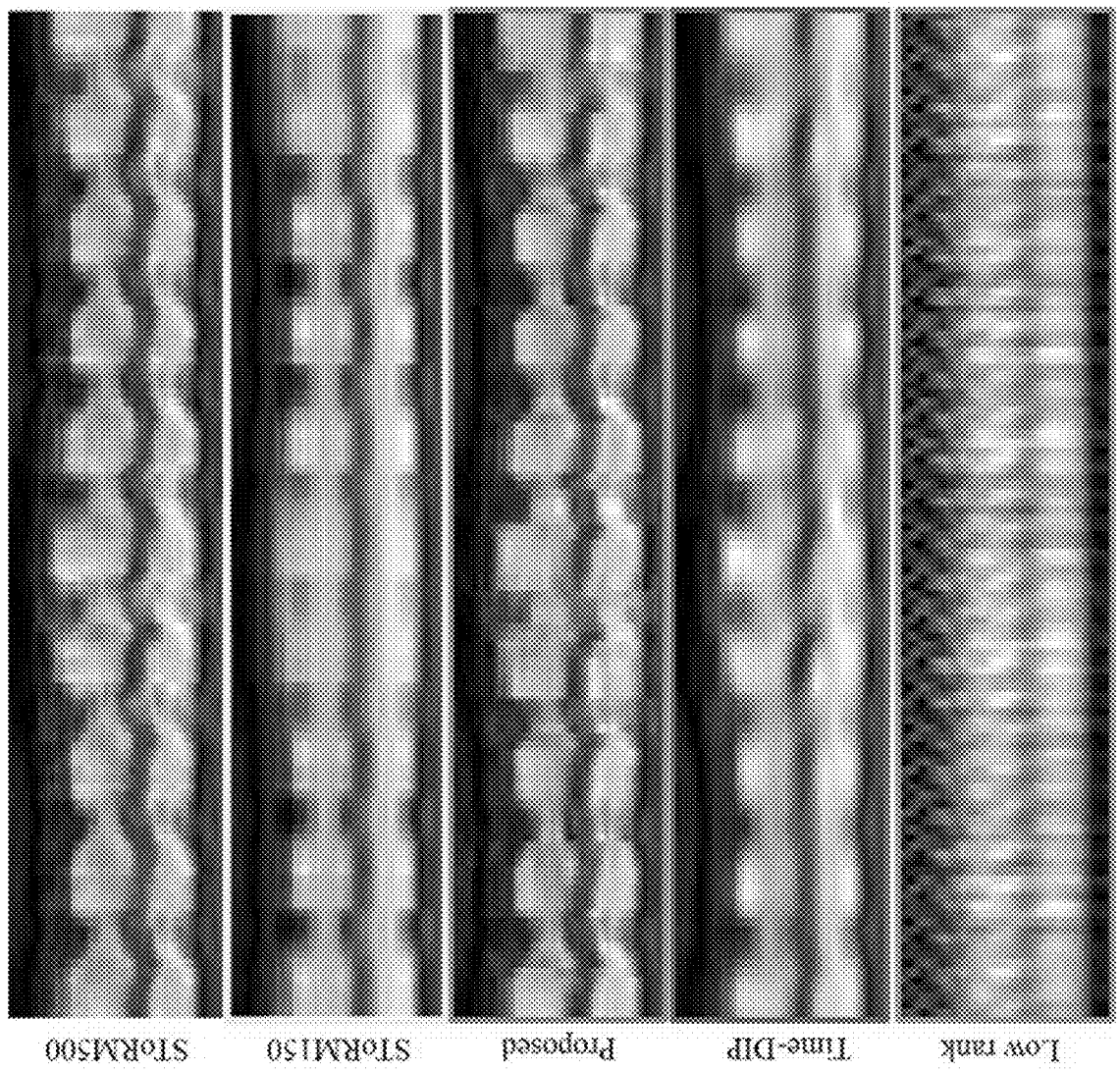
Figure 12A:
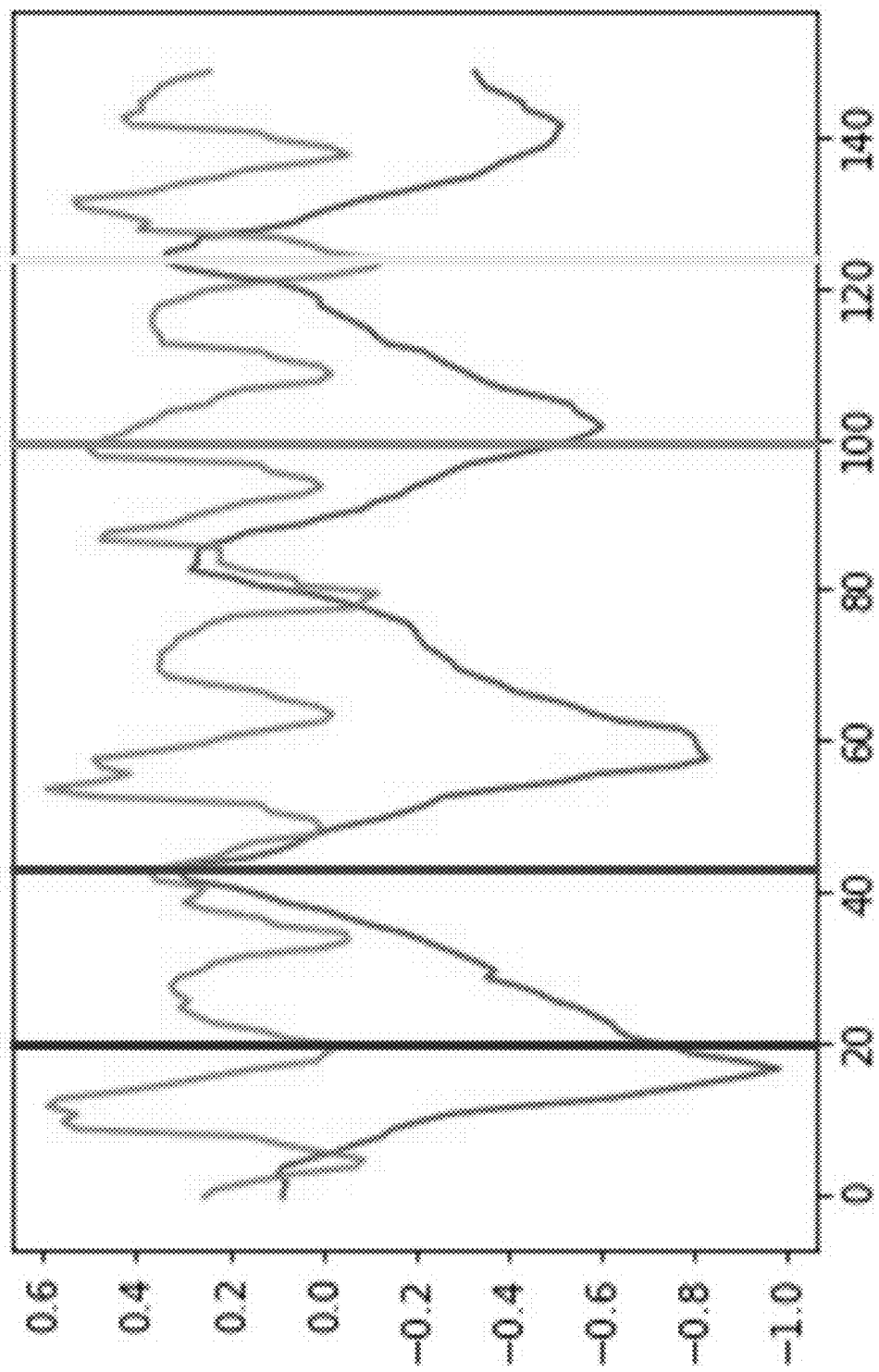
FIG. 12A, FIG. 12B, FIG. 12C, FIG. 12D and FIG. 12E illustrate the framework of the proposed scheme with d=40. We plot the latent variables of 150 frames in a time series on the first dataset. We showed four different phases in the time series: systole in End-Expiration (E-E), systole in End-Inspiration (E-I), diastole in End-Expiration (E-E), and diastole in End-Inspiration (E-I). A thin line surrounds the liver in the image frame to indicate the respiratory phase. The latent vectors corresponding to the four different phases are indicated in the plot of the latent vectors.
Figure 12C:
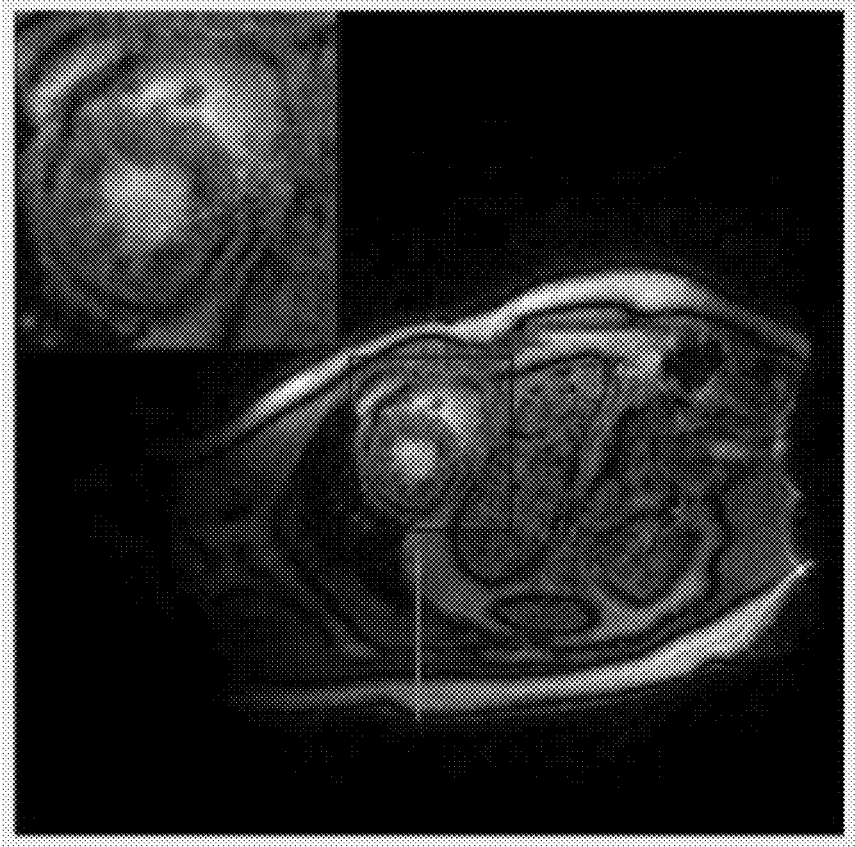
Figure 12B:
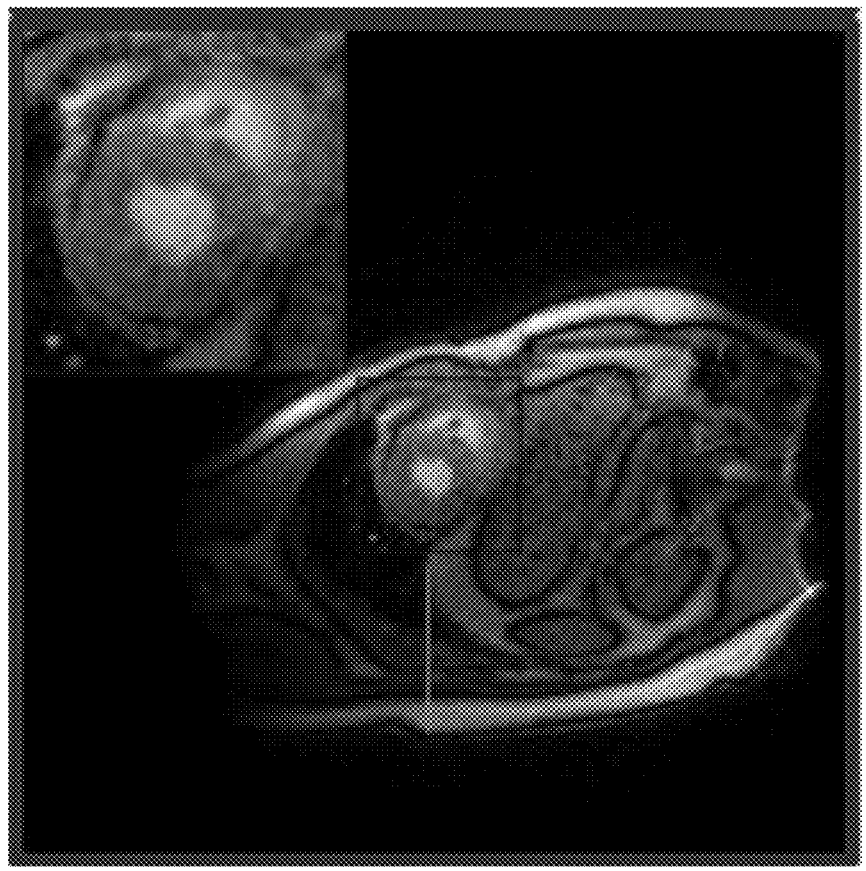
Figure 12E:
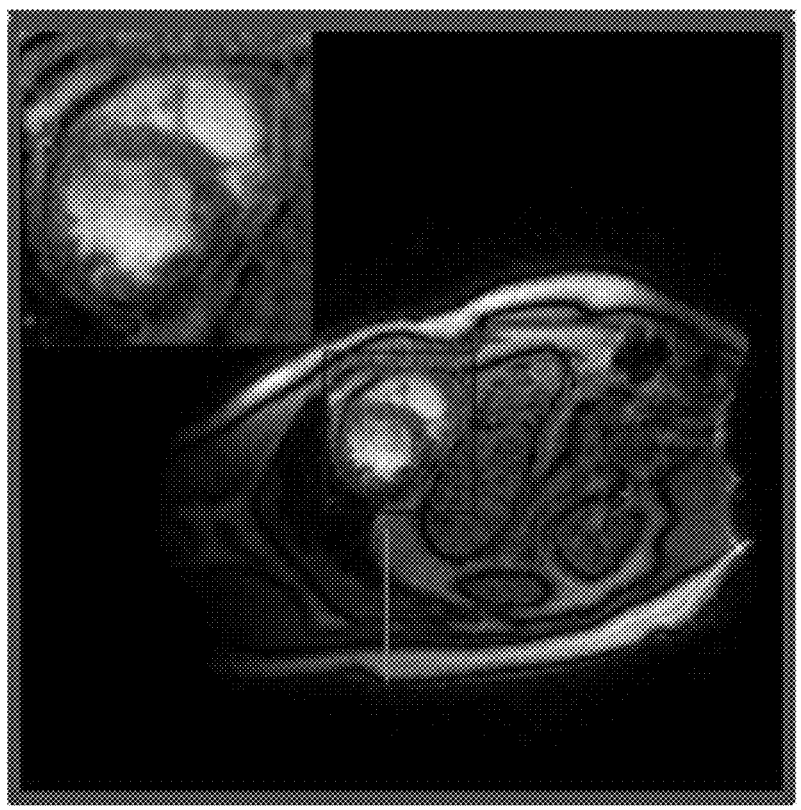
Figure 12D:
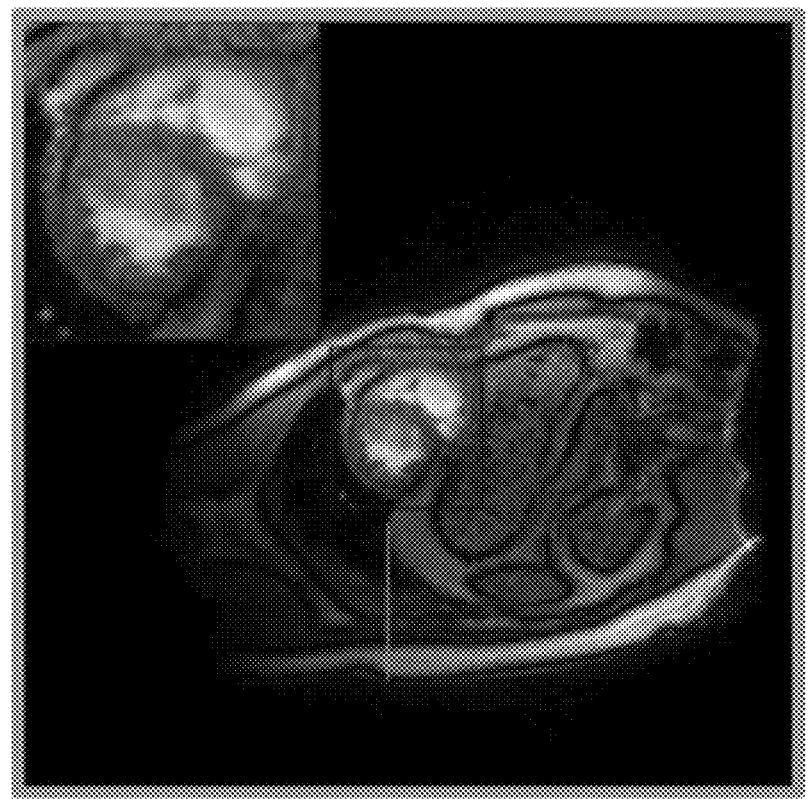
Figure 13A:
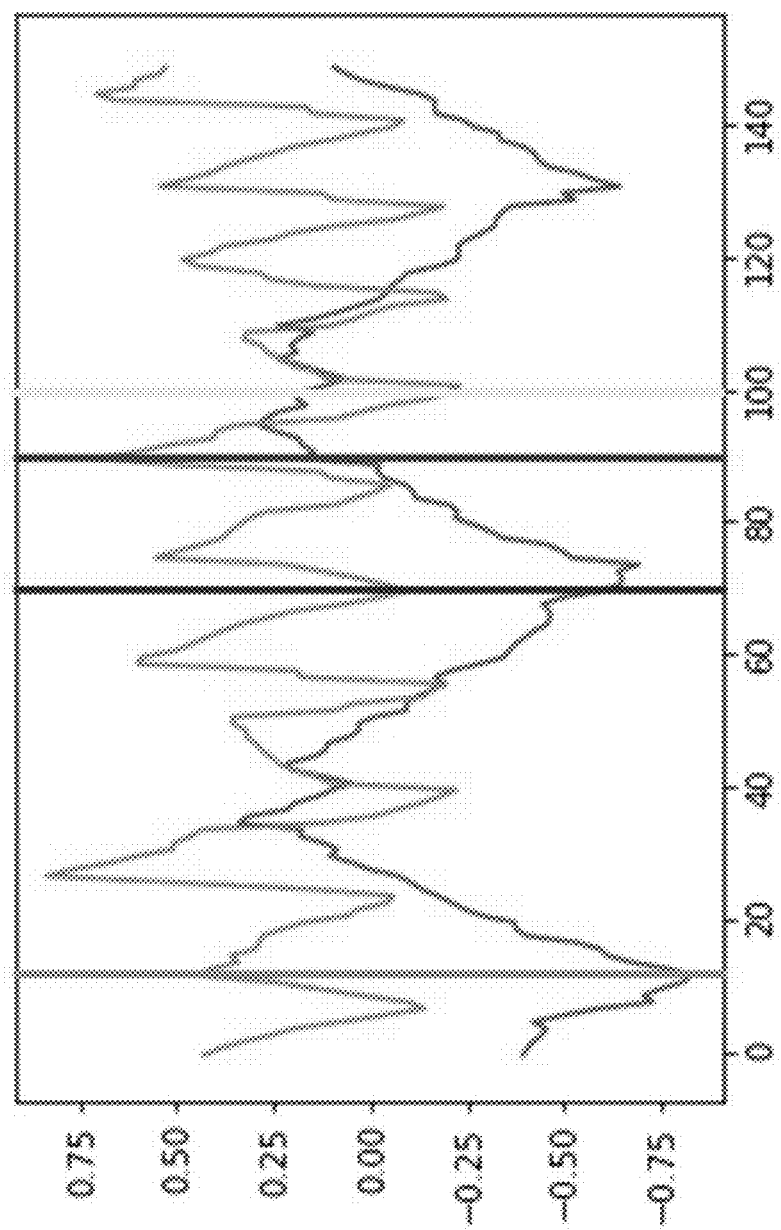
FIG. 13A, FIG. 13B, FIG. 13C, FIG. 13D, and FIG. 13E illustrate the framework of the proposed scheme with d=40. We plot the latent variables of 150 frames in a time series. We showed four different phases in the time series: systole in End-Expiration (E-E), systole in End-Inspiration (E-I), diastole in End-Expiration (E-E), and diastole in End-Inspiration (E-I). The latent vectors corresponding to the four different phases are indicated in the plot of the latent vectors.
Figure 13C:
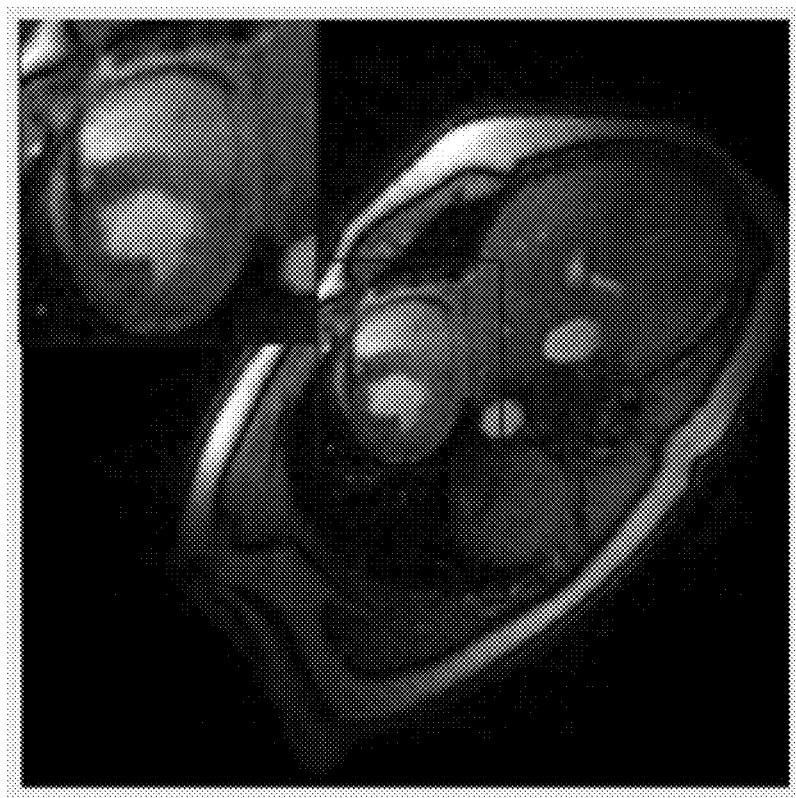
Figure 13B:
Figure 13E:
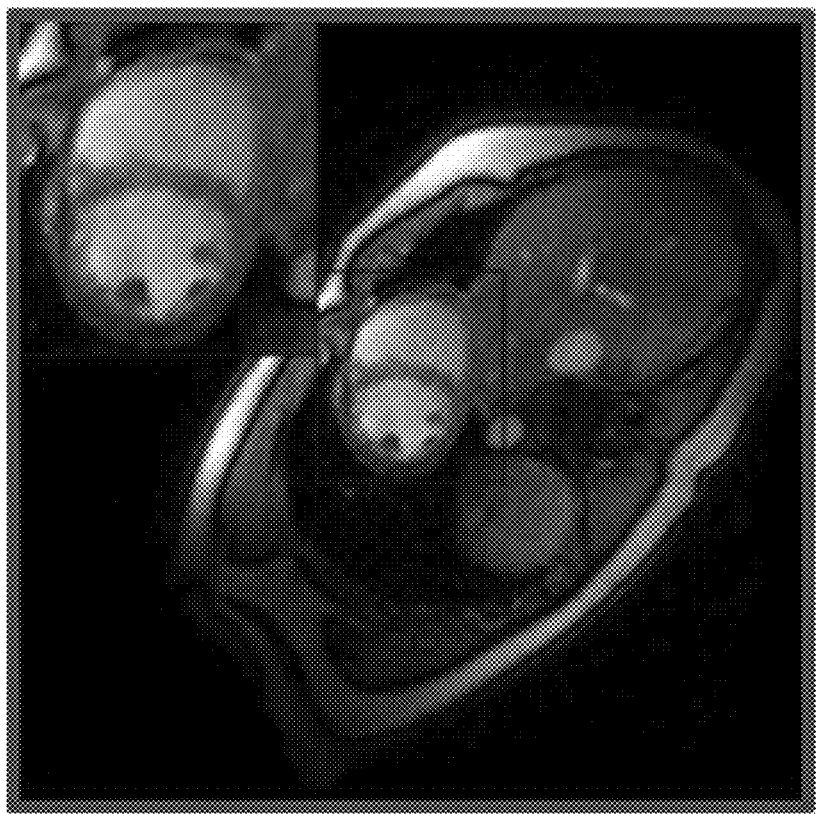
Figure 13D:

We also perform the comparisons on a different dataset in FIG. 11. We compare the proposed scheme with SToRM500, SToRM150, Time-DIP, and the low-rank approach. The results are shown in FIG. 11. From the figure, we see that the proposed reconstructions appear less blurred than those of the conventional schemes. We also compared the proposed scheme with SToRM500, SToRM150, and the unsupervised Time-DIP approach quantitatively.

We omit the low-rank method here because low-rank approach often failed in some datasets. The quantitative comparisons are shown in Table II. We used SToRM500 as the reference for SER, PSNR, and SSIM calculations. The quantitative results are based on the average performance from six datasets.

Finally, we illustrate the proposed approaches in FIGS. 12A-12E and FIGS. 13A-13F, respectively. The proposed approach decoupled the latent vectors corresponding to the cardiac and respiratory phases well, as shown in the representative examples in FIG. 12A and FIG. 13A.

VI. Conclusion

In this work, we introduced an unsupervised generative SToRM framework for the recovery of free-breathing cardiac images from spiral acquisitions. This work assumes that the images are generated by a non-linear CNN-based generator $\mathcal{G}_\theta$, which maps the low-dimensional latent variables to high resolution images. Unlike traditional supervised CNN methods, the proposed approach does not require any training data. The parameters of the generator and the latent variables are directly estimated from the undersampled data. The key benefit for this generative model is its ability to compress the data, which results in a memory-effective algorithm. To improve the performance, we introduced a network/distance regularization and a latent variable regularization. The combination of the priors ensures the learning of representations that preserve distances and ensure the temporal smoothness of the recovered images; the regularized approach provides improved reconstructions while minimizing the need for early stopping. To reduce the computational complexity, we introduced a fast approximation of the data loss term as well as a progressive training-in-time strategy. These approximations result in an algorithm with computational complexity comparable to our prior SToRM algorithm.

The main benefits of this scheme are the improved performance and considerably reduced memory demand. While our main focus in this work was to establish the benefits of this work in 2D, we plan to extend this work to 3D applications in the future.

Part II: Dynamic Imaging Using
Motion-Compensated SmooThness Regularization
on Manifolds (MoCo-SToRM)

1. Introduction

Magnetic resonance imaging (MRI) is an attractive imaging modality for patient groups that require serial follow up because it does not use ionizing radiation. Ultra-short echo-time MRI [42] methods are capable of significantly reducing the T2* losses, mitigating some of the main challenges associated with lung MRI. However, MRI is a slow imaging modality, which makes it challenging to image moving organs such as the lung. For lung MRI, the respiratory motion can be frozen by breath-holds. However, subjects usually are unable to hold their breath for a long time, which will significantly limit the achievable spatial resolution and coverage. Besides, there are several patient groups (e.g., patients with chronic obstructive pulmonary disease (COPD), pediatric patients, and neonates) who cannot hold their breath even for a short duration [43,44,45]. For these reasons, some of these patients need to be sedated for MRI exams or are often not eligible for MRI scans.

Several gating approaches were introduced to eliminate the need for breath-holding in pulmonary MRI [46,47,48, 49]. For instance, classical methods (e.g., [50]) rely on respiratory bellows or self-gating signals to bin the data to specific phases. Prospective methods only acquire the data during a specific respiratory phase, while retrospective methods continuously acquire the data but only use the data from a specific phase. Self-gating approaches such as XD-GRASP [4] use the information from the central k-space samples to estimate the motion signal, which is used to bin the acquired data into several respiratory phases. After the binning, a compressed-sensing approach is used to jointly reconstruct the phase images (See FIG. 14A for illustration), which is more data efficient than traditional binned acquisitions. These approaches are often called motion-resolved methods. A challenge with these methods is the potential sensitivity to bulk motion during the scan. In particular, the subjects may move abruptly during the scan. Because XD-GRASP and similar gating methods rely on low-pass filtering to estimate the pseudo-periodic motion signal, the bulk motion effects are often filtered out. In addition, these approaches are only able to recover the respiratory phase images, which correspond to the averaged data over several minutes, and not the true dynamics. Another challenge associated with the motion-resolved scheme is the trade-off between residual aliasing and blurring resulting from intra-bin motion. For instance, increasing the number of bins can reduce intra-bin motion artifacts. However, this will come at the expense of k-t space data available for each bin, which will translate to residual alias artifacts. While manifold approaches [9,11,51,52], which perform soft-gating as opposed to explicit binning, offer improved trade-offs but are also vulnerable to these challenges. These schemes use machine learning algorithms to perform soft-binning of the data using the manifold structure of images in the dataset. These unsupervised machine learning methods have been shown to offer improved performance and robustness to different motion patterns over explicit binning strategies.

Motion compensation (MoCo) is often used to further improve the data efficiency and to reduce residual aliasing and noise in the reconstructed images. Many of the approaches require a high-resolution reference image. The recovered images are then registered to the reference image to obtain the motion fields [53]. Another approach is to estimate the motion-maps between the phase images reconstructed by XD-GRASP; the different motion phases are registered together and averaged to obtain a MoCo volume [48]. Recently, Zhu et al. used a non-linear compressed sensing algorithm to directly recover the MoCo volume from the k-t space data, using the deformation maps estimated from XD-GRASP [54]. This approach, named iMoCo, is shown to significantly improve the image quality. The main challenge with this multi-step strategy (binning based on motion estimation, followed by XD-GRASP reconstruction, followed by the final MoCo reconstruction) is the dependence of the image quality on the intermediate steps. In particular, this approach inherits the sensitivity of XD-GRASP to bulk motion because it is dependent on motion estimates from XD-GRASP. For example, when the data is corrupted with a single bulk motion effect, the data with bulk motion is removed in [54] to obtain good reconstructions; this approach is not readily applicable to settings where there are multiple bulk motion events during the acquisition. This multi-step strategy was recently extended to dynamic PET [55]. The main distinction of this scheme from [54] is the use of a deep learning algorithm to estimate the deformation maps between the different motion phases. The different motion phases are registered to a fixed state using a deep network, followed by a reconstruction scheme similar to iMoCo [54].

The main focus of this work is to introduce a novel unsupervised deep-learning MoCo reconstruction scheme, which can be readily applied for free-breathing pulmonary MRI. This method is the generalization of the previous motion-resolved generative manifold methods [51,52] to the MoCo setting; we hence call the proposed approach motion-compensated smoothness regularization on manifolds (MoCo-SToRM). Unlike [51,52], which assume the images to be on a smooth manifold, we assume that the motion deformation maps at different time instants are living on a manifold, parameterized by low-dimensional latent vectors. We assume the deformation maps to be the output of a convolutional neural network (CNN) based generator, whose inputs are time-dependent low-dimensional latent vectors that capture the motion information (See FIG. 14B for illustration). The generated deformation maps are used to deform a learned template image, which corresponds to the image volume frame in the time series. A multi-channel non-uniform Fourier transform (NUFFT) is used to generate the k-space measurements of the images. Unlike prior MoCo approaches that use a series of algorithms for binning, reconstruction, motion estimation, and reconstruction, we formulate the joint recovery of the latent vectors, deformation maps, and the template image directly from the measured k-t space data as a single non-linear optimization scheme. The cost function is the squared error between the multi-channel Fourier measurements of the image volumes and the actual measurements acquired from the specific subject. We note that the deformation maps are smooth and are less complex than the images themselves; we expect the proposed scheme to be less data-demanding than motion-resolved approaches [4,51,52].

The proposed framework, built using modular blocks, is highly explainable. In particular, the learned latent vectors capture the intrinsic temporal variability in the time series, including respiratory and bulk motion as seen from our experiments. Moreover, the smooth deformation maps capture the spatial deformation of the image template and can be visualized. More importantly, the reconstructions can be viewed as a movie, allowing one to visualize the images at respective time-frames, unlike binning-based approaches that only recover the phase images. Unlike current deep-learning strategies that pre-learn the CNN parameters from example data, the proposed scheme learns all the parameters from the data of the specific subject. We also note that the MoCo approach enables us to minimize the trade-off between intra-phase motion and the data available for reconstruction. We do not make any assumptions on the latent vectors, which allows it to learn all the motion events during the acquisition, including bulk motion, which is challenging for traditional methods.

2. Methods

2.1. Brief Background on Motion-Resolved and Motion-Compensated Reconstruction Several self-navigated motion-resolved free-breathing MRI schemes [4,56], which use 3D radial ultra-short-echo (UTE) acquisition, were recently introduced for lung imaging. These schemes rely on a combination of low-pass filtering and/or clustering to derive the self-gating signals, which are used to bin the k-space data into different motion phases. Once the data is binned, these schemes (e.g., XD-GRASP [4]) perform the motion-resolved joint reconstruction of the phases by solving the following:

$$F^* = \underset{F}{\operatorname{argmin}} \|\mathcal{A}(F) - B\|_2^2 + \lambda_s \|\Psi F\|_1 + \lambda_t TV(F).$$

Figure 14A:
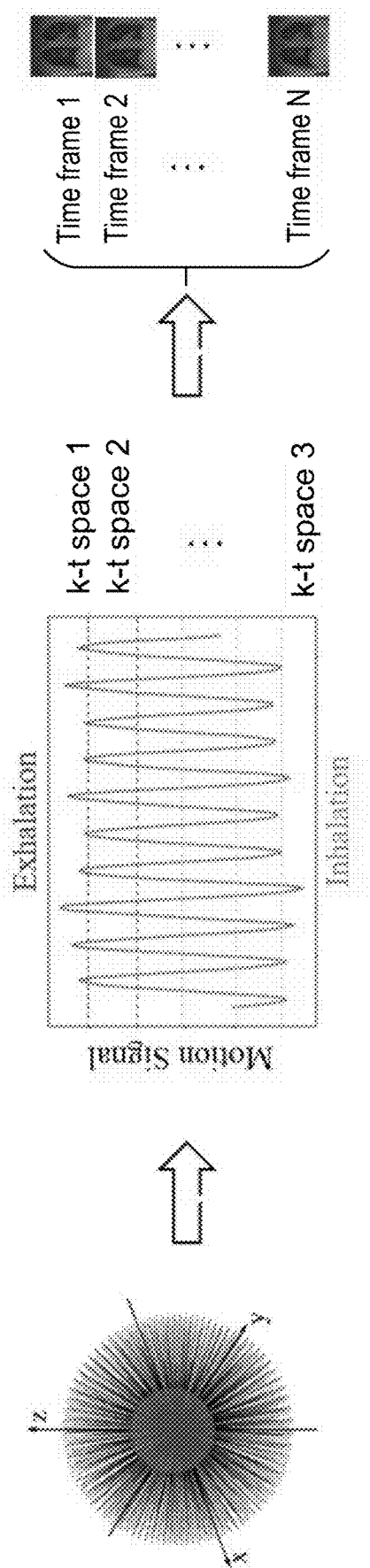
FIG. 14A, and FIG. 14B illustrate XD-GRASP and MoCo-SToRM algorithms.
Figure 14B:
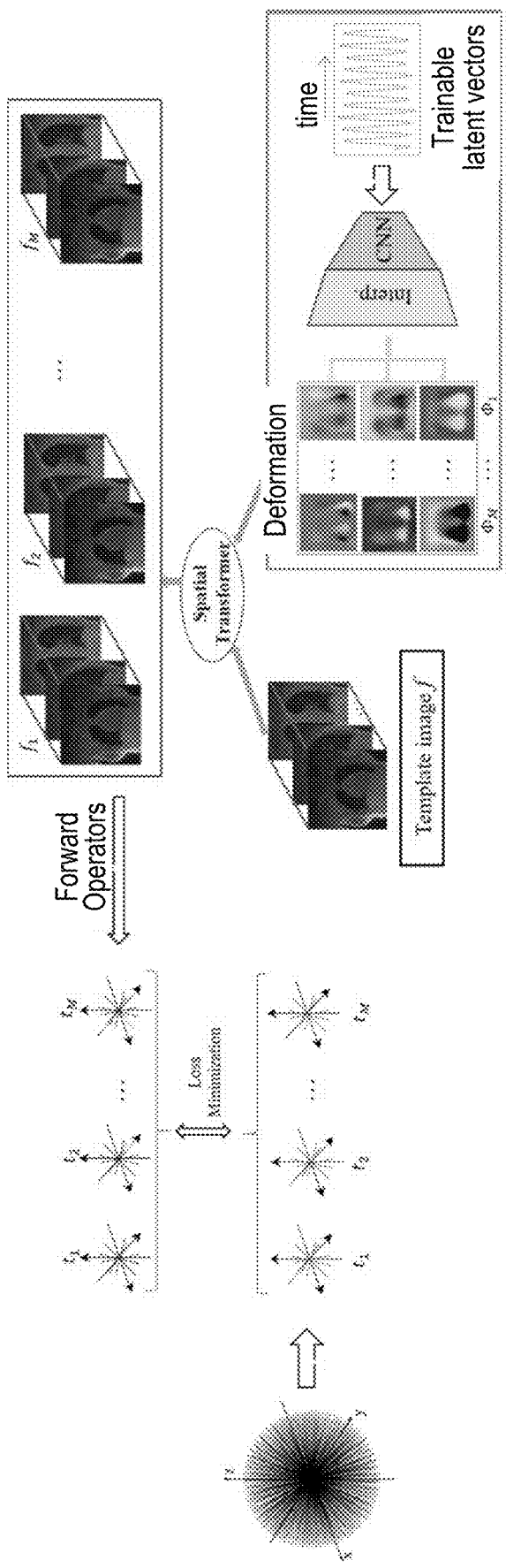

The first term is the data consistency term that compares the multi-channel measurements of the phase images $F=\{f_1, \ldots, f_N\}$ with the binned data $B=\{b_1, \ldots, b_N\}$. Here N is the number of bins and hence the number phases in the XD-GRASP reconstruction. The second term is a spatial sparsity $e_1$-wavelet penalty term, in which $\psi$ is the wavelet transform. The third term is the total variation penalty along the motion phases. The above scheme is usually called XD-GRASP-type motion-resolved reconstruction, which is illustrated in FIG. 14A.

Deep manifold-based approaches [51,57] offer an alternate route for motion-resolved recovery. In particular, the images in the time series are modeled as $f_t = \mathcal{G}_\theta(z_t)$, where $\mathcal{G}_\theta$ is a deep CNN generator that is shared across different image frames. The parameters of the generator denoted by $\theta$ and the low-dimensional latent vectors $z_t$ are learned such that the cost function $\Sigma_t \| \mathcal{A}_t \mathcal{G}_\theta(z_t) - b_t \|^2$ is minimized. Here, $\mathcal{A}_t$ denotes the forward model corresponding to the $t^{th}$ image frame, and $b_t$ are the corresponding k-space measurements. The proposed approach is a generalization of these deep manifold models [51, 57] to the MoCo setting.

Many of the early MoCo methods rely on a high-resolution static reference image [53]. Recent approaches [48,54] rely on motion-resolved XD-GRASP reconstructions. Once the motion-resolved reconstructions are obtained, one of the phases (usually the exhalation phase) will be chosen as the reference. Then the other motion phases are registered to the reference phase to obtain the deformations $\Phi_1, \ldots \Phi_P$. The iMoCo approach solves the following optimization scheme to obtain the MoCo reconstruction $f_{imoco}$:

$$f_{imoco}^* = \arg\underset{f_{imoco}}{\min} \sum_{p=1}^{N} \|\mathcal{A}_t(\phi_p(f_{imoco})) - b_p\|_2^2 + \lambda TGV(f_{imoco}).$$

The first term is the data consistency term, and the second is a spatial total generalized variation sparsity regularizer [58].

2.2. Proposed Approach

In this work, we extend the motion-resolved deep manifold methods [51,57] to the MoCo reconstruction setting. The proposed framework is a end-to-end self-supervised deep-learning algorithm involving explainable learning modules. We model the image volumes ft in the time series as the deformed versions of a single image template f:

$$f_t(x,y,z) = f(x-\phi_x(t), y-\phi_y(t), z-\phi_z(t)) := \mathcal{D}(f, \phi(t)). \quad (17)$$

Here $\phi(t)=\{\phi_x(t), \phi_y(t), \phi_z(t)\}$ is the motion/deformation map at the time instant t. We implement D as a differentiable interpolation layer.

We propose to jointly estimate the deformation maps and the single image template directly from the k-t space data. We note that it is impossible for us to acquire the k-t space data at the Nyquist-Shannon sampling rate. Therefore, the joint estimation problem is highly ill-posed. In order to regularize the deformation maps, we use the manifold assumption. In other words, we assume that the deformation map for each image frame ft is living on a smooth manifold, parameterized by low-dimensional latent vectors $z_t$, $t=1, \ldots M$ that capture the dynamics (e.g., respiratory motion, bulk motion in lung imaging). We model the non-linear mapping between the low-dimensional latent vectors and the high-dimensional deformation maps by a CNN generator:

$$\phi(t) = \mathcal{G}_\theta(z_t), \quad (18)$$

whose input is the low-dimensional latent vector $z_t \in \mathbb{R}^d$. As the dominant motion in free-breathing lung imaging is the respiratory motion, we set d=1 in this work; we will consider higher dimensional latent space in our future work. Combining (17) and (18), each image frame ft in the time series is modeled as:

$$f_t(r) = \mathcal{D}(f, \underbrace{\mathcal{G}_\theta(z_t)}_{\phi(t)}). \quad (19)$$

Here, r=(x, y, z) is the spatial coordinate. See FIG. 14B for an illustration.

We note that the generated image at each time instant t is dependent on the image template f, the parameters of the deep CNN generator $\theta$, and the low-dimensional latent vectors $z=[z_1, \ldots, z_M]$. Here, M is the number of image frames in the time series. When golden-angle or bit-reversed radial acquisitions are used, M can be a user-defined parameter. We propose to jointly solve for the above unknowns directly from the k-t space data of the specific subjects as the optimization problem:

$$C(z,\theta,f) = \Sigma_{t=1}^{M} \|\mathcal{A}_t(f_t - b_t)\|^2 + \lambda_1 \|\nabla_t z\|_{l_1} + \lambda_2 \|\nabla_r f\|_{l_1}, \quad (20)$$

where $f_t$ is related to the static image f by (19). Here, $A_t$ are the forward operators that are performed on each of the time points. We implement $A_t$ as multi-channel NUFFT [59] operators using the k-space trajectory at the $t^{th}$ time instant using the SigPy package [60]. $b_t$ are the multi-channel k-space measurements acquired from the subject. The second term in (20) is a smoothness penalty on the latent vector that captures the dynamics (e.g., respiratory and/or bulk motion). If this term is not added, the learned latent vectors will learn high-frequency oscillations. To minimize this risk, we added a total-variation penalty on the latent vector z along the time direction to encourage the latent vectors to learn piecewise smooth motion. The last term in (20) is the spatial total variation penalty on the static image, which enables us to further reduce alias artifacts in the learned static image.

The proposed self-supervised scheme offers several benefits. First of all, the reconstruction relies only on the undersampled data acquired from the specific subject. Unlike most deep-learning strategies, the proposed framework does not require fully sampled training datasets, which are not available in our setting, to train the networks. Secondly, the proposed scheme does not require physiological monitors such as respiratory belts or dedicated k-space navigators. It also eliminates the need for band-pass filtering or clustering to estimate the phase information, which will filter out bulk motion. Finally, unlike binned approaches that recover average images over the acquisition duration within respective respiratory phases, the proposed scheme enables the recovery of the natural dynamics of the lung

2.3 Approaches to Minimize Computational Complexity

We use ADAM optimization [61] with a batch size of one time-frame to find the optimal z, θ and f. The small memory footprint enables us to use this scheme for high-resolution 3D+time problems. The network and optimization scheme was implemented in PyTorch. The motion generator is implemented using an eight-layer network. The first seven layers are 3D convolutional layers with 200 features per layer. The last layer is an up-sampling layer, which uses tri-linear interpolation to interpolate the deformation maps from lower resolution to high resolution. The final interpolation step allows us to account for the prior knowledge that the deformation maps are smooth functions. ReLU activation function [62] is used for all the convolutional layers.

Directly solving the above optimization problem (20) is computationally expensive, especially when the image resolution is high. To minimize the computational complexity, we use a progressive strategy. In particular, we first solve for (20) for very low-resolution images using the corresponding region in the central k-t space. These latent vectors, motion fields, and the images are used to initialize the network at a higher spatial resolution. We use two progressive steps to refine the resolution, until the final resolution is reached. We observe that this progressive strategy significantly improves the convergence rate. In particular, few iterations are needed at the highest resolution, compared to the setting where the parameters of the motion network and the image are initialized randomly.

The above joint optimization strategy offers good estimates of the latent vectors with few iterations, even at the lowest resolution. By contrast, the stochastic gradients with a batch size of one can result in low convergence rates for the static image f and the CNN parameters. To further accelerate the convergence rate, we additionally use a binning strategy similar to motion-resolved schemes shown in FIG. 14A, assuming z to be fixed. We bin the latent vector to P phases, based on the latent vectors we estimated. We use 25 phases in the adult subjects with less extensive motion and 150 in the neonatal intensive care unit (NICU) patient with extensive motion. This approach allows us to bin the data to different phases. We update θ and f using the optimization strategy:

$$C(\theta, f) = \sum_{p=1}^{P} \left\| \mathcal{A}_p \underbrace{\mathcal{D}(f, \mathcal{G}_\theta(z_p))}_{f_p} - b_p \right\|^2 + \lambda_2 \|\nabla_r f\|_{\ell_1}, \quad (21)$$

Here, $z_p$ is the latent vector at the $p^{th}$ bin, and $\phi(t)=\mathcal{G}_\theta(z_p)$ is the motion vector for the $p^{th}$ bin. Here $f_p$ is the image in the $p^{th}$ bin, obtained by deforming f with $\phi_p$.

We only use the above binning-based optimization in (21) at the highest resolution level. Note that (21) only solves for θ and f, and not z. We hence alternate between (21) and (20) at the highest resolution.

3. Datasets and Evaluation

3.1. Experimental Datasets

The datasets used in the experiments in this work were acquired using an optimized 3D UTE sequence with variable-density readouts to oversample the k-space center [63]. We used four datasets acquired from two adult subjects. Two of them are from a healthy subject (pre-contrast and post-contrast) and another two are from a fibrotic subject (pre-contrast and post-contrast). We also used one dataset acquired from a female subject with severe bronchopulmonary dysplasia (BPD), who was admitted to the NICU. The gestational age of the patient at birth is 24 weeks, and the MRI is prescribed at the chronological age of 15 weeks and 3 days. The weight of the patient at MRI is 3.18 Kg. The datasets from the healthy subject were acquired on a 1.5 T GE scanner using 8 coils. The variable-density readouts help retain signal-to-noise ratio (SNR), and oversampling reduces aliasing artifacts. A bit-reversed ordering was used during the data acquisition. The prescribed field of view (FOV)=32×32×32 cm³. The matrix size is 256×256×256. The data were acquired with 90K radial spokes with TR≈3.2 ms and 655 samples/readout, corresponding to an approximately five-minute acquisition.

The datasets from the diseased subject were acquired on a 3T GE scanner using 32 coils. The prescribed FOV=32× 32×32 cm³. The matrix size is 256×256×256. The data were acquired with 91K radial spokes with TR≈2.8 ms and 655 samples/readout, corresponding to an approximately four-minute acquisition. When we were processing the datasets with 32 coils, we used a PCA-based coil combination [64] using SVD to keep only eight virtual coils.

The dataset from the neonatal subject was acquired on a 1.5 T small footprint MiII scanner [44] located in the NICU. The data was acquired using the built-in body coil, which translates to poor SNR compared to the adult scans. In addition, the scan is made challenging because of the extensive bulk motion by the subject during the scan. For this dataset, the prescribed FOV=18×18×18 cm³. The matrix size is 256×256×256. The data was acquired with 200K radial spokes with TR≈5 ms and 1013 samples/readout, corresponding to an approximately 16-minute acquisition.

This research study was conducted using human subject data. Approval was granted by the Ethics Committees of the institutions where the data was acquired.

3.2. Numerical Phantom to Validate MoCo-SToRM

Figure 15:
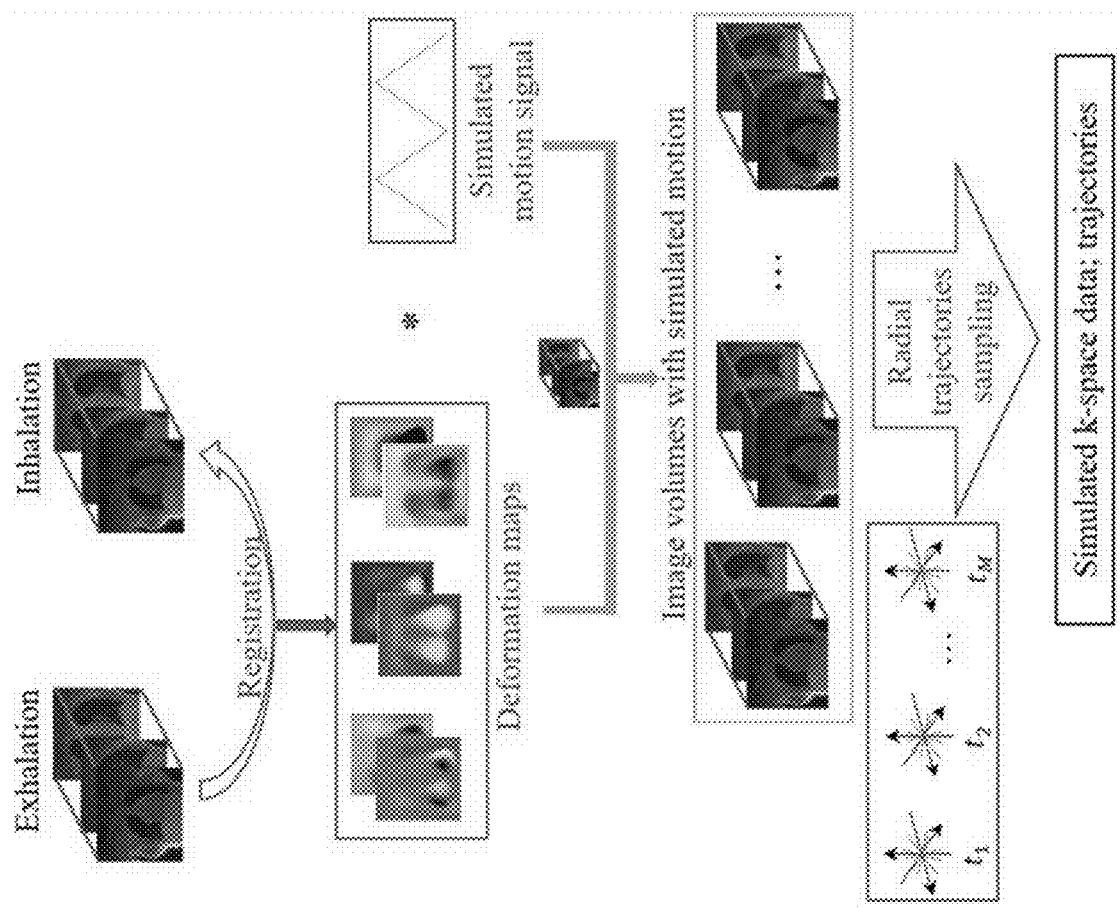
FIG. 15 illustrates of the numerical Phantom data generation. We create the simulation data using the reconstructions from XD-GRASP and iMoCo following the process shown in the figure.

We note that we do not have accurate ground truth datasets to evaluate the quantitative accuracy of the proposed scheme and its potential impact to bulk motion. We hence constructed a high-resolution numerical phantom using the XD-GRASP and iMoCo reconstructions of the pre-contrast dataset from a healthy subject. Specifically, we registered the XD-GRASP exhalation phase to the inhalation phase to obtain the deformation maps. Then we modulated the deformation maps by a periodic triangular function with a specific frequency and a DC off-set to simulate the motion from the exhalation phase to the inhalation phase. To study the impact of bulk motion, we also consider additional random translational motion (move about 2-5 pixels), at random time points as shown in FIG. 16. We deform the static iMoCo reconstruction with the above deformation maps to generate the high-resolution images at different time points. The multi-channel NUFFT of these images were used as the measurements, with an additive white Gaussian noise of 0.5%. The creation of the simulation data is illustrated in FIG. 15.

3.3. Figures of Merit for Quantitative Evaluation

For image quality comparisons, we compare the proposed MoCo-SToRM reconstruction with XD-GRASP and iMoCo. To quantitatively compare the image quality, we use three images metrics in this work.

Diaphragm maximum derivative (DMD) [54,65]: the DMD will be used to measure the sharpness of the lung-liver diaphragm. It is defined as:

$$DMD = \frac{\text{Max}(\partial I)}{\text{Mean}(I_{liver})},$$

where Max(∂I) is the maximum intensity change between the lung-liver interface, which is computed by choosing the maximum value of the image gradient. Mean($I_{liver}$) is the mean intensity in the chosen liver region. A higher DMD implies sharper edges.

Signal-to-noise ratio (SNR) [66,67,68]: The SNR is computed as $$SNR = 20\log\left(\frac{\mu_s}{\sigma_n}\right),$$

where $\mu_s$ is the mean of the intensity of the chosen region of interest and $\sigma_n$ is the standard deviation of the intensity of a chosen noise region. A higher SNR usually means better image quality. In our study, we manually choose the regions of interest.

Contrast-to-noise ratio (CNR) [54,69]: The CNR is computed as $$CNR = 20\log\left(\frac{\mu_A - \mu_B}{\sigma_n}\right),$$

where $\mu_A$ and $\mu_B$ are the mean of the intensity of two regions within the region of interest and $\sigma_n$ is the standard deviation of the intensity of a chosen noise region. The higher CNR usually means better image quality. In our study, we manually choose the regions of interest.

4. Results

4.1. Numerical Simulation Experiments

Figure 16B:
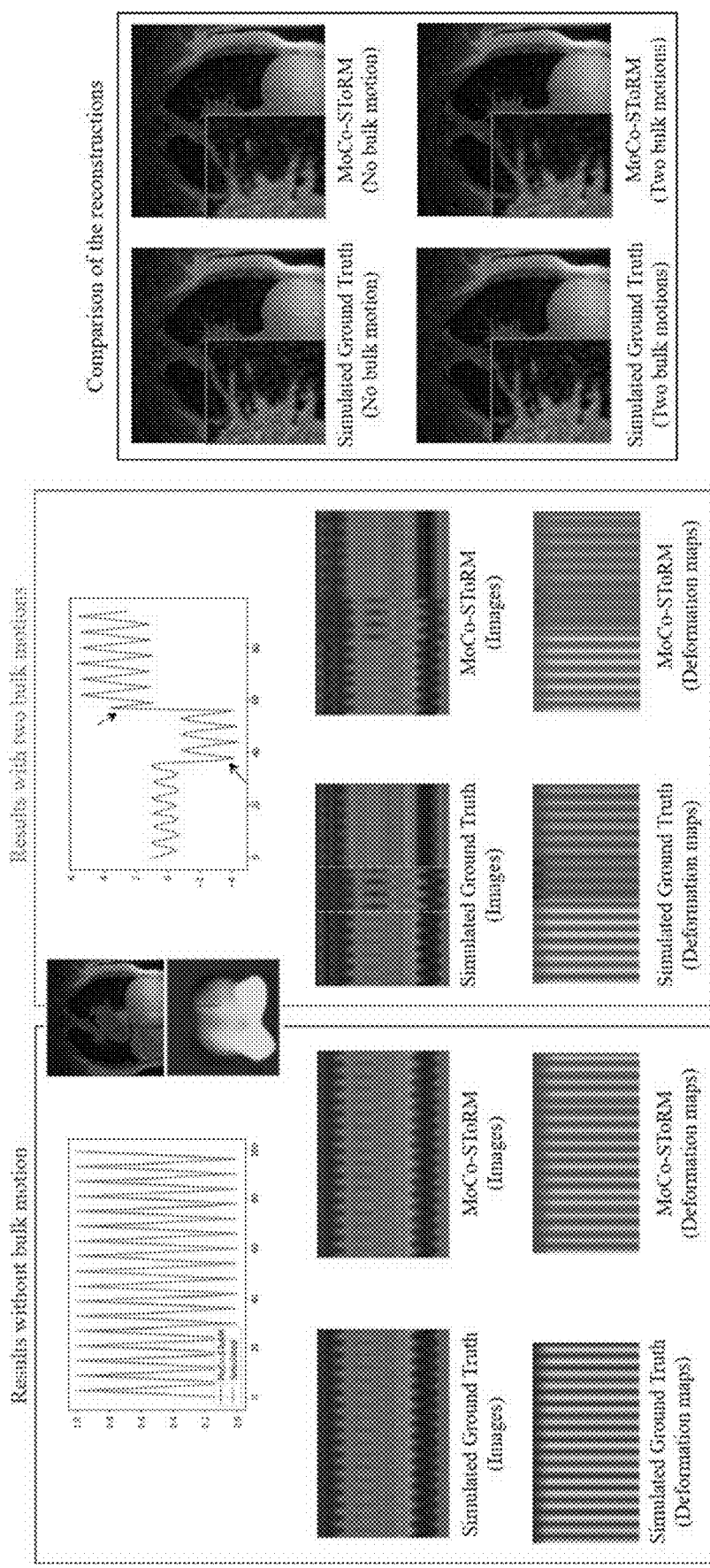
Figure 16C:
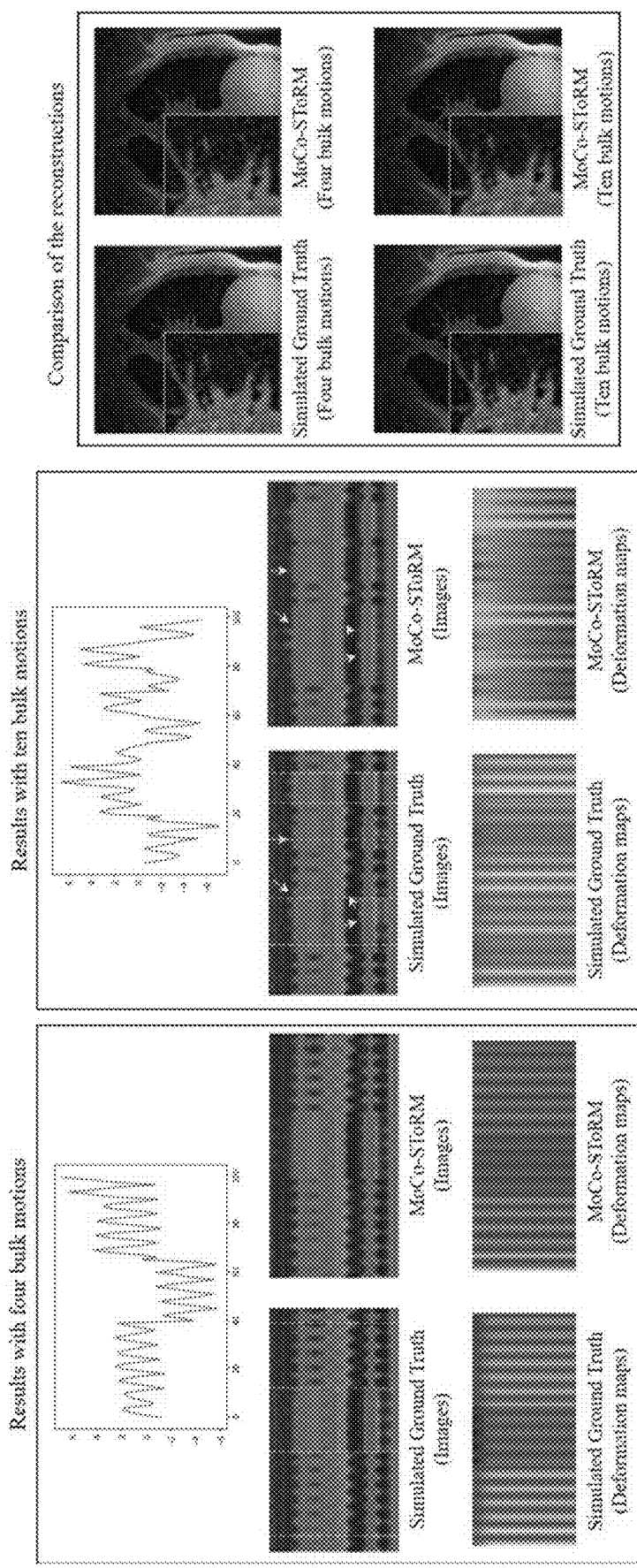
Figure 17A:
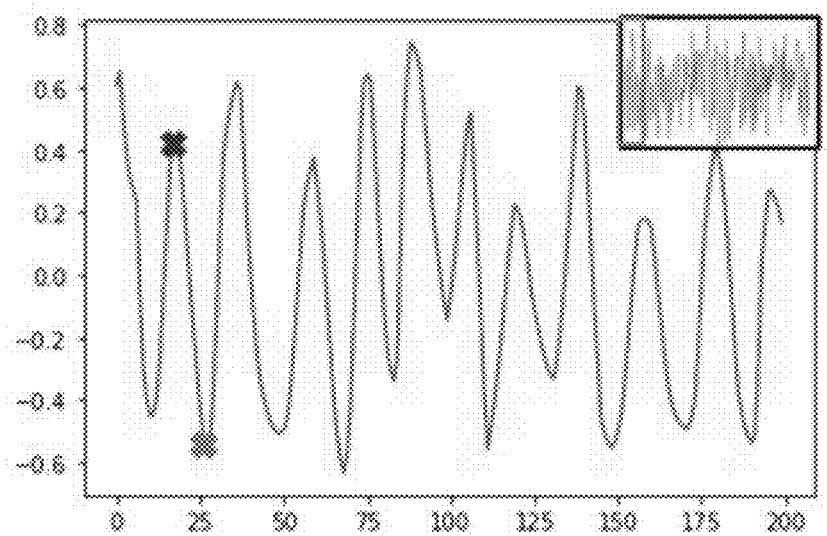
FIG. 17A, FIG. 17B, FIG. 17C and FIG. 17D illustrate the learned quantities from the pre-contrast healthy volunteer.
Figure 17B:
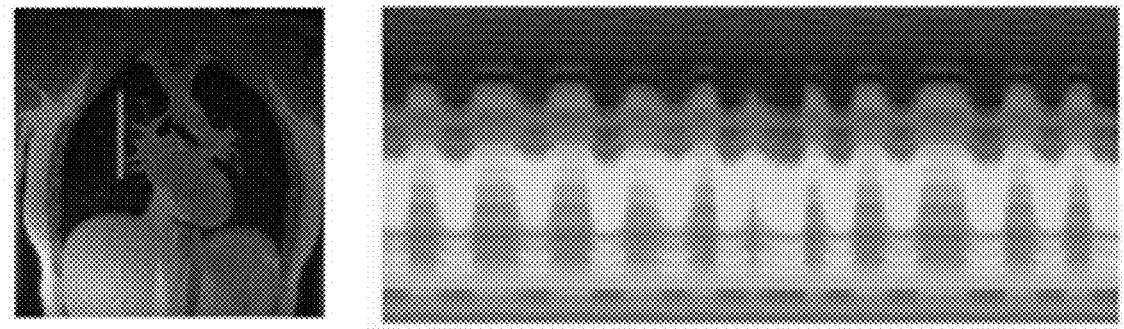
Figure 17C:
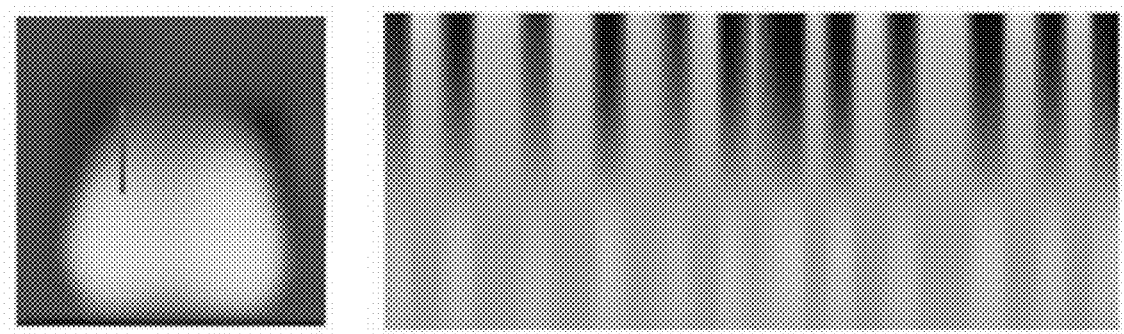
Figure 17D:
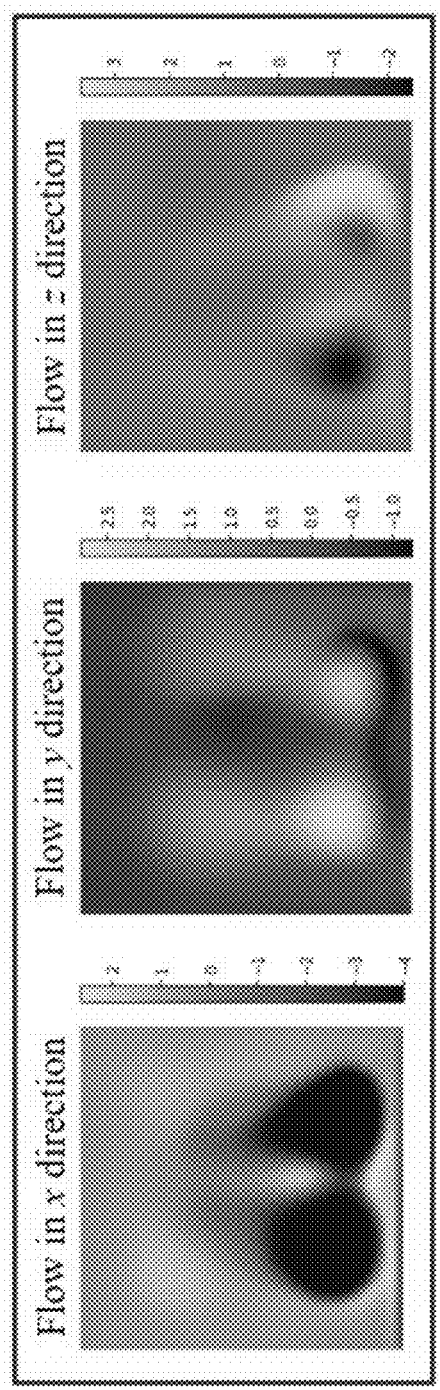
Figure 17D:
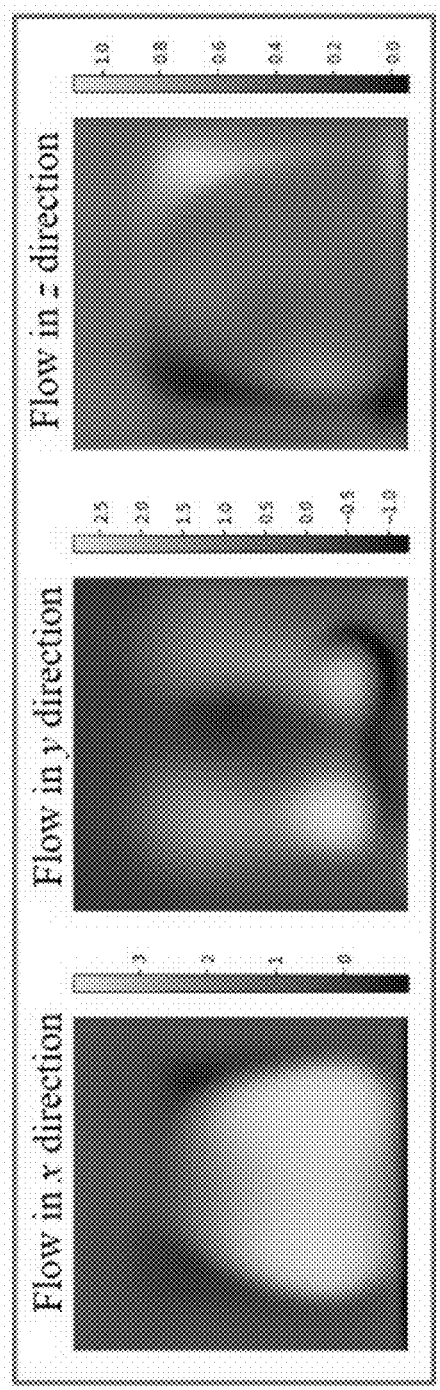
Figure 17D:
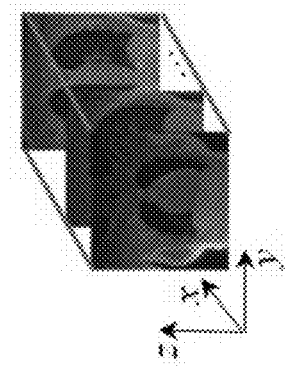

The results of the simulation study are shown in FIG. 16. In this simulation study, we investigate the impact of bulk motion events. Specifically, we create the simulation data with no, two, four, and ten bulk motion events. We quantitatively compare the reconstructions using the metrics of PSNR, SSIM, relative error of the reconstruction, and relative error of the deformation maps. The quantitative results of the simulation study are summarized in FIG. 16A. In FIG. 16B and FIG. 16C, we show some results of the simulation study. We show the learned latent vectors, the time profiles of the reconstructed image volumes, and the deformation maps. The comparisons of the reconstructions are also shown in the figure. From the simulation study, we see that the proposed MoCo-SToRM approach works reasonably when there are four bulk motion events. By contrast, when there are ten bulk motion events, the performance of the proposed scheme degrades in a graceful fashion. In particular, the limited number of radial k-space spokes translates to imperfect estimation of motion, which in turn translates to blurry reconstructions.

4.2. Experimental Datasets

In FIG. 17, we show the learned latent vectors, time profiles, and example estimated deformation maps and corresponding time profiles from the pre-contrast dataset from the healthy subject. We show the estimated latent vectors from the first 200 frames in FIG. 17A. We also show the time profile of the reconstructed images in FIG. 17B and the time profile of the deformation maps in FIG. 17C, corresponding to the blue lines in the images. From the two profiles, we see that the motion patterns coincide with the learned latent vectors. In FIG. 17B, we show the estimated deformation maps from two time points, indicated by red and green dots in FIG. 17A, corresponding to the inhalation phase and the exhalation phase. The results show that the latent vectors closely capture the dynamics of the motion.

4.3. Comparison with State-of-the-Art Methods

Figure 18A:
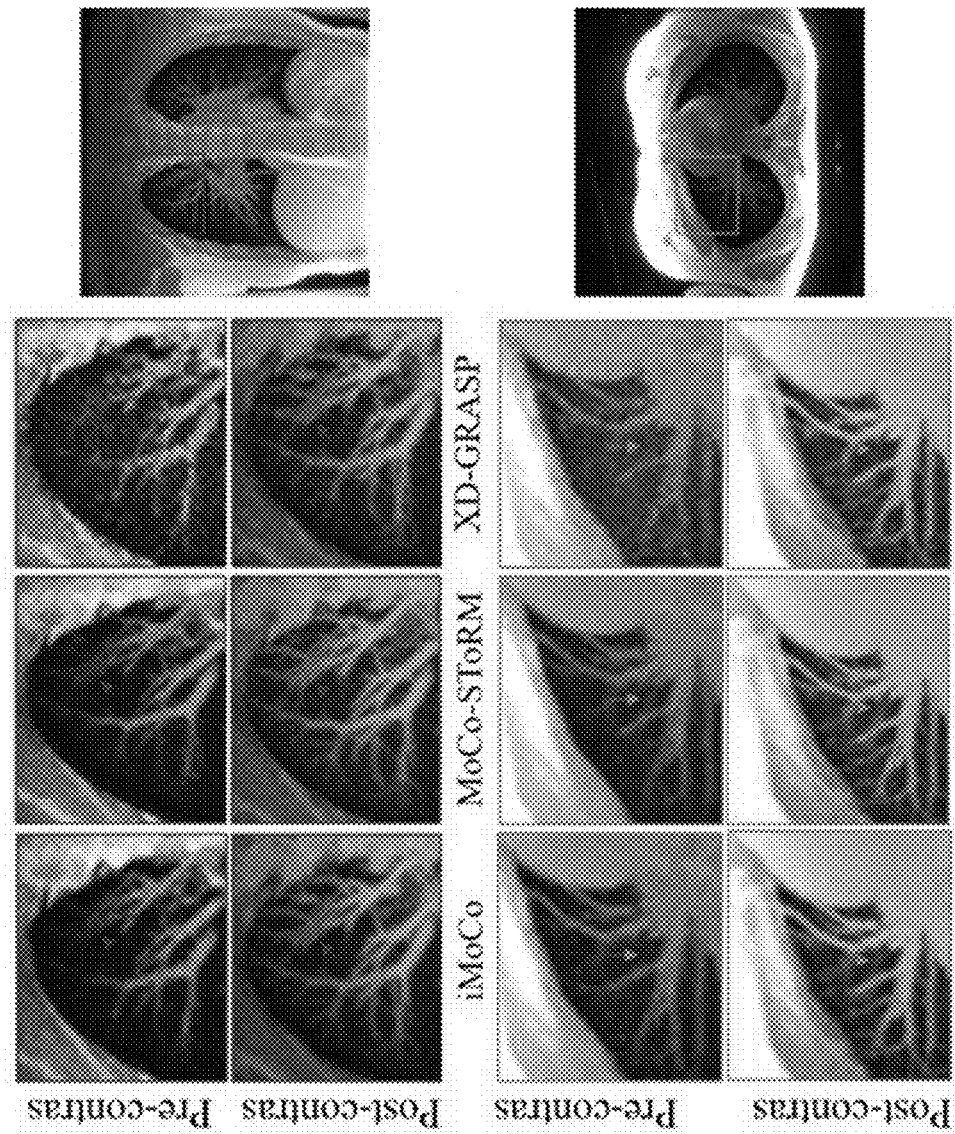
FIG. 18A, and FIG. 18B provide a visual comparison of the reconstructions from different methods on two post-contrast datasets.

In this section, we compare the results of the proposed scheme with XD-GRASP and iMoCo. In FIG. 18, we show the visual comparisons of the methods on post-contrast datasets. From FIG. 18, we observe that the MoCo-SToRM reconstructions can reduce the noise and capture more details when compared to the motion-resolved XD-GRASP reconstructions. Furthermore, the MoCo-SToRM reconstructions are less blurred than those of the motion-compensated iMoCo reconstructions. We note that the post-contrast dataset from the diseased subject had a bulk motion event (see FIG. 18), which translates to blurred iMoCo reconstructions.

Figure 19A:
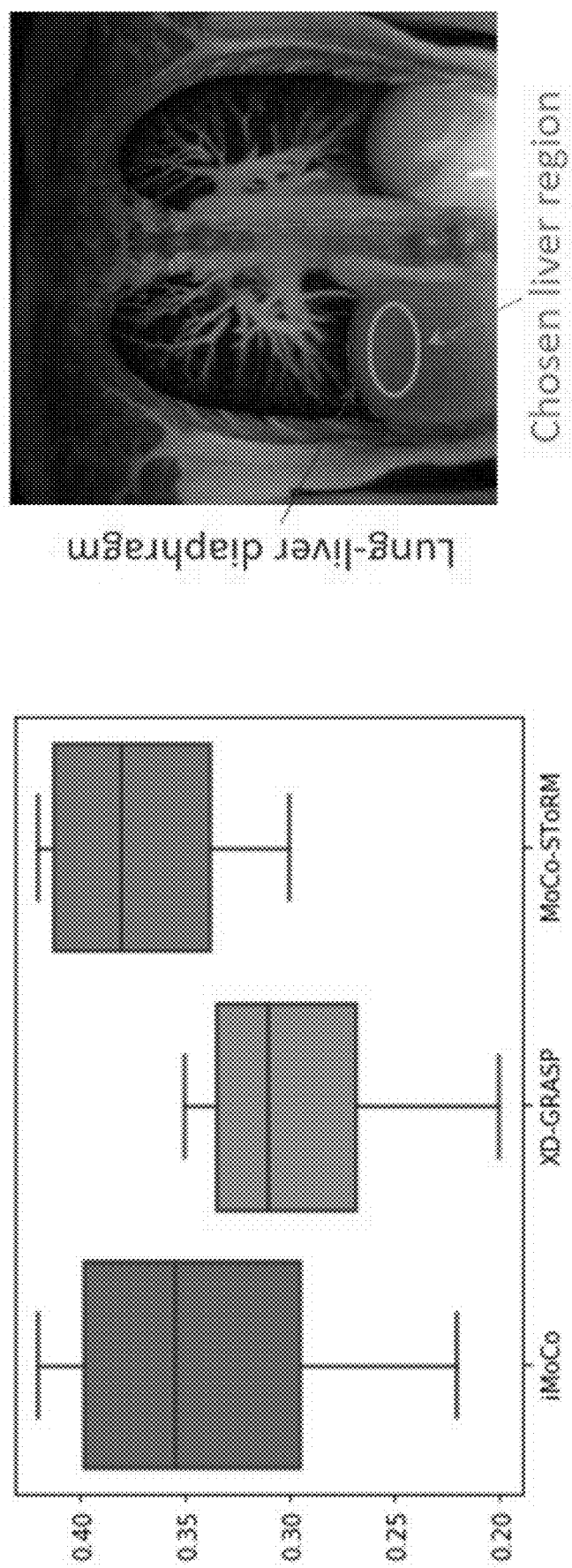
FIG. 19A and FIG. 19B show results of quantitative comparison.

The quantitative comparison of the proposed scheme with the competing methods on four datasets (two from healthy adult subjects and two from diseased adult subjects) are shown in FIG. 19. We first measure the DMD on 15 sagittal slices in each dataset, and the quantitative results are shown in FIG. 19A. From the DMD results, we see that the proposed MoCo-SToRM scheme is able provide comparable results. In particular, the motion-compensated methods (i-MoCO and MoCO-SToRM) are observed to yield marginally higher DMD than XD-GRASP, implying reduced blurring, as shown in FIG. 19A.

Figure 19B:
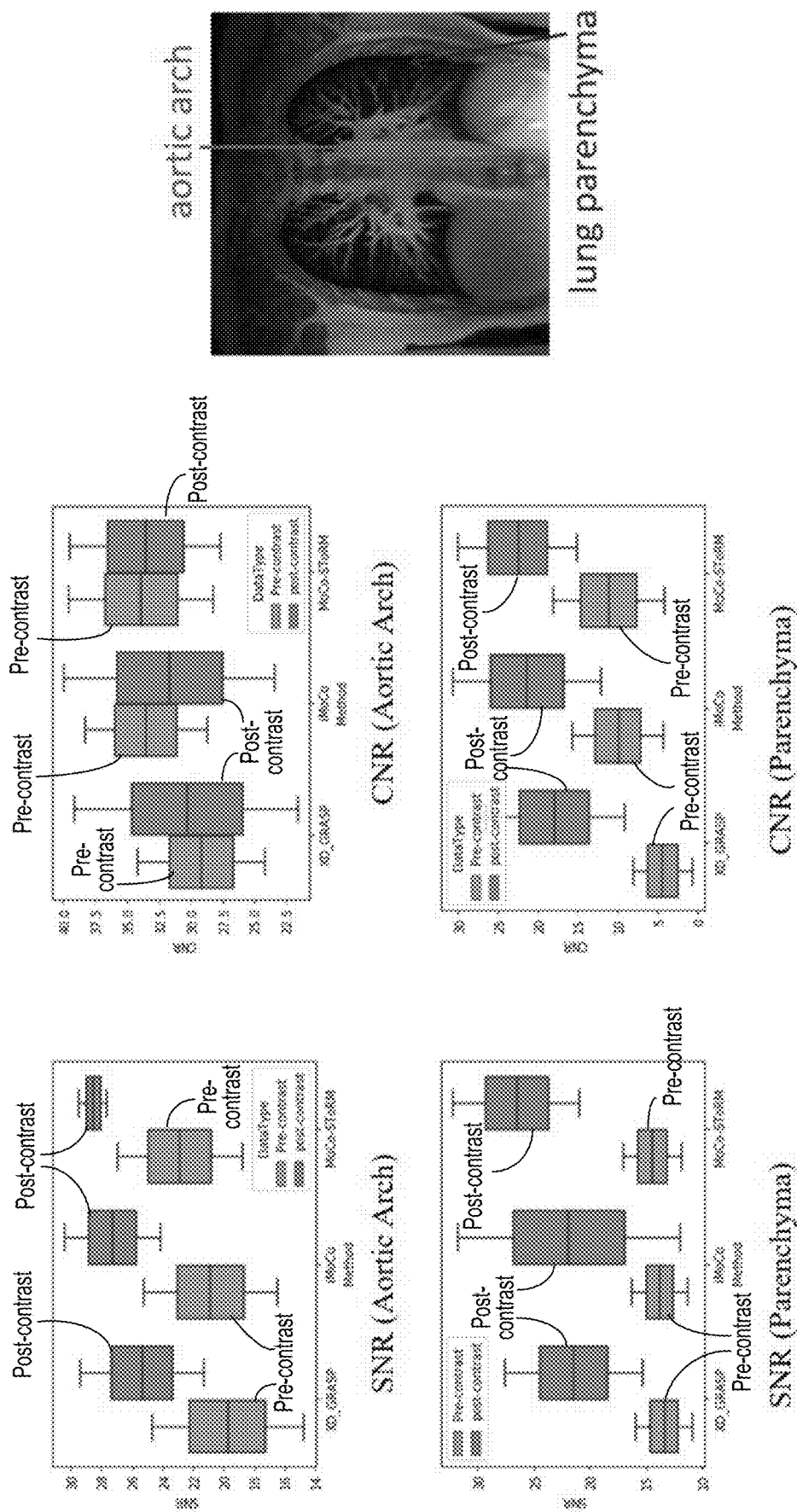

In addition to DMD, we also report the SNR and CNR of the aortic arch and lung parenchyma region, as shown in FIG. 19B. We see that the proposed MoCo-SToRM results are comparable with the results obtained from the motion-compensated iMoCo.

4.4. Impact of Bulk Motion

The acquisition time in pulmonary MRI is around four minutes for adult subjects and around 16 minutes for NICU subjects. The relatively long scan time makes current approaches vulnerable to bulk motion artifacts, especially during the imaging of diseased and pediatric patients. If they are not compensated, these bulk motion errors translate to residual blurring.

In cases with significant bulk motion, existing methods use additional image-based approaches to detect and reject sections of data with bulk motion [54]. These approaches are readily applicable to cases with very few bulk motion events; for instance, a case with a single bulk motion event was considered in [54]. If multiple events are in the dataset, this approach may severely restrict the available k-t space data and hence translate to significantly degraded image quality.

An advantage of the proposed MoCo-SToRM scheme is its ability to directly account for bulk motion during the scan. In the proposed MoCo-SToRM scheme, the latent vectors and the CNN-based generator have the ability to capture the bulk motion in the data and account for it during the reconstruction. In particular, we observe sudden jumps in the learned latent vectors. The non-linear nature of the learned generator allows the generation of deformation maps for each motion state, depending on the value of the latent vectors.

Figure 20A:
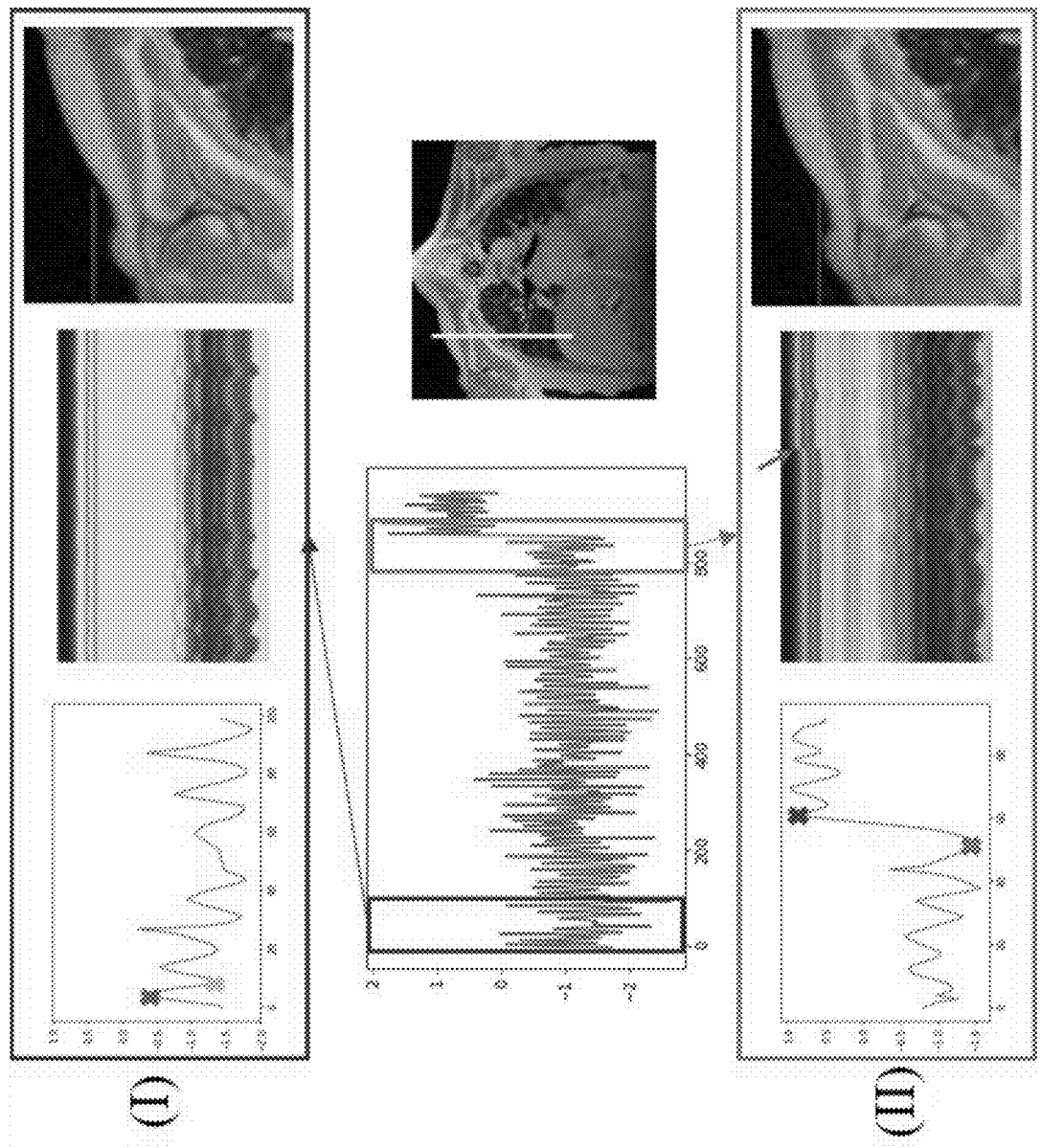
FIG. 20A, and FIG. 20B provide an example of impact of bulk motion.
Figure 20B:
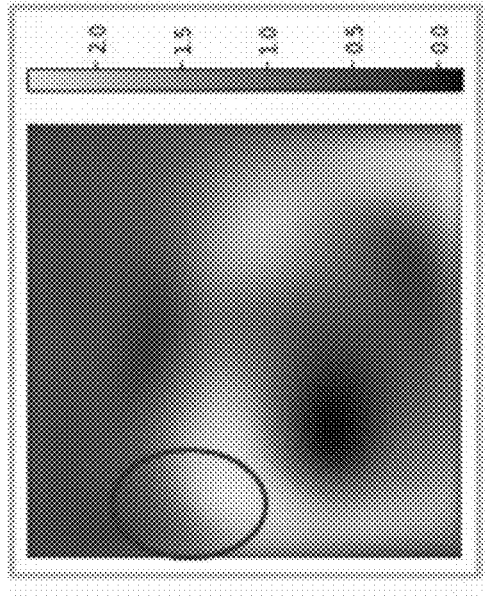
Figure 20B:
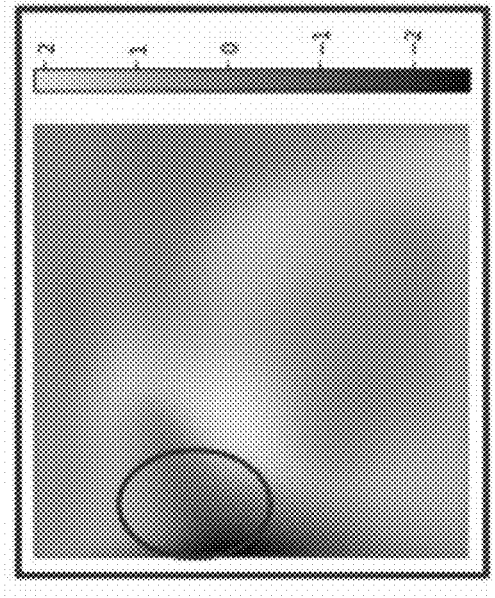
Figure 20B:
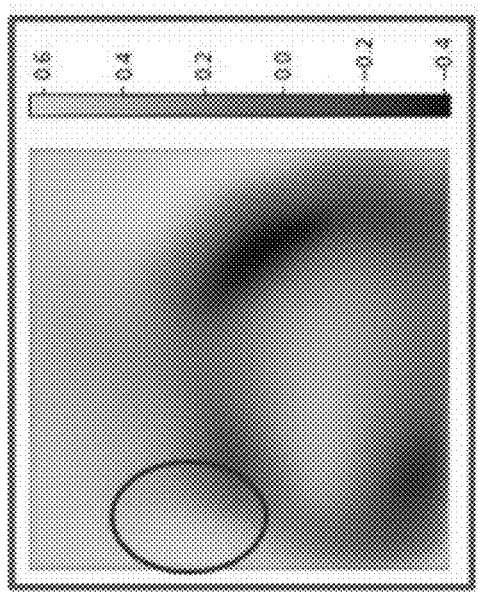
Figure 20B:
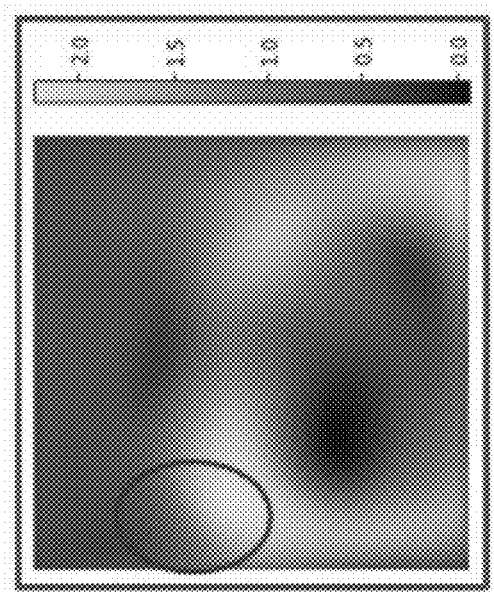

4.4.1. Adult study: In the post-contrast dataset acquired from a diseased subject, we detected one bulk motion, which is shown in FIG. 20A and FIG. 20B. In FIG. 20A, we show the latent vectors that are learned using MoCo-SToRM. As we mentioned before, the sudden jump in the latent vectors indicates the bulk motion. We highlight two time regions, one without bulk motion (red box) and one with bulk motion (green box). We also show the time profiles of the yellow line indicated in FIG. 20A. From the plots of the time profiles, we see that when the latent vectors have no sudden jump, then no bulk motion can be seen. However, when sudden jump happens in the latent vectors, we clearly see a bulk motion event from the time profile. In (I) of FIG. 20A, we zoomed the reconstructed image corresponding to the yellow cross shown in the latent vectors, and in (II) of FIG. 20A, we zoomed the reconstructed image corresponding to the purple cross shown in the latent vectors. From the red line marker, we can see that the subject moved the shoulder during the scan.

Figure 18B:
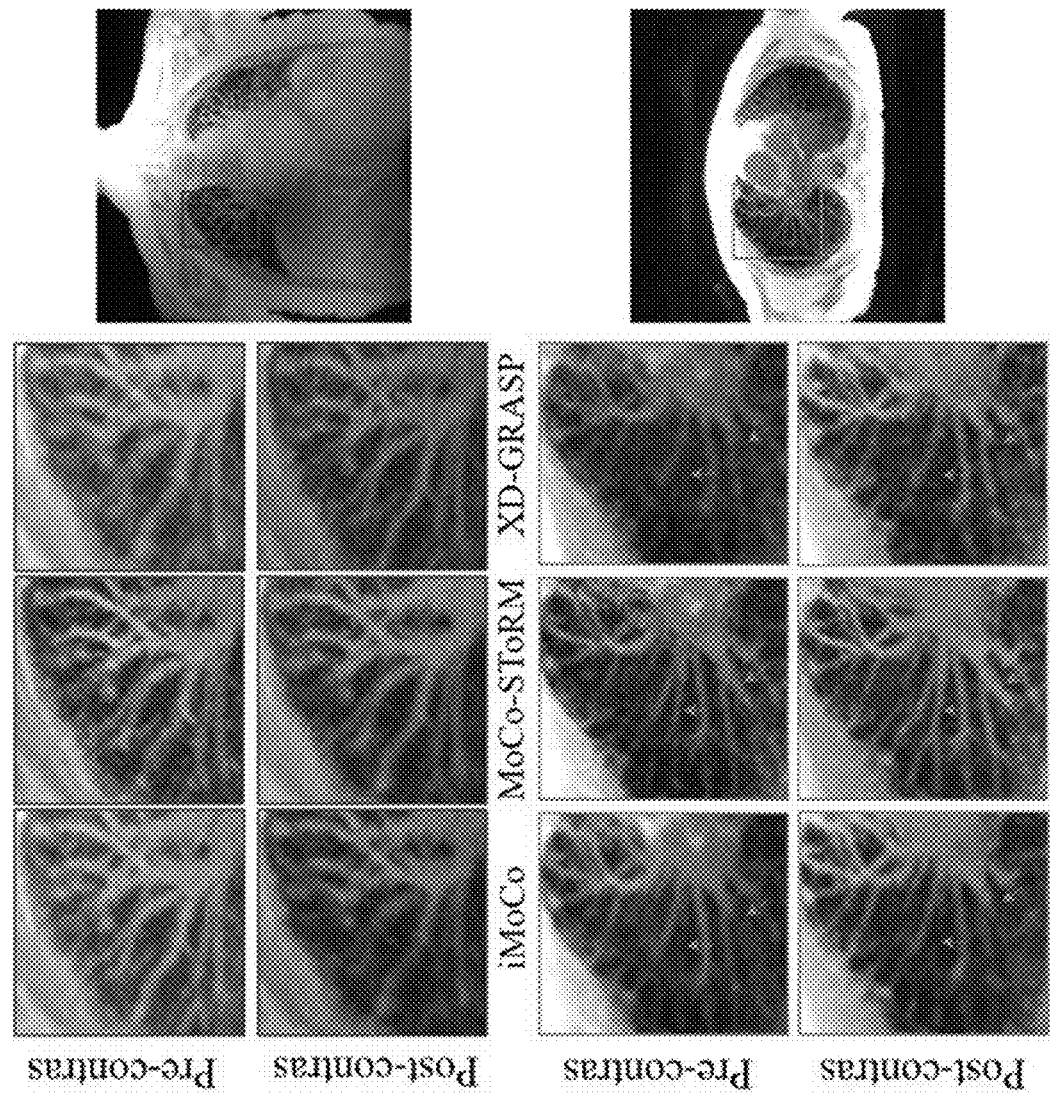

In FIG. 20B, we also show the deformation maps estimated by the proposed scheme at four different time points indicated by the brown, yellow, blue, and purple crosses in FIG. 20A. From the red ellipses in the images, we see that the subject moved the shoulder during the scan. The deformation map will be very different from the deformation maps when there is no bulk motion. In FIG. 18B, we compared the reconstructions from the proposed scheme and the iMoCo and XD-GRASP reconstructions. From the figure, we see that the proposed scheme is able to deal with bulk motion and offer improved reconstructions.

Figure 21A:
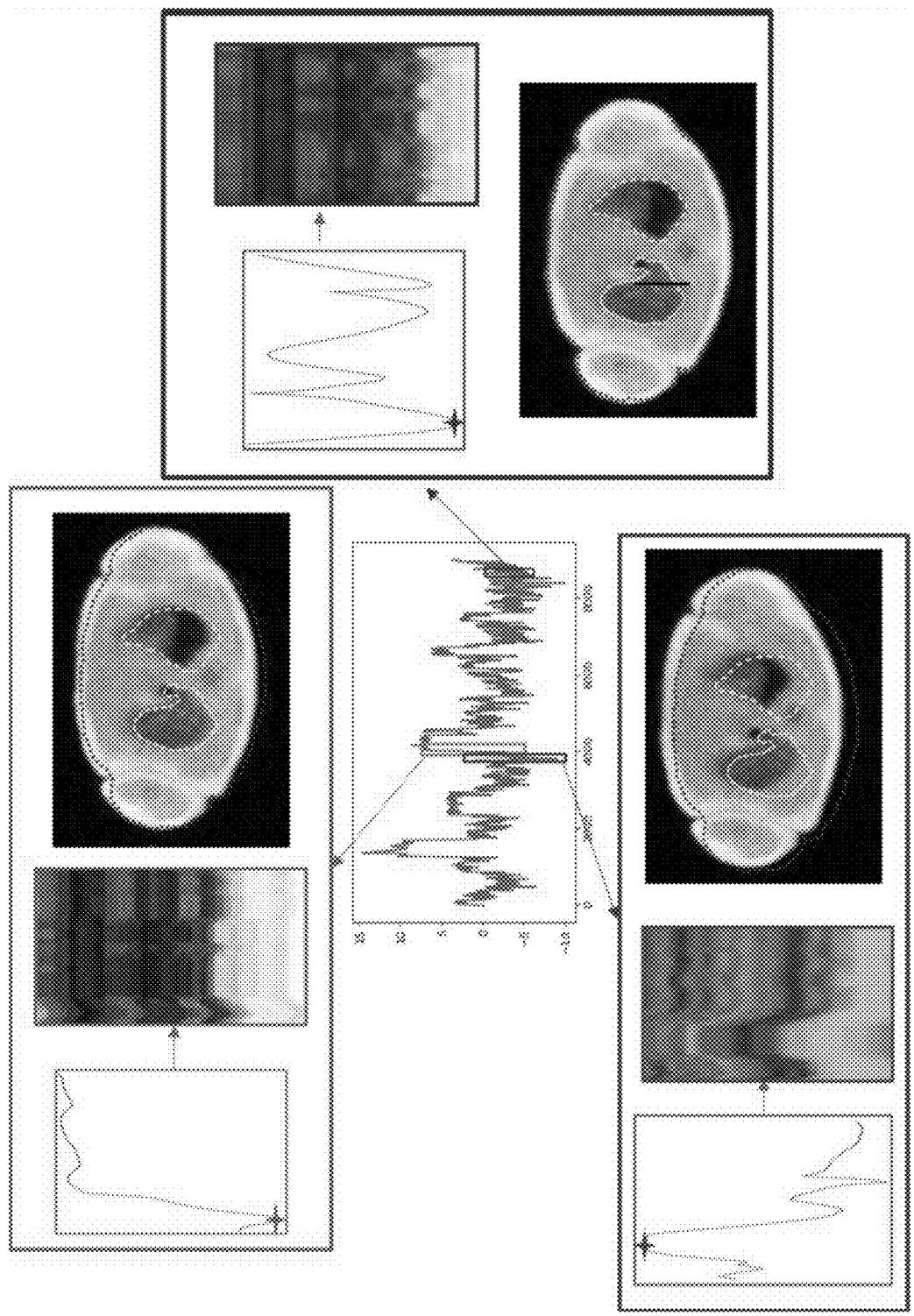
FIG. 21A shows the latent vectors estimated from the proposed scheme, and three parts are zoomed to study the bulk motions.
Figure 21B:
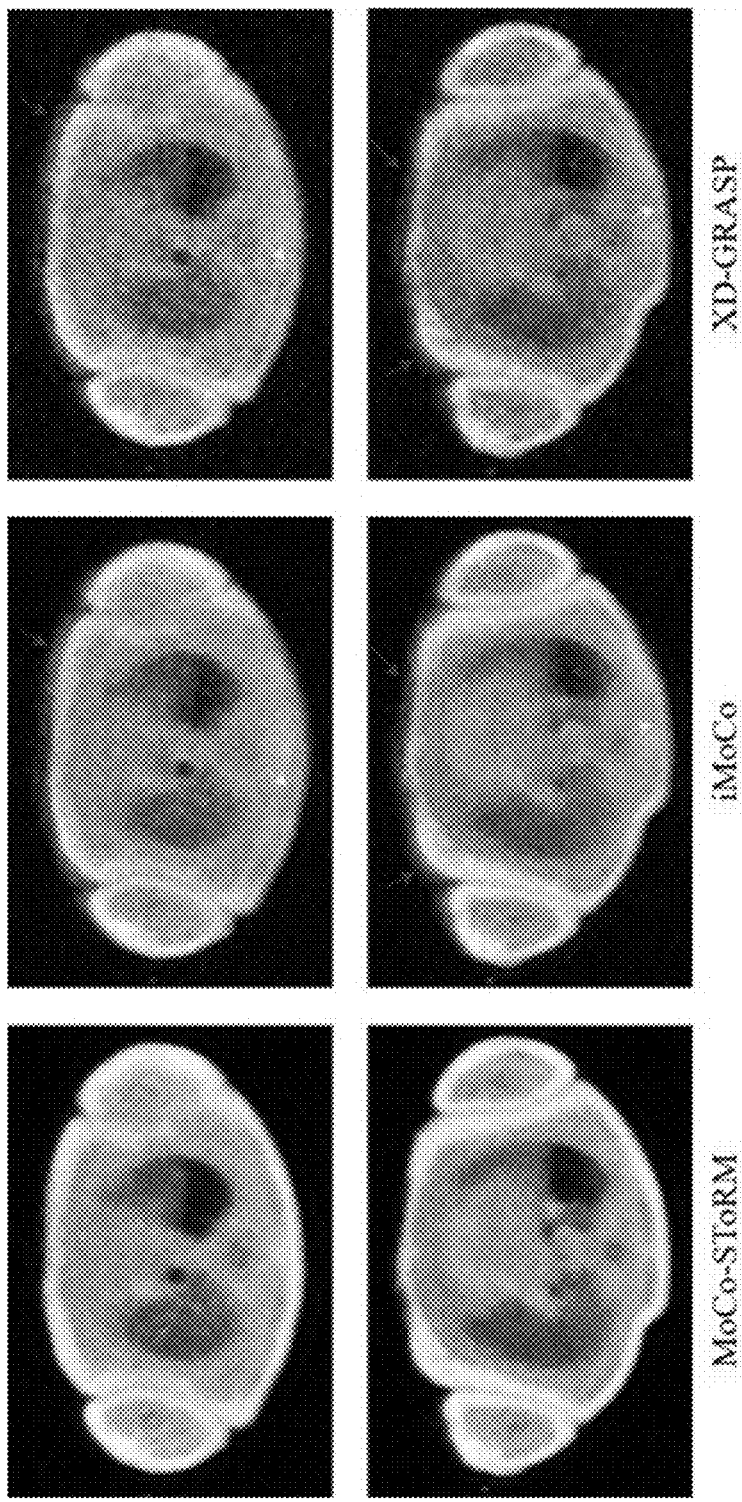
In FIG. 21B and FIG. 21C, we showed the comparison of the reconstructions from different methods based on the two different views. We can see that iMoCo and XD-GRASP suffered from heavy motion artifacts and failed to capture any details in the lung.
Figure 21C:
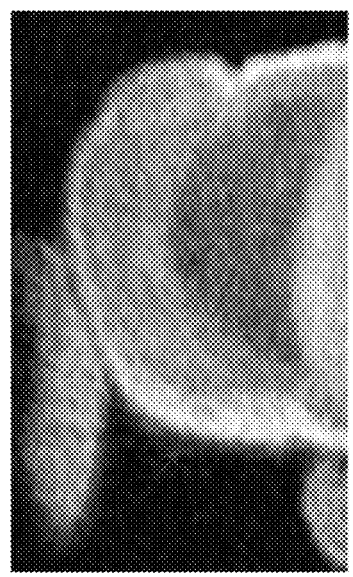
Figure 21C:
Figure 21C:

4.4.2. Feasibility study in neonatal imaging: Neonatal subjects often suffer from several developmental lung disorders; the non-ionizing nature of MRI radiation makes it the ideal modality to image the lung of these subjects [43,44,45]. A low-field, low-footprint MRI system was considered in [43,45]. By imaging the neonatal subjects within the NICU, this approach minimizes the risk of infection. The subject was imaged using a body coil, which offers limited SNR compared to the multi-coil array used in the adult setting. One of the main challenges with neonatal MRI is bulk motion, especially when the subjects are awake. In this work, we study the feasibility of the proposed scheme to offer motion compensation in a challenging subject with extensive bulk motion, which was challenging for the conventional methods. We show the results in FIG. 21A to FIG. 21C. In FIG. 21A, we show the motion signal (latent vectors) estimated from the proposed MoCo-SToRM scheme. We note that there are several discontinuities in the latent signal, which correspond to bulk motion events. Two of the bulk motion events are highlighted in the red and purple boxes, respectively. Besides the two examples of bulk motion, we also zoom into a section with no bulk motion. We also show the reconstructed images corresponding to the marked positions in the latent vectors in each of the subseries in the respective boxes. The bulk motions in the two examples can be clearly seen from the boundary of the body, denoted by the red dotted curve. Furthermore, we see that when the patient was in different positions, the shape of the lung was different, as indicated by the yellow dotted curves. In FIG. 21B, we show the comparisons with iMoCo and XD-GRASP based on two slices from the axial view. From the figure, we see that MoCo-SToRM is able to reduce the motion artifacts, as indicated by the red arrows in the figures. Furthermore, we can see that the boundaries in iMoCo and XD-GRASP are blurred out due to bulk motions, as shown by the yellow arrows. However, MoCo-SToRM is able to reconstruct the boundaries. Also, we can see that some details in the lung region are captured in the MoCo-SToRM reconstructions, as indicated by the green arrows. FIG. 21C shows the sagittal view of the comparisons.

4.5. Maximum Intensity Projections of the Reconstructions

Figure 22:
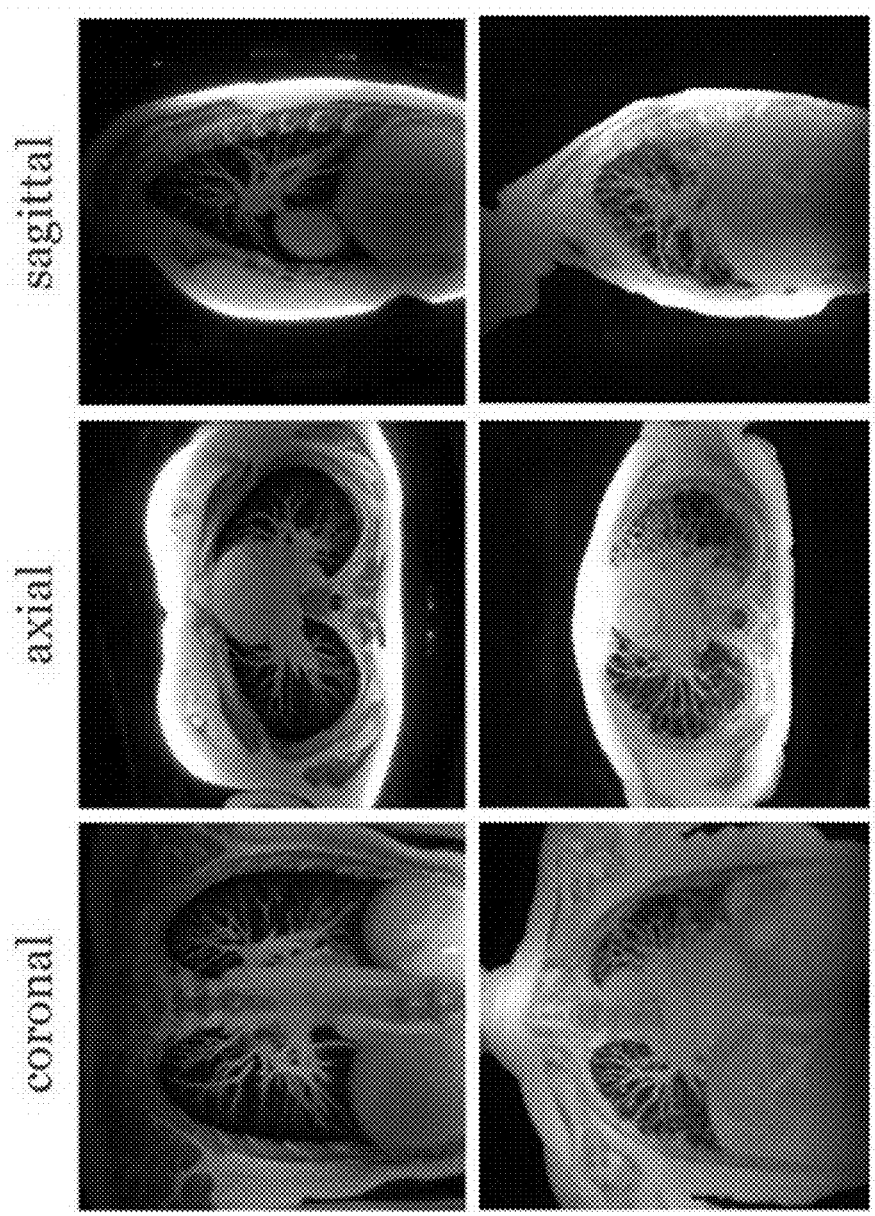
FIG. 22 showcases of the proposed scheme on the post-contrast data from both the healthy subject and the fibrotic subject. Maximum intensity projection of three views are shown for each dataset.
Figure 23C:
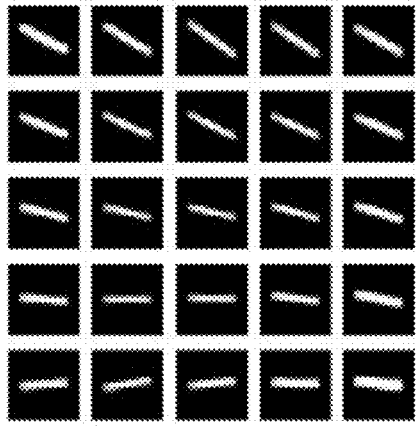
FIG. 23A, FIG. 23B, FIG. 23C, FIG. 23D, FIG. 23E, and FIG. 23F illustrate variational manifold learning in the context of learning the digit 1 from the MNIST dataset. We first trained the variational model from the fully sampled data.
Figure 23F:
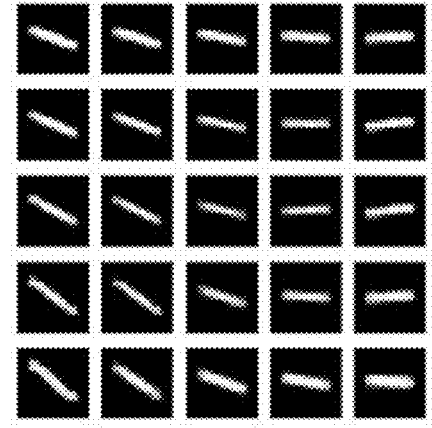
Figure 23B:
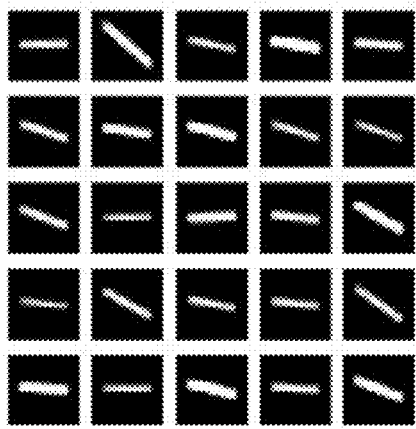
Figure 23E:
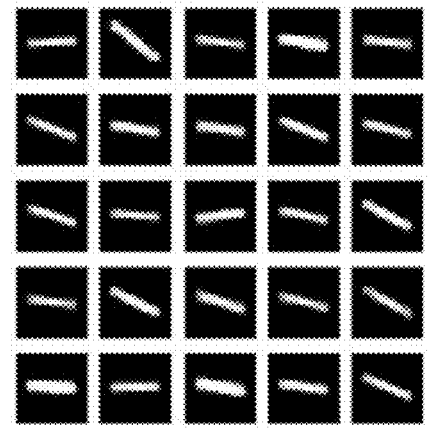
Figure 23A:
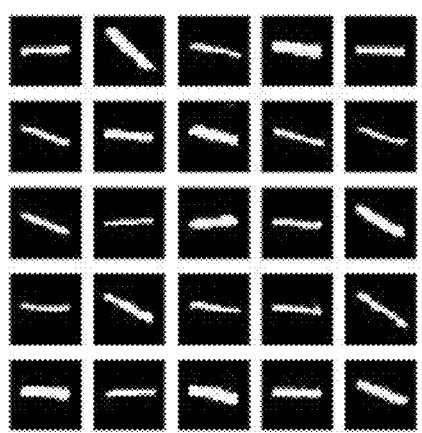
Figure 23D:
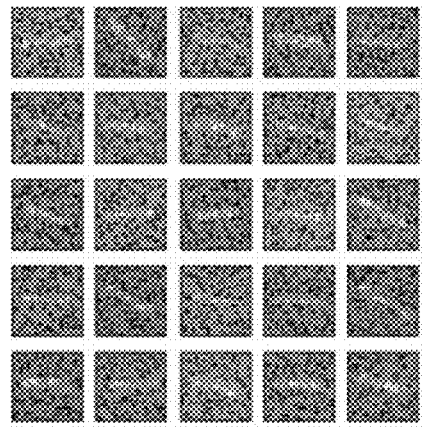

In this section, we show some results that we obtained from the proposed MoCo-SToRM reconstructions. In FIG. 22, we show the reconstructions obtained from two post-contrast datasets, one from a healthy subject and anther from a diseased subject. Maximum intensity projection (MIP) [70] is used to generate the results. MIP is known to have the benefit that the vascular structures can be clearly seen as tubular and branching structures in MIP images [71]. By showing the three views for the reconstruction using MIP, the lung structure and vascular structures for each subject can be seen in a direct way, which can be readily used by doctors in clinics. For each sub-figure in FIG. 22, 20 slices are used for MIP images.

More results, including some movies on the reconstructions and showcases of the bulk motions in both the adult subject and the neonatal subject, can be found on our website: https://sites.google.com/view/qing-zou/blogs/moco-storm.

5. Discussion & Conclusion

In this work, we proposed an unsupervised motion-compensated scheme using smoothness regularization on manifolds for the reconstruction of high-resolution free-breathing lung MRI. The proposed algorithm jointly estimates the latent vectors that capture the motion dynamics, the corresponding deformation maps, and the reconstructed motion-compensated images from the raw k-t space data of each subject. Unlike current motion-resolved strategies, the proposed scheme is more robust to bulk motion events during the scan, which translates to less blurred reconstructions in datasets with extensive motion. The proposed approach may be applicable to pediatric and neonatal subjects that are often challenging to image using traditional approaches. In this study, we restricted our attention to 1-D latent vectors. In our future work, we will consider its extension using higher-dimensional latent space, which will allow improved robustness to different motion components, including cardiac motion and bulk motion. The challenge with the direct extension of the proposed scheme to this setting is the increased computational complexity.

A difference between the proposed scheme and the motion-resolved reconstruction is that rather than just resolve some phases, the proposed scheme is able to get the temporal-resolved reconstruction with 0.1 s temporal resolution. This means that we are able to have more intermediate motion states (~25 states) between the exhalation state and the inhalation state. The proposed MoCo-SToRM scheme is also able to deal with bulk motions as discussed in the previous section. This offers the possibility of using the proposed scheme for patient groups such as pediatric patients.

Part III: Variational Manifold Learning From Incomplete Data: Application to Multislice Dynamic MRI

I. INTRODUCTION

Deep generative models [72] that rely on convolutional neural networks (CNNs) are now widely used to rep-resent data living on nonlinear manifolds. For instance, the variational autoencoder (VAE) [73] represents the data points as CNN mappings of the latent vectors, whose parameters are learned using the maximum likelihood formulation. Since the exact log-likelihood of the data points is intractable, VAE relies on the maximization of a lower bound of the likelihood, involving an approximation for the conditional density of the latent variable represented by an encoder neural network. The VAE framework offers several benefits over the vanilla autoencoder [72], including improved generalization [74] and ability to disentangle the important latent factors [76], [76]. Unfortunately, most of the current generative models are learned from fully sampled datasets. Once learned, the probability density of the data can be used as a prior for various applications, including data imputation [77, 78]. Unfortunately, fully-sampled datasets are often not available in many high-resolution structural and dynamic imaging applications to train autoencoder networks.

The main focus of this paper is to introduce a variational framework to learn a deep generative manifold directly from undersampled/incomplete measurements. The main application motivating this work is the multislice free-breathing and ungated cardiac MRI. Breath-held CINE imaging, which provides valuable indicators of abnormal structure and function, is an integral part of cardiac MRI exams. Compressed sensing [79]-[82] and deep learning methods have emerged as powerful options to reduce the breath-hold duration, with excellent performance [83]-[87]. Despite these advances, breath-held CINE imaging is challenging for several subject groups, including pediatric and chronic obstructive pulmonary disease (COPD) subjects. Several authors have introduced self-gating [3, 4, 5, 39, 88, 89] and manifold approaches [11]-[12], [90]-[92] to enable free-breathing and ungated single-slice cardiac MRI. For instance, the smoothness regularization on manifolds (SToRM) ap-proach [8]-[10] models the images as points on a low-dimensional manifold whose structure is exploited using a kernel low-rank formulation [8], [10] to recover the im-ages from highly undersampled measurements. Recently, deep learning-based manifold models were introduced [51, 52, 57] to further improve the performance; these schemes learn a deep generative network and its latent variables directly from the measured k-space data using a non-probabilistic formulation.

All of the previously described free-breathing cardiac MRI reconstruction approaches (e.g., compressed sensing-based approaches, manifold approaches, and deep learning-based approaches) independently recover the data from each slice. Cardiac MIII often relies on slice-by-slice acquisition to preserve myocardium to blood pool contrast, resulting from the in-flow of blood from unexcited regions to the slice of interest; the improved contrast facilitates segmentation. The above-mentioned 2D self-gating and manifold methods are thus unable to exploit the extensive redundancies between adjacent slices, which could offer improved performance. Note that the respiratory and cardiac motion during the acquisition of the different slices is often very different; this makes the direct 3D extension of the 2D self-gating and manifold methods impossible. Another challenge with the approaches mentioned above is the need for post-processing methods to determine matching slices at specific cardiac/respiratory phases for estimation of cardiac parameters (e.g., ejection fraction, strain). Several post-processing methods have been introduced to align the data post reconstruction [91], [93]-[96]. Because these methods require fully sampled data, they will not facilitate the exploitation of the inter-slice redundancies during image recovery.

We introduce a novel variational framework for the joint recovery and alignment of multislice data from the entire heart. This approach combines the undersampled k-t space data from different slices, possibly acquired with multiple cardiac and respiratory motion patterns, to recover the 3D dynamic MRI dataset. We use a 3D CNN generative model, which takes in a latent vector and outputs a 3D image volume. The time-varying latent vectors capture the intrinsic variability in the dataset, including cardiac and respiratory motion. The latent variables and the parameters of the 3D CNN are jointly learned from the multislice k-t space data using a maximum likelihood formulation. Since the likelihood is not tractable, we maximize its variational lower bound involving a model for the conditional distribution of the latent variables, which is conceptually similar to the VAE approach [73]. The VAE scheme uses an encoder network to derive the conditional probabilities of the latent vectors from fully sampled data [73]. This approach is not directly applicable in our setting because each data sample is measured using a different measurement operator. We hence model the conditional densities as a Gaussian distribution whose parameters are learned from the undersampled data directly using back-propagation. We use a Gaussian prior on the latent variables while deriving the evidence-based lower bound (ELBO); the Gaussian prior ensures that the latent variables from different slices have similar distributions, facilitating the alignment of the slices. We note that the direct extension of our previous generative manifold model [51], [57] to the 3D setting does not have any constraint on the latent variables; this extension results in poor alignment of the slices and degradation in image quality in the 3D setting. We also use smoothness priors on the latent variables to further improve the performance. Once learned, the representation can be used to generate matching 3D volumes with any desired cardiac/respiratory phase by exciting the generator with appropriate latent vectors. This approach of learning a generative model of the entire heart may thus be viewed as a paradigm shift from conventional slice-by-slice image-recovery algorithms [3]-[5], [88]-[92], [8]-[12], [39].

II. BACKGROUND ON DYNAMIC MRI

A. Multislice Free-Breathing MRI: Problem Statement

The main application considered in this paper is the recovery of 3D cardiac volumes of the heart from undersampled 2D multislice k-t space data acquired in the free-breathing and ungated setting. In particular, we consider the recovery of the time series $x(r, t_z)$, where $r=(x, y, z)$ represents the spatial coordinates and $t_z$ denotes the time frame during the acquisition of the $z^{th}$ slice. We model the acquisition of the $$b(t_z)=A_{t_z}(x(r,t_z))+n_{t_z}, \quad (22)$$

where $b(t_z)$ is the k-t space data of the $z^{th}$ slice at the $t^{th}$ time frame. Here, $A_{t_z}$ are the time-dependent measurement operators, which evaluate the multi-channel single-slice Fourier measurements of the 3D volume $x(r, t_z)$ on the trajectory $K_{t_z}$ corresponding to the time point t. Specifically, $t_z$ extracts the $z^{th}$ slice from the volume $x(r, t_z)$ and evaluates its single-slice measurements. $n_{t_z}$ represents the noise in the measurements.

B. CNN-Based Generative Manifold Models in Dynamic MRI

CNN-based generative models were recently introduced for single-slice dynamic MRI [51]. This scheme models the 2-D images in the time series as the output of a CNN generator $D_\theta$:

$$x_i=D_\theta(c_i), i=1, \ldots, M.$$

The input $c_i$ is the latent vector, which lives in a low-dimensional subspace. The recovery of the images in the time series involves the minimization of the criterion $$C(c, \theta) = \sum_{i=1}^{N} \underbrace{\|A_i(D_\theta(c_i)) - b_i\|^2}_{\text{data intern}} + \lambda_1 \underbrace{\|J_c D_\theta(c)\|^2}_{\text{net reg.}} + \lambda_2 \underbrace{\|\nabla_i c_i\|^2}_{\text{latent reg.}}. \quad (23)$$

The first term in the cost function is a measure of data consistency, while the second term is a network regularization term that controls the smoothness of the generated manifold [51]. The last term is the temporal smoothness of the latent variables, which is used to further improve the performance.

III. VARIATIONAL MANIFOLD LEARNING

We now introduce a novel variational formulation to learn a manifold from undersampled measurements, which is the generalization of the seminal VAE approach [73] to the under-sampled setting. We will first present the proposed approach in a simple and general setting for simplicity and ease of understanding. The use of this variational manifold model for the joint alignment and recovery of 3D images from 2-D multislice MRI data will be described in Section IV.

A. General Problem Statement and Intuition

We assume that the images in the time series, indexed by i, live on a smooth manifold M and hence can be modeled as the output of a CNN-based generator:

$$x_i = D_\theta(c_i), \quad (24)$$

where $c_i$ is the low-dimensional latent variable corresponding to $x_i$. Here, $\theta$ denotes the weights of the generator, which is shared for all the images.

Most generative models consider the learning of the above model from fully sampled data. By contrast, we consider the recovery from incomplete measurements $$b_i = A_i(x_i) + n_i \quad (25)$$

Here is an undersampled measurement operator corresponding to the $i^{th}$ image frame. Here, $n_i \in \mathcal{N}(0, \sigma^2 I)$ are noise vectors. Note that the measurement operators for each $x_i$ are different. If the same sampling operators are used for all the data points, it is impossible to recover the images without additional prior information. We assume that the sampling operators satisfy the following properties:

We assume $A_i$ to be a rectangular sub-matrix, obtained by picking specific rows of an orthonormal measurement operator (e.g., Fourier transform).

We assume that the measurement operators A~S are drawn from a distribution and satisfy $$\mathbb{E}_{A \sim S}[A^T A] = I, \quad (26)$$

which is the identity operator. The above condition guarantees diversity in the measurement operators.

We now provide some intuition about why the learning of the model with the above settings will succeed under the restrictive assumptions on the measurement operators described above. In the noiseless setting, we consider the learning of the latent variables $c_i$ and the weights $\theta$ by minimizing the empirical error:

$$\{\theta^*, c_i^*\} = \underset{\theta, c_i}{\operatorname{argmin}} \underbrace{\sum_i \|A_i(x_i - D_\theta(c_i))\|^2}_{\mathcal{L}}. \quad (27)$$

Here, $x_i$ are the fully sampled data points. When A~S, this empirical sum approximates $$\mathcal{L} = \mathbb{E}_{x \sim M} \mathbb{E}_{A \sim S} \|\mathcal{A}(x - \mathcal{D}_\theta(c))\|^2 = \mathbb{E}_{x \sim M} \mathbb{E}_{A \sim S} \langle x - \mathcal{D}_\theta(c), A^H A(x - \mathcal{D}_\theta(c)) \rangle =$$

$$\mathbb{E}_{x \sim M} \langle x - \mathcal{D}_\theta(c), \underbrace{\mathbb{E}_{A \sim S}[A^H A]}_{I} (x - \mathcal{D}_\theta(c)) \rangle = \underset{\theta, c}{\operatorname{argmin}} \mathbb{E}_{x \sim M} \|x - \mathcal{D}_\theta(c)\|^2.$$

The above result follows from (26) and the orthonormality of the full measurement operator. This result shows that the recovery of the true manifold is feasible from undersampled data when the sampling operators satisfy the properties listed above.

B. Proposed Algorithm

We consider the recovery of the images xi from their measurements (25) by maximizing their likelihood, specified by $$p(b_i) = \frac{p(b_i, c_i)}{p(c_i \mid b_i)} \quad (28)$$

We note that the posterior $p(c_i|b_i)$ is not tractable. Following the VAE approach in [73], we use a surrogate distribution to approximate $p(c_i|b_i)$. The VAE formulation uses an encoder network to model $p(c_i|x_i)$ from the fully sampled data ($b_i=x_i$). Unfortunately, this approach is not directly applicable in our setting since bi is the under-sampled data, measured using $A_i$ that vary with i.

We propose to use a Gaussian model $q_i(c_i) \approx p(c_i|b_i)$, parameterized by its mean $\mu_i$ and diagonal covariance matrix $\Sigma_i$, and to estimate these parameters using back-propagation. Following a similar argument as in [73], we show in the Appendix that the likelihood term in (28) can be lower-bounded as $$\log p(b_i) \geq \underbrace{-\frac{1}{2\sigma^2} \mathbb{E}_{c_i \sim q_i(c_i)} \left[ \|A_i \mathcal{D}_\theta(c_i) - b_i\|^2 \right]}_{\text{data term}} \underbrace{KL[q_i(c_i) \| p(c_i)]}_{L(q_i): \text{latent regularization}}. \quad (29)$$

Here, $p(c_i)$ is a prior on the latent variables. In this work, we assume $p(c_i) = \mathcal{N}(0, I)$, where I is the identity matrix. In this case, the KL divergence can be explicitly evaluated as $$L(c_i) = \frac{-\log[\det(\Sigma)] - n + \operatorname{trace}(\Sigma) + \mu^T \mu}{2},$$

where we assume a latent space of dimension n.

We hence solve for the unknown weights of the generator $\theta$ as well as the parameters of $q_i$ denoted by $\mu_i$ and $\Sigma_i$ by minimizing the negative of the lower bound in (29).

Following [73], we use a Monte-Carlo approach to approximate the expectation in the data term. In particular, at each epoch of the training loop, we derive the samples $c_i$ as $$c_i = \mu_i + \Sigma_i \epsilon, \quad (30)$$

where $\epsilon$ is a zero-mean unit variance Gaussian random variable. At each iteration, the estimation process thus involves the minimization of the criterion $$C\left(\theta, \underbrace{\{\mu_i, \Sigma_i\}}_{q_i}\right) = \sum_{i=1}^{Ndata} \left(\|\mathcal{A}_i \mathcal{D}_\theta(c_i) - b_i\|^2 + \sigma^2 L(q_i)\right), \qquad (31)$$

with respect to the unknowns $\theta$, $\mu_i$ and $\Sigma_i$.

C. Illustration Using MNIST Data

We provide a simple example for the illustration of the above variational model from undersampled data of the digit 1 in the MNIST dataset [97]. The images used are scaled to the range [−1, 1].

The generator we used here is a simple CNN with three layers. ReLU activation function is used for the first two layers and tan h is used for the last layer. The dimension of the latent space is chosen as 2. In this example, all the trainable parameters are initialized as small random numbers, and the hyper-parameter for the latent regularization $L(c_i)$ is chosen as 1. We used 1,000 epoches to train the CNN generator.

We first trained the model from the fully sampled data ($\mathcal{A}_i = I$), whose results are shown in the first row of FIG. 23. Then we trained the model from undersampled noisy data. In the example, 70% of the pixel values in each image are missing, while Gaussian white noise with standard deviation 0.05 is added to the known 30% pixel values. The recovered images are shown in the second row of FIG. 23. We report the peak signal-to-noise ratio (PSNR) and the structural similarity index measure (SSIM) for the results.

IV. APPLICATION TO DYNAMIC MRI

We first describe the application of the algorithm in the single-slice free-breathing and ungated data, which is the setting considered in [51]. We then generalize the approach to the novel setting of the joint alignment and recovery of 3D MRI from multislice free-breathing data in Section IV-C.

A. Acquisition Scheme and Pre-Processing of Data

The datasets used in this work are acquired using a 2D (GRE) sequence with golden angle spiral readouts in the free-breathing and ungated setting on a MR750W scanner (GE Healthcare, Waukesha, WI, USA). The sequence parameters for the datasets are: FOV=320 mm×320 mm, flip angle=18°, slice thickness=8 mm. The datasets were acquired using a cardiac multi-channel array with 34 channels. The Institutional Review Board at the University of Iowa approved the acquisition of the data, and written consents were obtained from the subjects. The number of slices acquired for different subjects varies.

We used an algorithm developed in house to pre-select the coils that provide the best signal-to-noise ratio in the region of interest. A PCA-based coil combination scheme was then used such that the approximation error was less than 5%. We then estimated the coil sensitivity maps based on these virtual channels using ESPIRiT [98] and assumed them to be constant over time.

A total of 3,192 spirals were acquired for each slice in the subjects with TR=8.4 ms, which corresponds to an acquisition time of 27 seconds. Among the 3,192 spirals, every sixth spiral was acquired with the same angle; these spirals were used for self-navigation in the reconstruction methods that require self-navigation. We binned the data from six spiral interleaves corresponding to 50 ms temporal resolution for each frame.

B. Single-Slice Variational SToRM Algorithm

Figure 24A:
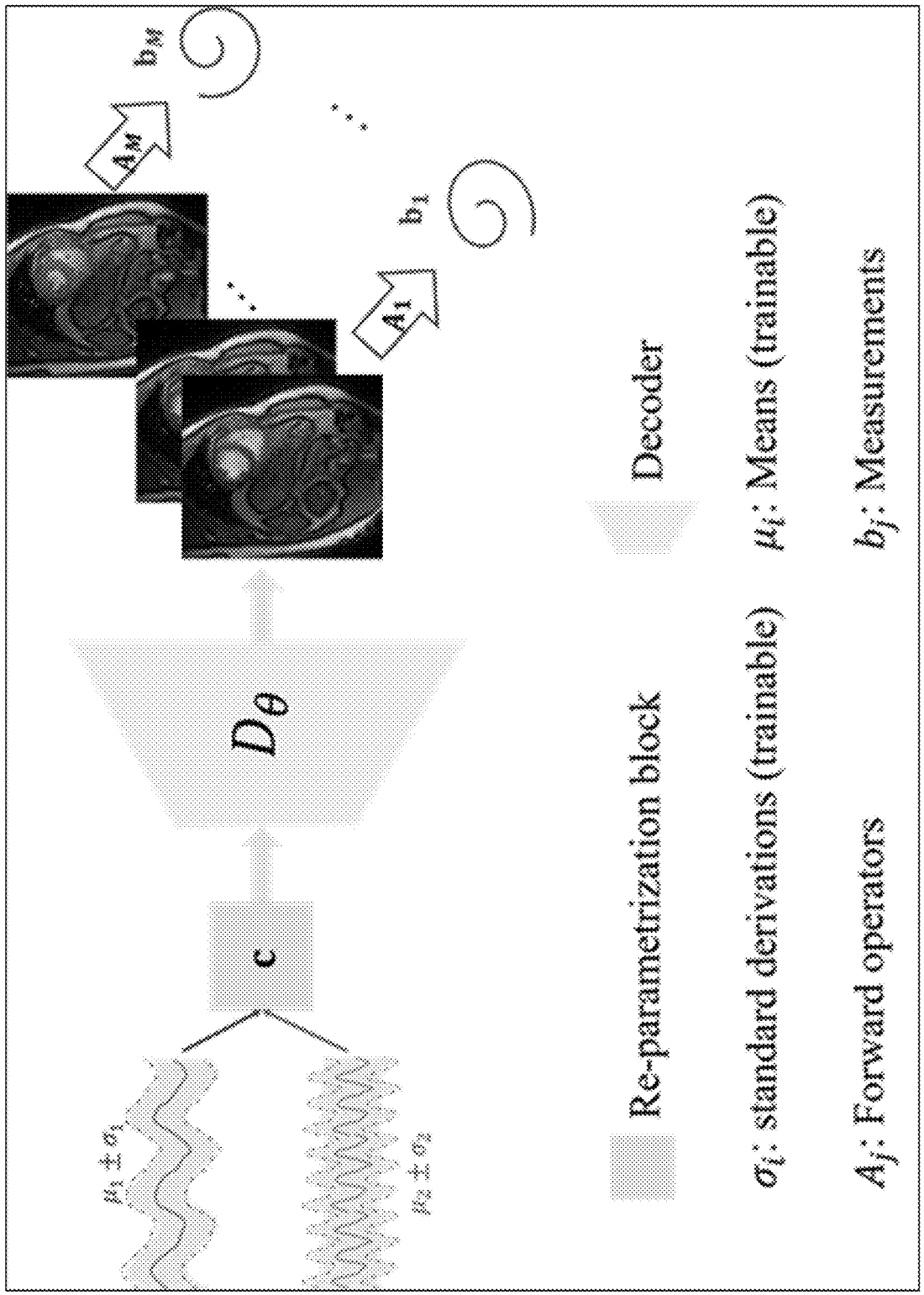
FIG. 24A and FIG. 24B illustrate the proposed variational SToRM (V-SToRM) scheme.

Based on the analysis in the previous sections, we use the following scheme for the recovery of single-slice dynamic MRI. We use a re-parameterization layer to obtain the latent variables c(t) from the time-varying probability distributions q(c(t)) with parameters $\mu_t$ and $\Sigma_t$. These latent variables are fed to the CNN generator $\mathcal{D}_\theta$, which generates the reconstructed volumes x(t)=$\mathcal{D}_\theta$(c(t)). The multi-channel, non-uniform, Fourier transform-based forward operators are applied on the reconstructed images, which are then compared to the actual noisy measurements $b_i$. The illustration of this scheme is shown in FIG. 24A. The parameters in the generator and the $\mu_i$ and $\Sigma_i$ are updated based on the loss function $$\mathcal{L}(\theta, \{\mu_t, \Sigma_t\}) = C(\theta, \{\mu_t, \Sigma_t\}) + \lambda_1 \|\theta\|_1^2 + \lambda_2 \|\nabla \mu_t\|^2. \qquad (32)$$

Here, $C(\theta, \{\mu_t, \Sigma_t\})$ is defined in (31), which is the lower bound for maximum likelihood estimation. The second term in (32) is a regularization penalty on the generator weights. It has been shown in [51] that adding this term makes the training of the decoder more stable. The third term involves the temporal gradients of the latent vectors, which enforces the latent vectors to capture the smooth nature of motion patterns in the dynamic images. We use the ADAM optimization to determine the optimal parameters. We also adopt the progressive-in-time training strategy introduced in [51] to realize a computationally efficient reconstruction. We term this dynamic MRI reconstruction scheme as single-slice variational SToRM.

C. Multislice Variational SToRM Algorithm

We now generalize the single-slice variational SToRM scheme for the joint alignment and recovery of multislice dynamic MRI. We assume that the image volume at the time point t during the acquisition of the $z^{th}$ slice, denoted by $x(r, t_z)$, as the output of the generator:

$$x(r, t_z) = \mathcal{D}_\theta(c(t_z)).$$

Figure 24B:
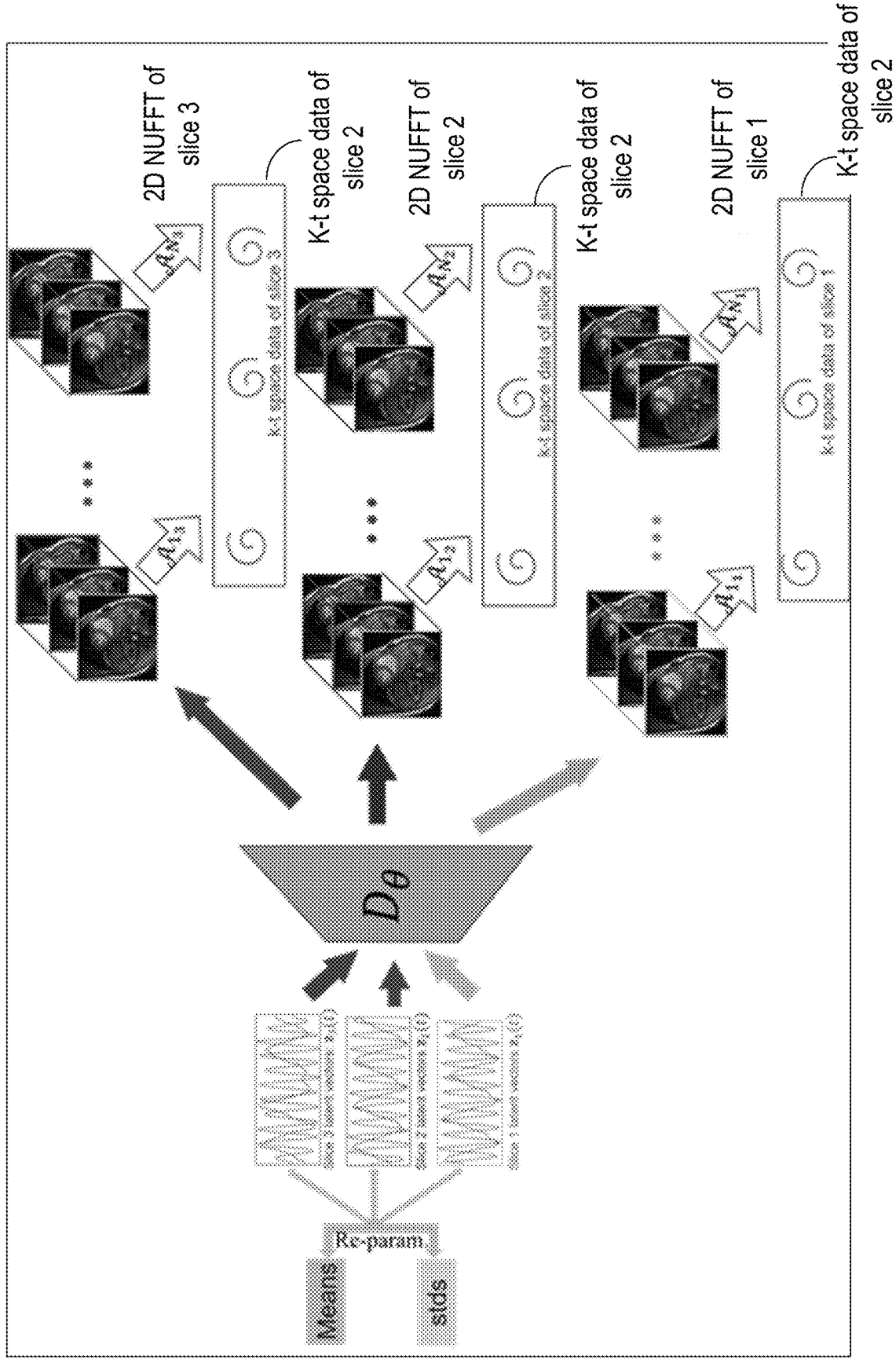

Here, $c(t_z)$ are the low-dimensional latent vectors corresponding to slice z at the time point t, which is formed by the reparameterization layer. We note that the generator $\theta$ is shared across all slices and time points; this approach facilitates the exploitation of the spatial redundancies between the slices and time points. We propose to jointly align and reconstruct the multislice MRI by jointly estimating the parameters $\theta$, $\mu(t_z)$ and $\Sigma(t_z)$ from the measured multislice data by minimizing the following cost function:

$$\mathcal{L}_{MS}(\theta, \mu(t_z), \Sigma(t_z)) = C_{MS}(\theta, \mu(t_z), \Sigma(t_z)) + \lambda_1 \|\theta\|_1^2 + \lambda_2 \|\nabla_{t_z} \mu(t_z)\|^2. \qquad (33)$$

where $$C_{MS} = \sum_{z=1}^{Nslice} \sum_{t=1}^{Ndata} |\mathcal{A}_{t,z}[\mathcal{D}_\theta(c(t_z))] - b_{t_z}\|^2 + \sigma^2 L(q(t_z))$$

is the lower bound for maximum likelihood as the first term in (32). The illustration of this scheme is given in FIG. 24B. The parameters of the shared 3D generator $\mathcal{D}_\theta$ are jointly learned in an unsupervised fashion from the measured k-t space data using the ADAM optimization algorithm. After the training process is complete, we will generate the image time series by feeding the generator with the latent variables of any specific slice. Following successful learning, we expect the volumes of the multislice reconstructions to have the same motion patterns characterized by the latent variables of that particular slice. We refer to this dynamic MRI reconstruction scheme as multislice variational SToRM, or V-SToRM.

D. Comparison with State-of-the-Art (SOTA) Methods

We compare the proposed V-SToRM approach with the following existing methods.

Analysis SToRM [9]: The analysis SToRM model uses a kernel low-rank formulation, which involves the esti-mation of the manifold Laplacian matrix from the k-space navigators using kernel low-rank regularization. This Laplacian is then used to solve for the images. We note that the analysis SToRM approach has been demonstrated to yield improved performance over state-of-the-art self-gated methods, as shown in our prior work [9,10]. We refer to this approach as A-SToRM.

Single-slice generative SToRM [51]: The single-slice generative SToRM approach uses a CNN generator to generate the single-slice image series from the highly undersampled k-t space data. This scheme does not rely on a variational formulation. It performs the independent recovery of each slice and hence fails to exploit the inter-slice redundancies. We refer to this approach as G-SToRM:SS.

Multislice generative SToRM: We extended the single-slice generative SToRM approach without the variational framework to the multislice setting. In particular, we use the CNN generator to produce the image volume; the generator parameters and the latent vectors for each slice are jointly learned. Finally, we feed the latent variables of a particular slice into the generator to obtain the aligned multislice reconstruction. We refer to this approach as G-SToRM:MS.

For the quantitative comparisons, in addition to the SSIM metric, we also use the signal-to-error ratio (SER) defined as $$SER = 20 \cdot \log_{10} \frac{\|x_{ref}\|}{\|x_{ref} - x_{recon}\|}.$$

Here, $x_{ref}$ and $x_{recon}$ represent the reference and the recon-structed images, respectively. The unit for SER is decibel (dB). In our free-breathing and ungated cardiac MRI setting, we usually do not have access to the ground truth. Therefore, in our work, we employ the analysis SToRM method using 25 seconds of data for the reconstruction as the simulated ground truth.

V. EXPERIMENTS AND RESULTS

A. Implementation Details

In this work, we use deep CNN to build the generator. The number of generator output channels is dependent on the specific datasets. For the experiments using the MNIST dataset, the channel is chosen as 1. By contrast, a two-channel output corresponding to the real and imaginary parts of the MR images is used for the rest of the experiments. In the MRI setting, we use a generator of 10 layers. The total number of trainable parameters is about 6 times the size of the image volume. For the convolutional layers in the generator, the activation function is chosen as leaky ReLU [99] except for the final layer, where tan h is used as the activation function. Random initialization is used to initialize the generator network.

The algorithm has three free parameters, $\sigma^2$, $\lambda_1$, and $\lambda_2$. For each method, we optimize these parameters as well as the architecture of the generator on a single dataset such that the reconstructions closely match the 25-second A-SToRM reconstructions. Once the optimal parameters are determined, they are kept fixed for the remaining datasets. Our experiments showed that two latent vectors were sufficient for the good recovery of the single-slice datasets, which correspond to the cardiac and respiratory phases. In the multislice case, we required three to obtain good reconstructions. In this case, two of the three latent vectors captured cardiac and respiratory motion, respectively. The third latent vector seemed to capture a harmonic of the respiratory motion.

B. Single-Slice V-SToRM and Comparisons

Figure 25:
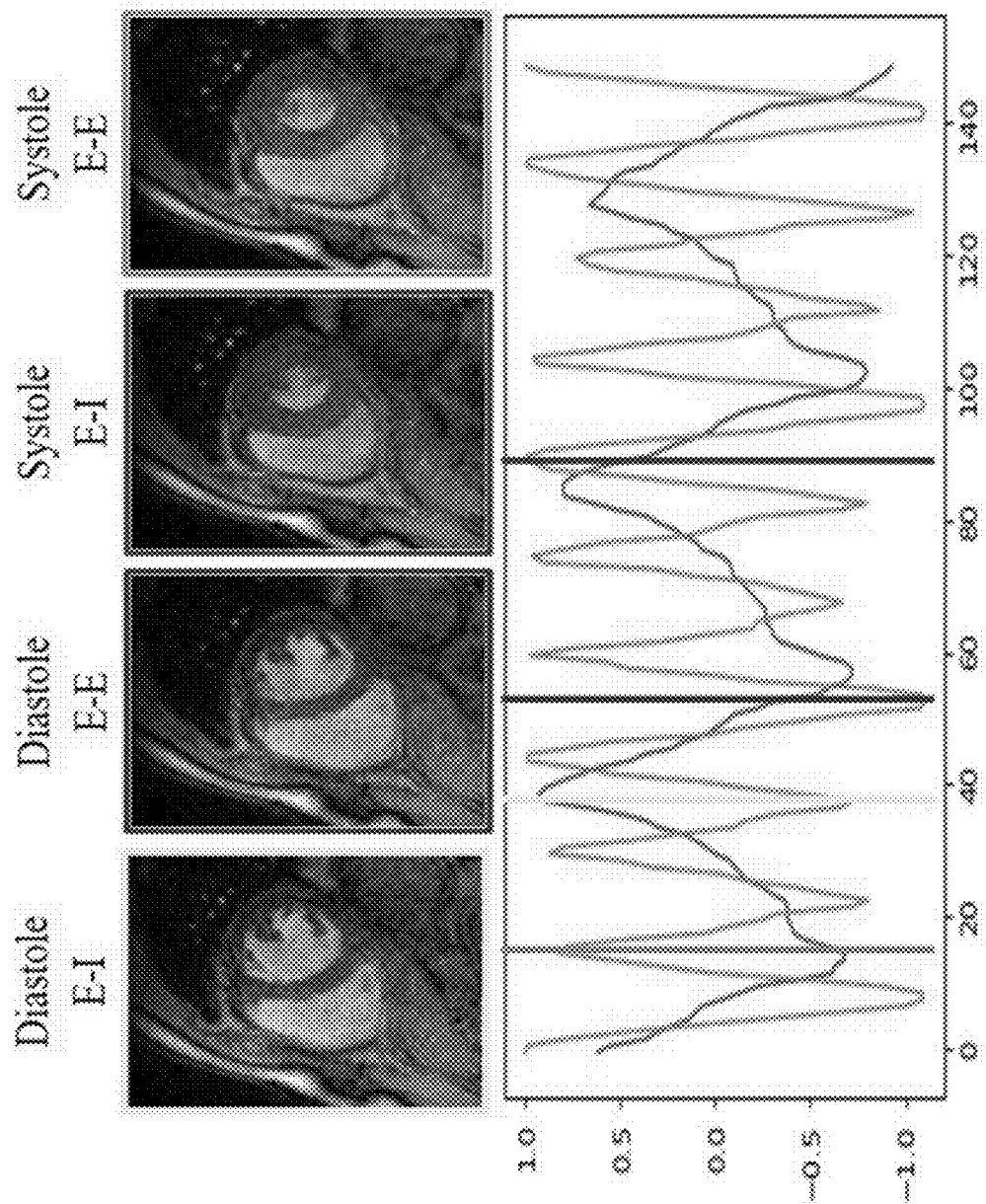
FIG. 25 provides a showcase of the single-slice V-SToRM. We trained the variational model using the data of one slice. We showed four different phases in the time series: diastole in End-Inspiration (E-I), diastole in End-Expiration (E-E), systole in End-Inspiration (E-I), and systole in End-Expiration (E-E), obtained from single-slice V-SToRM. The plot of the latent vectors are shown at the bottom of the figure, and the latent vectors corresponding to the four phases are indicated on the plot of the latent vectors.

In this section, we focus on single-slice V-SToRM; the reconstructions of a dataset and its latent vectors are shown in FIG. 25. We trained the variational model using the data of one slice. The latent vectors we obtained are shown at the bottom of FIG. 25. Four different phases in the time series are shown in the figure, and their corresponding latent vectors are indicated in the plot of the latent vectors.

Figure 26:
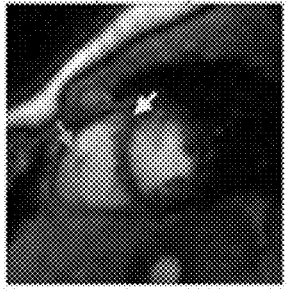
FIG. 26 shows the state-of-the-art methods for single-slice results. The figure shows the visual comparison of three phases: the diastole phase (top row), the systole phase (third row), and the phase that is in between the diastole and systole phases (second row). The first three columns correspond to the reconstructions using the A-SToRM, G-SToRM, and V-SToRM approaches based on 7.5 seconds of data. The last column shows the reconstructions from A-SToRM based on 25 seconds of data; we use these reconstructions as references for quantitative comparisons. We also report the quantitative results at the bottom of the figure.

The comparisons between the single-slice V-SToRM and the state-of-the-art methods on a different dataset are shown in FIG. 26. In these experiments, we compare the region of interest for A-SToRM, G-SToRM, and V-SToRM reconstructions using the 7.5 seconds of data. We use A-SToRM reconstructions from 25 seconds of data as the reference. From FIG. 26, we see that G-SToRM (7.5 s) and V-SToRM (7.5) are able to reduce errors and noise in the images when compared to A-SToRM (7.5 s). The proposed V-SToRM (7.5 s) is able to provide sharper edges than G-SToRM (7.5 s). These observations are further confirmed by the quantitative results shown at the bottom of the figure.

C. Joint Alignment and Recovery of Multislice Data

In this section, we show the results of the joint alignment and recovery of multislice data using the proposed multislice V-SToRM scheme. We also compare the alignment results obtained from the straightforward multislice extension of the G-SToRM scheme. The results are shown in FIG. 5. More results are shown in the supplementary material.

The dataset used in FIG. 27 was acquired with eight slices that covered the whole heart. We trained the variational model based on the undersampled k-t space data and fed the latent vectors corresponding to the second slice to the generator, which produces the aligned multislice reconstructions. Shown in the figures are four time points based on the different phases identified by the latent variables. The rows in FIG. 27A correspond to diastole in End-Inspiration, diastole in End-Expiration, systole in End-Inspiration, and systole in End-Expiration for each slice obtained using the proposed multislice V-SToRM scheme. From FIG. 27A, we see that the proposed multislice V-SToRM scheme is able to jointly reconstruct and align the multislice free-breathing and ungated cardiac MRI. We note that all the slices in each row have the same cardiac phase and respiratory phase.

Figure 27A:
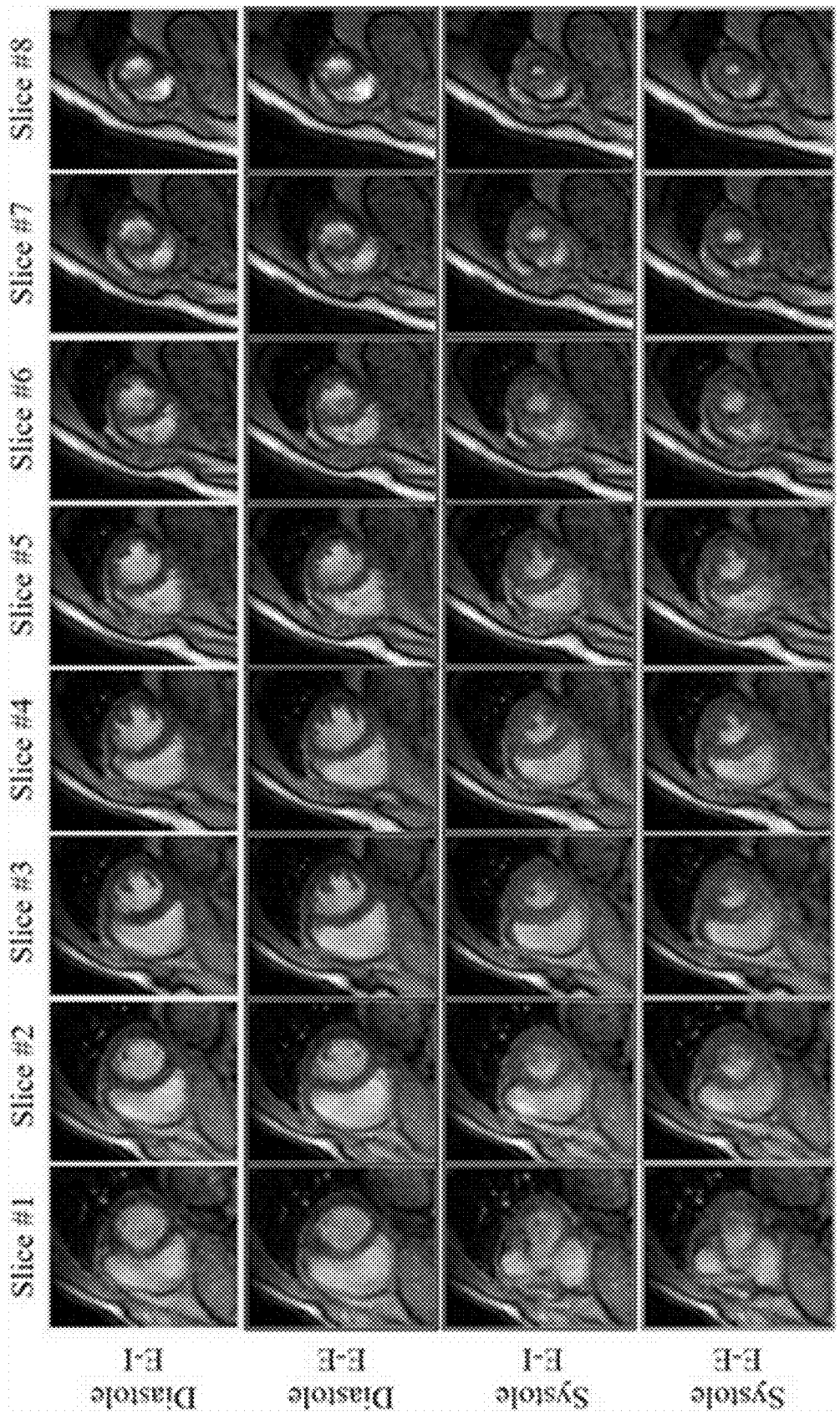
Figure 27B:
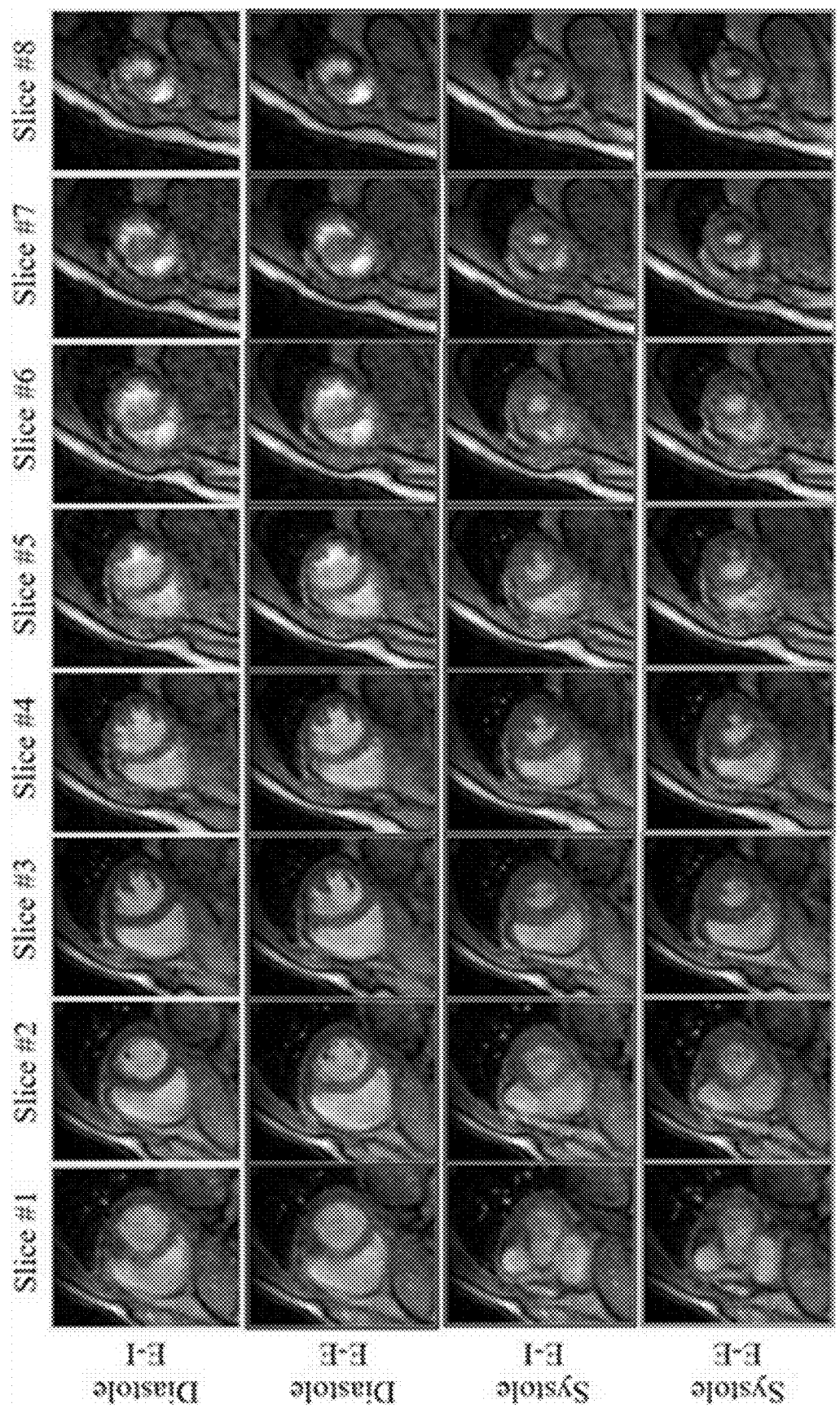

In FIG. 27B, we show the corresponding results for the direct extension of the multislice G-SToRM approach. In particular, we trained the model using the undersampled k-t space data and fed the latent vectors corresponding to the second slice into the generator to produce the aligned multislice reconstructions. From FIG. 27B, we see that the multislice G-SToRM approach has some ability to align the multislice reconstructions. However, we find that the image quality for some of the frames (e.g., slices 5-8) is poor. For example, the diastole phases for the G-SToRM:MS reconstructions are blurred and the cardiac boundaries are missing.

Figure 27C:
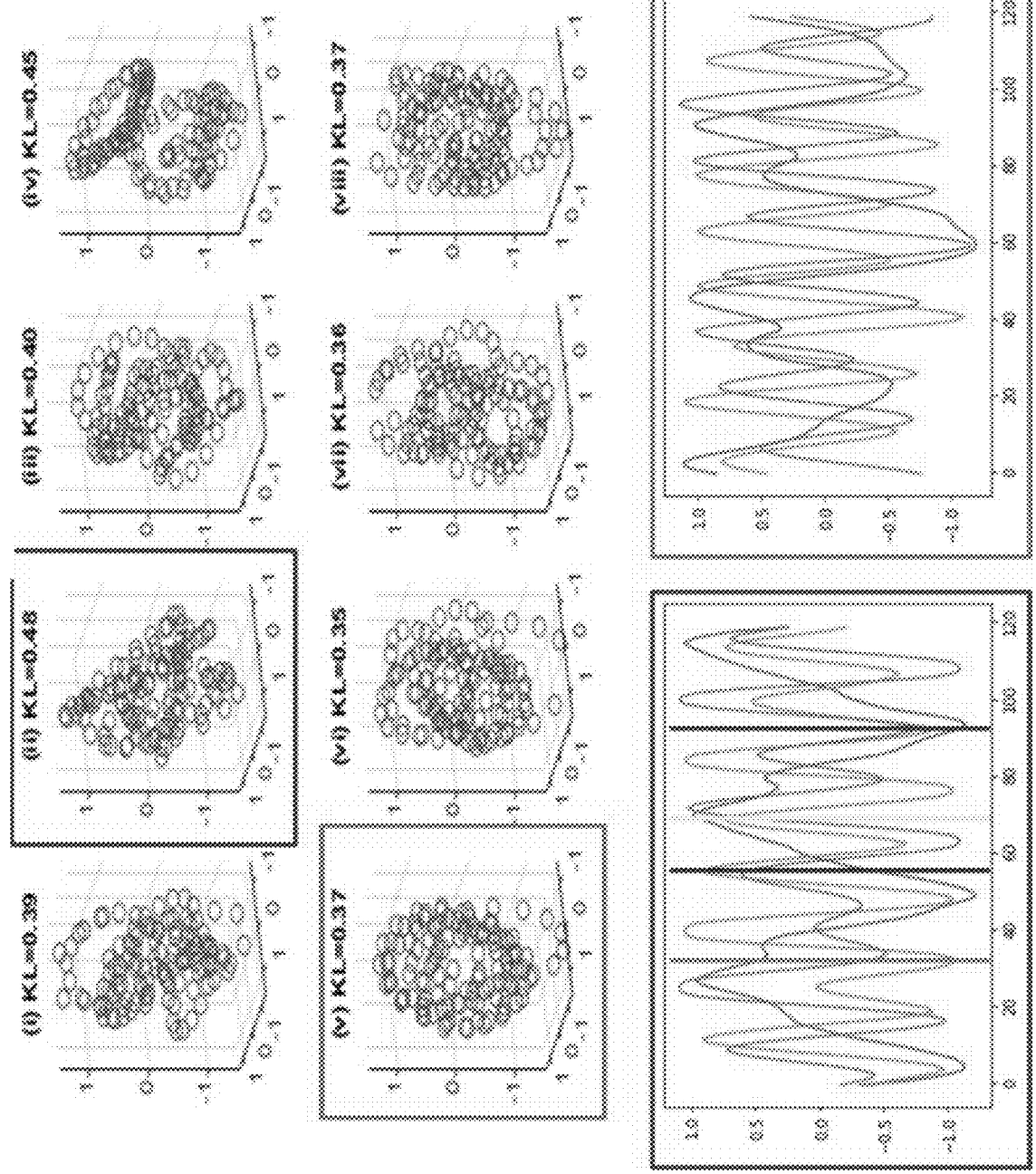
Figure 27D:
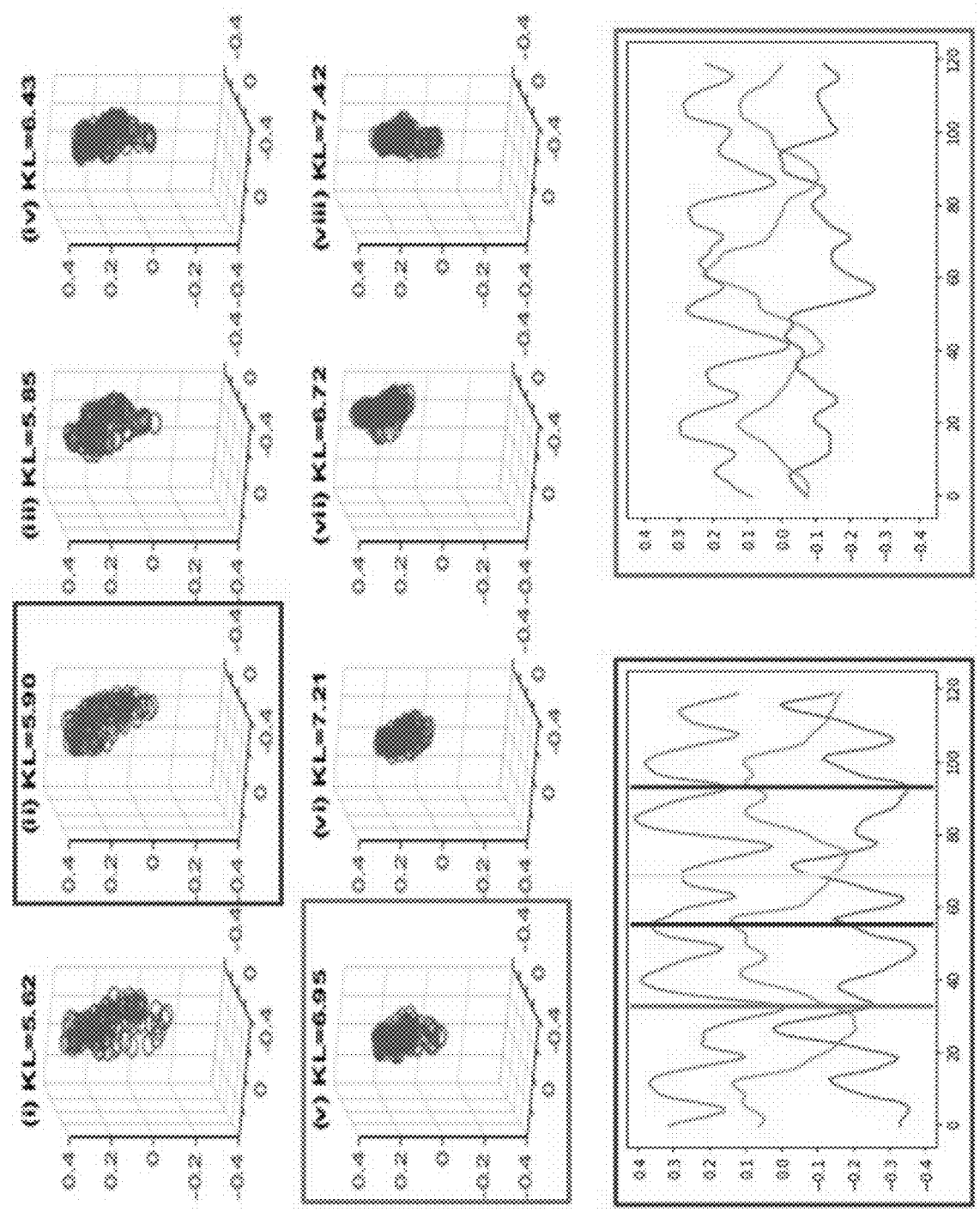

The reason for the poor reconstructions offered by multislice G-SToRM and the improved performance of V-SToRM can be easily appreciated from the distribution of the latent vectors shown in FIG. 27C and FIG. 27D, respectively. The use of the variational formulation in V-SToRM encouraged the latent variables of the slices to approximate a Gaussian distribution. We also reported the KL divergence value compared to $\mathcal{N}(0, I)$ for each set of the latent vector in the figure. We note that the V-SToRM scheme offers low KL divergence values, indicating that the latent distribution of all the slices are roughly similar to a unit Gaussian. By contrast, the G-SToRM scheme cannot guarantee that the latent variables follow any distribution. We note from the top rows of FIG. 27D that the distribution of the latent variables of the second slice is very different from that of the other slices. When we feed the latent vectors of the second slice into the generator, the generator is only able to generate reasonable results for the second slice.

D. Comparison of Image Quality With State-of-the-Art Methods

Figure 28B:
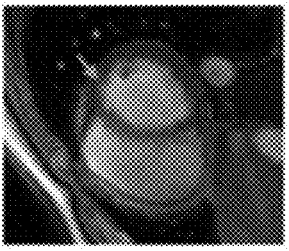
FIG. 28B shows comparisons based on slice #4.

We compare the image quality of the multislice V-SToRM reconstructions with the image quality of the reconstructions from the state-of-the-art methods, including single-slice methods, in FIGS. 28A and 28B. Note that the motion patterns of the slices recovered by the single-slice methods may be very different. For comparison, we manually matched the images of the slices of the single-slice and multislice methods by their cardiac and respiratory phases. The quantitative comparisons of the slices are shown at the bottom of each sub-figure. We also show more results using another dataset in the supplementary material.

The single-slice A-SToRM and G-SToRM:SS comparisons roughly match the observations in FIG. 28A and FIG. 28B and the results in [31]. The results show that the multislice V-SToRM approach is able to offer reconstructions that are less blurred and have fewer alias artifacts when compared to single-slice analysis methods (A-SToRM and G-SToRM:SS). The improved performance is also evidenced by the higher SER and SSIM values. We attribute the improved performance to the exploitation of the redundancies across slices, enabled by V-SToRM. We also note that the G-SToRM:MS method offers poor performance, evidenced by image blurring and missing details on the myocardium. The poor performance of G-SToRM:MS can be understood in terms of the differences in distribution of the latent vectors, shown in FIG. 27A through 27D.

VI. DISCUSSION AND CONCLUSION

In this work, we introduced an approach for the variational learning of a CNN manifold model from undersampled measurements. This work generalized the traditional VAE scheme to the undersampled setting. Unlike the traditional VAE scheme that uses an encoder to learn the conditional distribution from the images, we propose to learn the parameters of the distribution from the measurements using back-propagation. The application of the framework to multislice cardiac MRI data enabled the joint alignment and recovery from highly undersampled measurements. Unlike current single-slice methods that perform independent recovery of the slices, the proposed approach aligns the acquisitions and jointly recovers the images from the undersampled k-t space data. In addition to facilitating the exploitation of inter-slice redundancies, this approach also eliminates the need for post-processing schemes to match the phases of the slices.

Our results show that the joint alignment and recovery of the slices offer reduced blurring and reduction of artifacts compared to the direct generalization of G-SToRM to the multislice setting. In particular, the variational framework encourages the latent variables of different slices to have the same distribution. By contrast, the G-SToRM framework cannot guarantee the similarity of the probability distributions; the improper alignment translates to image blurring and other artifacts. Similarly, the use of the CNN generator offers implicit spatial regularization, resulting in improved recovery over A-SToRM.

A benefit with the proposed scheme is that it does not re-quire fully sampled data to train the CNN. The subject-specific CNN parameters and the latent vectors are learned directly from the undersampled data. We note that the acquisition of fully sampled data to train neural networks is not always possible, especially in the high-resolution and dynamic MRI settings considered in this work. In this context, direct learning from undersampled data is desirable. However, a challenge of the proposed scheme when compared to pretrained deep learning methods that offer super-fast inference is the higher computational complexity. We will explore training strategies, including transfer learning and meta-learning, to reduce the run time in the future.

VII. APPENDIX

In this appendix, we show that the likelihood term in (7) can be lower-bounded by (8). According to (7) and using the result of joint probability, we obtain $$p(b_i) = \frac{p(b_i, c_i)}{q_i(c_i)} \frac{q_i(c_i)}{p(c_i | b_i)} = \frac{p(b_i, c_i)}{\underbrace{p_i(c_i)}_{p(b_i|c_i)}} \frac{p(c_i)}{q_i(c_i)} \frac{q(c_i)}{p_i(c_i | b_i)}. \quad (13)$$

Taking the logarithm on both sides of (13), we have $$\log p(b_i) = \log p(b_i | c_i) - \log \frac{q_i(c_i)}{p_i(c_i)} + \log \frac{q_i(c_i)}{p_i(c_i | b_i)}. \quad (14)$$

Next, we take the expectation with respect to $c_i \sim q_i(c_i)$ of both sides of (14), and realizing that $\mathbb{E}_{c_i \sim q_i}(c_i) \log p(b_i) = \log p(b_i)$, we obtain $$\log p(b_i) = \underbrace{\mathbb{E}_{c_i \sim q_i(c_i)} \log \frac{q_i(c_i)}{p(c_i | b_i)}}_{\text{data term}} - \underbrace{\mathbb{E}_{c_i \sim q_i(c_i)} \log \frac{q_i(c_i)}{p(c_i)}}_{KL[q_i(c_i)\|p(c_1)]} + \underbrace{\mathbb{E}_{c_i \sim q_i(c_i)} \log \frac{q_i(c_i)}{p(c_i | b_i)}}_{KL[q_i(c_i)\|p(c_i|b_i)] > 0}. \quad (15)$$

The last term is always greater than zero. The first term is the conditional density of the measurements $b_i$ given the images $x_i = \mathcal{D}_\theta(c_i)$. With the measurement model specified by (4), we obtain $$\mathbb{E}_{c_i \sim q_i(c_i)} \log p(b_i | c_i) = -\frac{1}{2\sigma^2} \mathbb{E}_{c_i \sim q_i(c_i)} \|\mathcal{A}_i \mathcal{D}(c_i) - b_i\|^2 + c,$$

Where c is a constant independent of the parameters of interest. Ignoring the constant c and plugging $\mathbb{E}_{c_i \sim q_i(c_i)} \log p(b_i|c_i)$ back into (15), we obtain the desired lower bound (8).

Although specific ensembles are shown and described, the present invention contemplates various options and alternatives. The methods described herein or aspects thereof may be incorporated into software in the form of instructions stored on a non-transitory computer or machine readable medium. Thus, it is contemplated that existing imaging systems may be reprogrammed to perform methods described herein. It is further to be understood that the methods described here may allow for portable systems to provide improved performance and thus imaging systems such as for performing MRI may be constructed specifically to utilize the methods shown and described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments may be described herein as implementing mathematical methodologies including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Where the term "processor" is used, it is to be understood that it encompasses one or more processors whether located together or remote from one other.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a hospital, clinic, or medical office environment), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a hospital, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment or example.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function or "step for [perform]ing [a function] . . . ", it is intended that such elements are to be interpreted under 35 U.S.C. 112 § (f). However, for any claims containing elements designated in any other manner, it is intended that such elements are not to be interpreted under 35 U.S.C. § 112(f).

The invention is not to be limited to the particular embodiments described herein. In particular, the invention contemplates numerous variations in the specific methodology used with respect to the deep manifold learning algorithms. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

REFERENCES

The following references are hereby incorporated by reference in their entireties.

[1] J. Tsao, P. Boesiger, and K. P. Pruessmann, "k-t blast and k-t sense: dynamic mri with high frame rate exploiting spatiotemporal correlations," Magnetic Resonance in Medicine, vol. 50, no. 5, pp. 1031-1042, 2003.

[2] S. G. Lingala, Y. Hu, E. DiBella, and M. Jacob, "Accelerated dynamic mri exploiting sparsity and low-rank structure: kt slr," IEEE Transactions on Medical Imaging, vol. 30, no. 5, pp. 1042-1054, 2011.

[3] L. Feng et al., "Golden-angle radial sparse parallel mri: combination of compressed sensing, parallel imaging, and golden-angle radial sampling for fast and flexible dynamic volumetric mri," Magnetic Resonance in Medicine, vol. 72, no. 3, pp. 707-717, 2014.

[4] L. Feng, L. Axel, H. Chandarana, K. T. Block, D. K. Sodickson, and R. Otazo, "Xd-grasp: golden-angle radial mri with reconstruction of extra motion-state dimensions using compressed sensing," Magnetic Resonance in Medicine, vol. 75, no. 2, pp. 775-788, 2016.

[5] A. G. Christodoulou et al., "Magnetic resonance multitasking for motion-resolved quantitative cardiovascular imaging," Nature Biomedical Engineering, vol. 2, no. 4, pp. 215-226, 2018.

[6] C. Prieto et al., "Highly efficient respiratory motion compensated free-breathing coronary mra using golden-step cartesian acquisition," Journal of Magnetic Resonance Imaging, vol. 41, no. 3, pp. 738-746, 2015.

[7] A. Bustin, N. Fuin, R. M. Botnar, and C. Prieto, "From compressed-sensing to artificial intelligence-based cardiac mri reconstruction," Frontiers in Cardiovascular Medicine, vol. 7, pp. 17, 2020.

[8] S. Poddar and M. Jacob, "Dynamic mri using smoothness regularization on manifolds (storm)," IEEE Transactions on Medical Imaging, vol. 35, no. 4, pp. 1106-1115, 2015.

[9] A. H. Ahmed, R. Zhou, Y. Yang, P. Nagpal, M. Salerno, and M. Jacob, "Free-breathing and ungated dynamic mri using navigator-less spiral storm," IEEE Transactions on Medical Imaging, 2020.

[10] S. Poddar, Y. Q. Mohsin, D. Ansah, B. Thattaliyath, R. Ashwath, and M. Jacob, "Manifold recovery using kernel low-rank regularization: Application to dynamic imaging," IEEE Transactions on Computational Imaging, vol. 5, no. 3, pp. 478-491, 2019.

[11] U. Nakarmi, Y. Wang, J. Lyu, D. Liang, and L. Ying, "A kernel-based low-rank (klr) model for low-dimensional manifold recovery in highly accelerated dynamic mri," IEEE Transactions on Medical Imaging, vol. 36, no. 11, pp. 2297-2307, 2017.

[12] U. Nakarmi, K. Slavakis, and L. Ying, "Mls: Joint manifold-learning and sparsity-aware framework for highly accelerated dynamic magnetic resonance imaging," in 2018 IEEE 15th International Symposium on Biomedical Imaging (ISBI 2018). IEEE, 2018, pp. 1213-1216.

[13] G. Wang, "A perspective on deep imaging," IEEE Access, vol. 4, pp. 8914-8924, 2016.

[14] G. Wang, M. Kalra, and C. G. Orton, "Machine learning will transform radiology significantly within the next 5 years," Medical Physics, vol. 44, no. 6, pp. 2041-2044, 2017.

[15] G. Dardikman-Yoffe and Y. C. Eldar, "Learned sparcom: Unfolded deep super-resolution microscopy," arXiv preprint arXiv:2004.09270, 2020.

[16] J. C. Ye, Y. Han, and E. Cha, "Deep convolutional framelets: A general deep learning framework for inverse problems," SIAM Journal on Imaging Sciences, vol. 11, no. 2, pp. 991-1048, 2018.

[17] K. H. Jin, M. T. McCann, E. Froustey, and M. Unser, "Deep convolutional neural network for inverse problems in imaging," IEEE Transactions on Image Processing, vol. 26, no. 9, pp. 4509-4522, 2017.

[18] V. Monga, Y. Li, and Y. C. Eldar, "Algorithm unrolling: Interpretable, efficient deep learning for signal and image processing," arXiv preprint arXiv:1912.10557, 2019.

[19] A. Pramanik, H. K. Aggarwal, and M. Jacob, "Deep generalization of structured low-rank algorithms (deep-slr)," IEEE Transactions on Medical Imaging, 2020.

[20] S. Wang et al., "Accelerating magnetic resonance imaging via deep learning," in 2016 IEEE 13th International Symposium on Biomedical Imaging (ISBI). IEEE, 2016, pp. 514-517.

[21] S. Wang et al., "Deepcomplexmri: Exploiting deep residual network for fast parallel mr imaging with complex convolution," Magnetic Resonance Imaging, vol. 68, pp. 136-147, 2020.

[22] S. UH Dar, M. O¨zbey, A. B. C, atli, and T. C, ukur, "A transfer-learning approach for accelerated mri using deep neural networks," Magnetic resonance in medicine, vol. 84, no. 2, pp. 663-685,2020.

[23] Y. Han et al., "Deep learning with domain adaptation for accelerated projection-reconstruction mr," Magnetic resonance in medicine, vol. 80, no. 3, pp. 1189-1205, 2018.

[24] T. Sanchez et al., "Scalable learning-based sampling optimization for compressive dynamic mri," in ICASSP 2020-2020 IEEE International Conference on Acoustics, Speech and Signal Processing (ICASSP). IEEE, 2020, pp. 8584-8588.

[25] S. Wang et al., "Dimension: dynamic mr imaging with both k-space and spatial prior knowledge obtained via multi-supervised network training," NMR in Biomedicine, p. e4131, 2019.

[26] S. Wang et al., "Lantern: Learn analysis transform network for dynamic magnetic resonance imaging," Inverse Problems & Imaging, p. 1, 2020.

[27] S. UH Dar et al., "Prior-guided image reconstruction for accelerated multi-contrast mri via generative adversarial networks," IEEE Journal of Selected Topics in Signal Processing, vol. 14, no. 6, pp. 1072-1087, 2020.

[28] S. UH Dar et al., "Image synthesis in multi-contrast mri with conditional generative adversarial networks," IEEE transactions on medical imaging, vol. 38, no. 10, pp. 2375-2388, 2019.

[29] M. Yurt, S. U H Dar, A. Erdem, E. Erdem, and T. C, ukur, "mustgan: Multi-stream generative adversarial networks for mr image synthesis," arXiv preprint arXiv: 1909.11504, 2019.

[30] Q. Zou, S. Poddar, and M. Jacob, "Sampling of planar curves: Theory and fast algorithms," IEEE Transactions on Signal Processing, vol. 67, no. 24, pp. 6455-6467, 2019.

[31] Q. Zou and M. Jacob, "Recovery of surfaces and functions in high dimensions: sampling theory and links to neural networks," SIAM Journal on Imaging Sciences, in press.

[32] D. Ulyanov, A. Vedaldi, and V. Lempitsky, "Deep image prior," in Proceedings of the IEEE Conference on Computer Vision and Pattern Recognition, 2018, pp. 9446-9454.

[33] K. H. Jin, H. Gupta, J. Yerly, M. Stuber, and M. Unser, "Time-dependent deep image prior for dynamic mri," arXiv preprint arXiv:1910.01684, 2019.

[34] A. Bora, E. Price, and A. G. Dimakis, "Ambientgan: Generative models from lossy measurements," in International Conference on Learning Representations, 2018.

[35] K. Kazuhiro et al., "Generative adversarial networks for the creation of realistic artificial brain magnetic resonance images," Tomography, vol. 4, no. 4, pp. 159, 2018.

[36] I. Goodfellow et al., "Generative adversarial nets," in Advances in neural information processing systems, 2014, pp. 2672-2680.

[37] M. Arjovsky, S. Chintala, and L. Bottou, "Wasserstein gan," arXiv preprint arXiv:1701.07875, 2017.

[38] D. Varga, A. Csisz´arik, and Z. Zombori, "Gradient regularization improves accuracy of discriminative models," arXiv preprint arXiv:1712.09936, 2017.

[39] R. Zhou et al., "Free-breathing cine imaging with motion-corrected reconstruction at 3 t using spiral acquisition with respiratory correction and cardiac self-gating (spares)," Magnetic resonance in medicine, vol. 82, no. 2, pp. 706-720, 2019.

[40] D. O. Walsh, A. F. Gmitro, and M. W. Marcellin, "Adaptive reconstruction of phased array mr imagery," Magnetic Resonance in Medicine, vol. 43, no. 5, pp. 682-690, 2000.

[41] A. Mittal, A. K. Moorthy, and A. C. Bovik, "No-reference image quality assessment in the spatial domain," IEEE Transactions on Image Processing, vol. 21, no. 12, pp. 4695-4708, 2012.

[42] A.-K. Bracher, C. Hofmann, A. Bornstedt, S. Boujraf, E. Hell, J. Ulrici, A. Spahr, B. Haller, and V. Rasche, "Feasibility of ultra-short echo time (ute) magnetic resonance imaging for identification of carious lesions," Magnetic resonance in medicine, vol. 66, no. 2, pp. 538-545, 2011.

[43] N. S. Higano, A. D. Hahn, J. A. Tkach, X. Cao, L. L. Walkup, R. P. Thomen, S. L. Merhar, P. S. Kingma, S. B. Fain, and J. C. Woods, "Retrospective respiratory self-gating and removal of bulk motion in pulmonary ute mri of neonates and adults," Magnetic resonance in medicine, vol. 77, no. 3, pp. 1284-1295, 2017.

[44] A. D. Hahn, N. S. Higano, L. L. Walkup, R. P. Thomen, X. Cao, S. L. Merhar, J. A. Tkach, J. C. Woods, and S. B. Fain, "Pulmonary mri of neonates in the intensive care unit using 3d ultrashort echo time and a small footprint mri system," Journal of Magnetic Resonance Imaging, vol. 45, no. 2, pp. 463-471, 2017.

[45] N. S. Higano, D. R. Spielberg, R. J. Fleck, A. H. Schapiro, L. L. Walkup, A. D. Hahn, J. A. Tkach, P. S. Kingma, S. L. Merhar, S. B. Fain, et al., "Neonatal pulmonary magnetic resonance imaging of bronchopulmonary dysplasia predicts short-term clinical outcomes," American journal of respiratory and critical care medicine, vol. 198, no. 10, pp. 1302-1311, 2018.

[46] F. Gibiino, L. Sacolick, A. Menini, L. Landini, and F. Wiesinger, "Free-breathing, zero-te mr lung imaging," Magnetic Resonance Materials in Physics, Biology and Medicine, vol. 28, no. 3, pp. 207-215, 2015.

[47] S. Kumar, R. Rai, A. Stemmer, S. Josan, L. Holloway, S. Vinod, D. Moses, and G. Liney, "Feasibility of free breathing lung mri for radiotherapy using non-cartesian k-space acquisition schemes," The British journal of radiology, vol. 90, no. 1080, p. 20170037, 2017.

[48] W. Jiang, F. Ong, K. M. Johnson, S. K. Nagle, T. A. Hope, M. Lustig, and P. E. Larson, "Motion robust high resolution 3d free-breathing pulmonary mri using dynamic 3d image self-navigator," Magnetic resonance in medicine, vol. 79, no. 6, pp. 2954-2967, 2018.

[49] D. P. Capaldi, R. L. Eddy, S. Svenningsen, F. Guo, J. S. Baxter, A. J. McLeod, P. Nair, D. G. McCormack, G. Parraga, and C. R. R. Network, "Free-breathing pulmonary mr imaging to quantify regional ventilation," Radiology, vol. 287, no. 2, pp. 693-704, 2018.

[50] Z. Berecova, V. Neuschl, P. Boruta, J. Masura, and E. Ghersin, "A complex pulmonary vein varix-diagnosis with ecg gated mdct, mri and invasive pulmonary angiography," Journal of radiology case reports, vol. 6, no. 12, p. 9, 2012.

[51] Q. Zou, A. H. Ahmed, P. Nagpal, S. Kruger, and M. Jacob, "Dynamic imaging using a deep generative storm (gen-storm) model," IEEE Transactions on Medical Imaging, 2021.

[52] J. Yoo, K. H. Jin, H. Gupta, J. Yerly, M. Stuber, and M. Unser, "Time-dependent deep image prior for dynamic mri," IEEE Transactions on Medical Imaging, 2021.

[53] N. R. Huttinga, T. Bruijnen, C. A. van den Berg, and A. Sbrizzi, "Nonrigid 3d motion estimation at high temporal resolution from prospectively undersampled k-space data using low-rank mr-motus," Magnetic resonance in medicine, vol. 85, no. 4, pp. 2309-2326, 2021.

[54] X. Zhu, M. Chan, M. Lustig, K. M. Johnson, and P. E. Larson, "Iterative motion-compensation reconstruction ultra-short to (imoco ute) for high-resolution free-breathing pulmonary mri," Magnetic resonance in medicine, vol. 83, no. 4, pp. 1208-1221, 2020.

[55] T. Li, M. Zhang, W. Qi, E. Asma, and J. Qi, "Motion correction of respiratory-gated pet images using deep learning based image registration framework," Physics in Medicine & Biology, vol. 65, no. 15, p. 155003, 2020.

[56] L. Feng, J. Delacoste, D. Smith, J. Weissbrot, E. Flagg, W. H. Moore, F. Girvin, R. Raad, P. Bhattacharji, D. Stoffel, et al., "Simultaneous evaluation of lung anatomy and ventilation using 4d respiratory-motion-resolved ultrashort echo time sparse mri," Journal of Magnetic Resonance Imaging, vol. 49, no. 2, pp. 411-422, 2019.

[57] Q. Zou, A. H. Ahmed, P. Nagpal, S. Kruger, and M. Jacob, "Deep generative storm model for dynamic imaging," in 2021 IEEE 18th International Symposium on Biomedical Imaging (ISBI), pp. 114-117, IEEE, 2021.

[58] F. Knoll, K. Bredies, T. Pock, and R. Stollberger, "Second order total generalized variation (tgv) for mri," Magnetic resonance in medicine, vol. 65, no. 2, pp. 480-491, 2011.

[59] J. A. Fessler and B. P. Sutton, "Nonuniform fast fourier transforms using min-max interpolation," IEEE transactions on signal processing, vol. 51, no. 2, pp. 560-574, 2003.

[60] F. Ong and M. Lustig, "Sigpy: a python package for high performance iterative reconstruction," Proceedings of the International Society of Magnetic Resonance in Medicine, Montréal, QC, vol. 4819, 2019.

[61] D. P. Kingma and J. Ba, "Adam: A method for stochastic optimization," in 3rd International Conference on Learning Representations (ICLR), 2015.

[62] A. F. Agarap, "Deep learning using rectified linear units (relu)," arXiv preprint arXiv:1803.08375, 2018.

[63] K. M. Johnson, S. B. Fain, M. L. Schiebler, and S. Nagle, "Optimized 3d ultrashort echo time pulmonary mri," Magnetic resonance in medicine, vol. 70, no. 5, pp. 1241-1250, 2013.

[64] H. Pedersen, S. Kozerke, S. Ringgaard, K. Nehrke, and W. Y. Kim, "k-t pca: temporally constrained k-t blast reconstruction using principal component analysis," Magnetic Resonance in Medicine: An Official Journal of the International Society for Magnetic Resonance in Medicine, vol. 62, no. 3, pp. 706-716, 2009.

[65] K. Breuer, C. B. Meyer, F. A. Breuer, A. Richter, F. Exner, A. M. Weng, S. Ströhle, B. Polat, P. M. Jakob, O. A. Sauer, et al., "Stable and efficient retrospective 4d-mri using non-uniformly distributed quasi-random numbers," Physics in Medicine & Biology, vol. 63, no. 7, p. 075002, 2018.

[66] O. Dietrich, J. G. Raya, S. B. Reeder, M. F. Reiser, and S. O. Schoenberg, "Measurement of signal-to-noise ratios in mr images: influence of multichannel coils, parallel imaging, and reconstruction filters," Journal of Magnetic Resonance Imaging: An Official Journal of the International Society for Magnetic Resonance in Medicine, vol. 26, no. 2, pp. 375-385, 2007.

[67] M. Gutberlet, T. F. Kaireit, A. Voskrebenzev, F. Lasch, J. Freise, T. Welte, F. Wacker, J. M. Hohlfeld, and J. Vogel-Claussen, "Free-breathing dynamic 19f gas mr imaging for mapping of regional lung ventilation in patients with copd," Radiology, vol. 286, no. 3, pp. 1040-1051, 2018.

[68] N. Kobayashi, "Magnetic resonance imaging with gradient sound respiration guide," Plos one, vol. 16, no. 7, p. e0254758, 2021.

[69] J. L. Prince and J. M. Links, Medical imaging signals and systems. Pearson Prentice Hall Upper Saddle River, 2006.

[70] S. Napel, M. P. Marks, G. D. Rubin, M. D. Dake, C. H. McDonnell, S. M. Song, D. R. Enzmann, and R. Jeffrey Jr, "Ct angiography with spiral ct and maximum intensity projection," Radiology, vol. 185, no. 2, pp. 607-610, 1992.

[71] J. F. Gruden, S. Ouanounou, S. Tigges, S. D. Norris, and T. S. Klausner, "Incremental benefit of maximum-intensity-projection images on observer detection of small pulmonary nodules revealed by multidetector ct," American Journal of Roentgenology, vol. 179, no. 1, pp. 149-157, 2002.

[72] G. E. Hinton and R. R. Salakhutdinov, "Reducing the dimensionality of data with neural networks," Science, vol. 313, no. 5786, pp. 504-507, 2006.

[73] D. P. Kingma and M. Welling, "Auto-encoding variational bayes," arXiv preprint arXiv:1312.6114, 2013.

[74] I. Higgins et al., "Early visual concept learning with unsupervised deep learning," arXiv preprint arXiv:1606.05579, 2016.

[75] I. Higgins et al., "beta-vae: Learning basic visual concepts with a constrained variational framework," 2016.

[76] J. Chung et al., "A recurrent latent variable model for sequential data," Advances in Neural Information Processing Systems, vol. 28, pp. 2980-2988, 2015.

[77] Y. Li, Z. Wang, R. Sun, and F. Lam, "Separation of metabolites and macromolecules for short-te 1 h-mrsi using learned component-specific representations," IEEE Transactions on Medical Imaging, vol. 40, no. 4, pp. 1157-1167, 2021.

[78] M. Mani, V. A. Magnotta, and M. Jacob, "qmodel: A plug-and-play model-based reconstruction for highly accelerated multi-shot diffusion mri using learned priors," Magnetic Resonance in Medicine, vol. 86, no. 2, pp. 835-851, 2021.

[79] T. Kido et al., "Compressed sensing real-time cine cardiovascular magnetic resonance: accurate assessment of left ventricular function in a single-breath-hold," Journal of Cardiovascular Magnetic Resonance, vol. 18, no. 1, pp. 1-11, 2016.

[80] L. Axel and R. Otazo, "Accelerated mri for the assessment of cardiac function," The British Journal of Radiology, vol. 89, no. 1063, pp. 20150655, 2016.

[81] M. Lustig, D. Donoho, and J. M. Pauly, "Sparse mri: The application of compressed sensing for rapid mr imaging," Magnetic Resonance in Medicine, vol. 58, no. 6, pp. 1182-1195, 2007.

[82] T. Kustner et al., "Isotropic 3D Cartesian single breathhold CINE MRI with multi-bin patch-based low-rank reconstruction," Magnetic Resonance in Medicine, vol. 84, no. 4, 2020.

[83] C. Qin et al., "Convolutional Recurrent Neural Networks for Dynamic MR Image Reconstruction," IEEE Transactions on Medical Imaging, vol. 38, no. 1, pp. 280-290, 2019.

[84] A. Bustin, N. Fuin, R. M. Botnar, and C. Prieto, "From compressed-sensing to artificial intelligence-based cardiac mri reconstruction," Fron tiers in Cardiovascular Medicine, vol. 7, no. 17, 2020.

[85] T. Kustner et al., "Cinenet: deep learning-based 3d cardiac cine mri reconstruction with multi-coil complex-valued 4d spatio-temporal convolutions," Scientific Reports, vol. 10, no. 1, pp. 1-13, 2020.

[86] C. M. Sandino, P. Lai, S. S. Vasanawala, and J. Y. Cheng, "Accelerating cardiac cine mri using a deep learning-based espirit reconstruction," Magnetic Resonance in Medicine, vol. 85, no. 1, pp. 152-167, 2021.

[87] T. Wang et al., "Ica-unet: Ica inspired statistical unet for real-time 3d cardiac cine mri segmentation," in International Conference on Medical Image Computing and Computer-Assisted Intervention. Springer, 2020, pp. 447-457.

[88] Z. Deng et al., "Four-dimensional mri using three-dimensional radial sampling with respiratory self-gating to characterize temporal phase-resolved respiratory motion in the abdomen," Magnetic Resonance in Medicine, vol. 75, no. 4, pp. 1574-1585, 2016.

[89] S. Rosenzweig, N. Scholand, H. C. M. Holme, and M. Uecker, "Cardiac and respiratory self-gating in radial mri using an adapted singular spectrum analysis (ssa-fary)," IEEE Transactions on Medical Imaging, vol. 39, no. 10, pp. 3029-3041, 2020.

[90] M. Usman, D. Atkinson, C. Kolbitsch, T. Schaeffter, and C. Prieto, "Manifold learning based ECG-free free-breathing cardiac CINE MRI," Journal of Magnetic Resonance Imaging, vol. 41, no. 6, 2015.

[91] X. Chen et al., "High-Resolution Self-Gated Dynamic Abdominal MRI Using Manifold Alignment," IEEE Transactions on Medical Imaging, vol. 36, no. 4, pp. 960-971, 2017.

[92] G. N. Shetty et al., "Bi-linear modeling of data manifolds for dynamic-mri recovery," IEEE Transactions on Medical Imaging, vol. 39, no. 3, pp. 688-702, 2019.

[93] M. Gori, M. Maggini, and L. Sarti, "Exact and approximate graph matching using random walks," IEEE Transactions on Pattern Analysis and Machine Intelligence, vol. 27, no. 7, pp. 1100-1111, 2005.

[94] C. F. Baumgartner et al., "High-resolution dynamic mr imaging of the thorax for respiratory motion correction of pet using groupwise manifold alignment," Medical Image Analysis, vol. 18, no. 7, pp. 939-952, 2014.

[95] C. F. Baumgartner et al., "Self-aligning manifolds for matching disparate medical image datasets," in International Conference on Information Processing in Medical Imaging. Springer, 2015, pp. 363-374.

[96] X. Chen et al., "Dynamic volume reconstruction from multi-slice abdominal mri using manifold alignment," in International Conference on Medical Image Computing and Computer-Assisted Intervention. Springer, 2016, pp. 493-501.

[97] Y. LeCun, "The mnist database of handwritten digits," http://yann.lecun.com/exdb/mnist/, 1998.

[98] M. Uecker et al., "Espirit-an eigenvalue approach to autocalibrating parallel mri: where sense meets grappa," Magnetic Resonance in Medicine, vol. 71, no. 3, pp. 990-1001, 2014.

[99] B. Xu, N. Wang, T. Chen, and M. Li, "Empirical evaluation of rectified activations in convolutional network," arXiv preprint arXiv:1505.00853, 2015.

What is claimed is:

1. A method for compactly representing and learning images in a multi-dimensional dataset without training data from partial and undersampled measurements using a generative manifold model, comprising:
    modeling the images or deformations of the images in the multi-dimensional dataset as a smooth non-linear function of low-dimensional latent variables, wherein the smooth non-linear function is modeled using a subject-specific neural network generator, which maps points in the low-dimensional latent space to a smooth image manifold in high dimensional ambient space;
    acquiring a set of measurements, associated with the images of the object using sensors;

estimating parameters of the subject-specific neural network generator using the set of measurements;
estimating latent variables using the set of measurements; and
generating a visualization of dynamic objects associated with the images using the generative manifold model.

2. The method of claim 1 wherein the subject-specific neural network generator that maps the low-dimensional latent variables to multidimensional images is a convolutional neural network (CNN) generator.

3. The method of claim 2 wherein the modeling comprises performing regularization of the parameters of the subject-specific CNN generator to encourage smoothness of the images or the deformations in the smooth image manifold.

4. The method of claim 2 wherein the modeling further comprises performing the regularization of the of latent variables to encourage at least one property of the images in the multidimensional dataset wherein the at least one property includes temporal smoothness.

5. The method of claim 1, where the images in the multi-dimensional dataset comprises images that vary depending on at least one of: (a) dynamic changes to an organ resulting from physiological and subject bulk motion (b) image intensity changes induced by administration of external contrast agents (c) dynamic contrast changes resulting from image acquisition settings, (d) time varying acquisition settings, and (e) imperfections associated with a measurement device associated with the sensors; (f) combinations thereof.

6. The method of claim 1, wherein the set of measurements comprises multi-slice measurements of 3D volume.

7. The method of claim 1 wherein the generative manifold model provides for modeling deformations.

8. The method of claim 1 wherein the set of measurements are acquired using a magnetic resonance imaging scanner.

9. The method of claim 1 further comprising storing the set of measurements on a non-transitory machine readable storage medium.

10. The method of claim 1 wherein the images are images of portions of biological tissue.

11. The method of claim 1 wherein the images are four-dimensional images.

12. The method of claim 11 wherein the set of measurements are acquired using magnetic resonance.

13. The method of claim 1 further comprising displaying the visualization on a display.

14. The method of claim 1 wherein the sensors are associated with an imaging system.

15. The method of claim 14 wherein the imaging system is a magnetic resonance imaging system.

16. A method for visualization of structure of a data manifold using a subject-specific generative manifold model, the method comprising:
modeling using a computing device images in a data set as a smooth non-linear function of latent variables using a subject-specific generator, such that points in a latent subspace are mapped to the data manifold in the generative manifold model and wherein the generator is a neural network (NN);
acquiring a set of measurements associated with each of the points;
estimating parameters of the neural network using the set of measurements;
estimating latent variables using the set of measurements;
using the latent subspace to visualize variability in the dataset and to display fundamental modes of variability in the dataset on a display device.

17. The method of claim 16 wherein the modeling comprises regularizing the parameters of the neural network.

18. The method of claim 16 wherein the modeling further comprises regularizing the latent variables using disentangling priors to thereby aid in separating out the fundamental modes of the variability.

19. The method of claim 16 wherein the generative manifold model provides for modeling deformations.

20. A method for compactly representing and learning images in a multi-dimensional dataset without training data from partial and undersampled measurements using a generative manifold model, comprising:
acquiring the images in the multi-dimensional dataset;
modeling the images or deformations of the images in the multi-dimensional dataset as a smooth non-linear function of low-dimensional latent variables, wherein the smooth non-linear function is modeled using a subject-specific neural network generator, which maps points in the low-dimensional latent space to a smooth image manifold in high dimensional ambient space;
acquiring a set of measurements, associated with the images of the object using sensors;
estimating parameters of the subject-specific neural network generator using the set of measurements;
estimating latent variables using the set of measurements; and
generating a visualization of dynamic objects associated with the images using the generative manifold model.

* * * * *